(12) United States Patent
Volvovski et al.

(10) Patent No.: US 10,095,872 B2
(45) Date of Patent: Oct. 9, 2018

(54) ACCESSING DATA BASED ON A DISPERSED STORAGE NETWORK REBUILDING ISSUE

(71) Applicant: CLEVERSAFE, INC., Chicago, IL (US)

(72) Inventors: Ilya Volvovski, Chicago, IL (US); Bruno Hennig Cabral, Chicago, IL (US); Manish Motwani, Chicago, IL (US); Thomas Darrel Cocagne, Elk Grove Village, IL (US); Timothy W. Markison, Mesa, AZ (US); Gary W. Grube, Barrington Hills, IL (US); Wesley Leggette, Chicago, IL (US); Jason K. Resch, Chicago, IL (US); Michael Colin Storm, Palo Alto, CA (US); Greg Dhuse, Chicago, IL (US); Yogesh Ramesh Vedpathak, Chicago, IL (US); Ravi Khadiwala, Bartlett, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 593 days.

(21) Appl. No.: 14/675,183

(22) Filed: Mar. 31, 2015

(65) Prior Publication Data
US 2015/0355979 A1 Dec. 10, 2015

Related U.S. Application Data

(60) Provisional application No. 62/008,182, filed on Jun. 5, 2014.

(51) Int. Cl.
G06F 17/30 (2006.01)
G06F 21/60 (2013.01)
(Continued)

(52) U.S. Cl.
CPC ........ *G06F 21/602* (2013.01); *G06F 11/1464* (2013.01); *G06F 21/6218* (2013.01);
(Continued)

(58) Field of Classification Search
CPC ............. G06F 11/1092; G06F 11/1076; G06F 67/1097; G06F 21/602; G06F 21/6218;
(Continued)

(56) References Cited

U.S. PATENT DOCUMENTS 4,092,732 A 5/1978 Ouchi
5,454,101 A 9/1995 MacKay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Albert M Phillips, III
(74) *Attorney, Agent, or Firm* — Garlick & Markison; Timothy W. Markison; Bruce E. Stuckman

(57) ABSTRACT

A method begins by a set of storage units of a dispersed storage network (DSN) storing a plurality of encoded data slices, where each storage unit stores a unique sub-set of encoded data slices. The method continues with each storage unit dispersed storage error encoding at least a recovery threshold number of encoded data slices to produce a local set of encoded recovery data slices. In response to a retrieval request, the method continues with a device identifying a storage unit of an initial recovery number of storage units having a rebuilding issue and determining whether the rebuilding issue is correctable at a DSN level. When the rebuilding issue is correctable at the DSN level the method continues with the device selecting another storage unit to
(Continued)

replace the storage unit to produce a recovery number of storage units and sending retrieve requests to the recovery number of storage units.

18 Claims, 57 Drawing Sheets

(51) Int. Cl.
| | |
|---|---|
| G06F 11/14 | (2006.01) |
| H04L 29/08 | (2006.01) |
| G06F 21/62 | (2013.01) |
| H04L 9/08 | (2006.01) |
| H04L 29/06 | (2006.01) |

(52) U.S. Cl.
CPC .......... *H04L 9/0861* (2013.01); *H04L 9/0897* (2013.01); *H04L 67/10* (2013.01); *H04L 67/1097* (2013.01); *H04L 69/04* (2013.01); *G06F 2201/84* (2013.01)

(58) Field of Classification Search
CPC .. G06F 11/1464; G06F 2201/84; H04L 69/04; H04L 9/0861; H04L 67/10; H04L 9/0897; H04L 67/1097
See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0029711 | A1* | 2/2011 | Dhuse ................ G06F 11/1076 711/4 |
| 2011/0213928 | A1* | 9/2011 | Grube ................ G06F 11/1076 711/114 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

DST allocation info 242 | data partition info 320: data ID; No. of partitions; Addr. info for each partition; format conversion indication task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

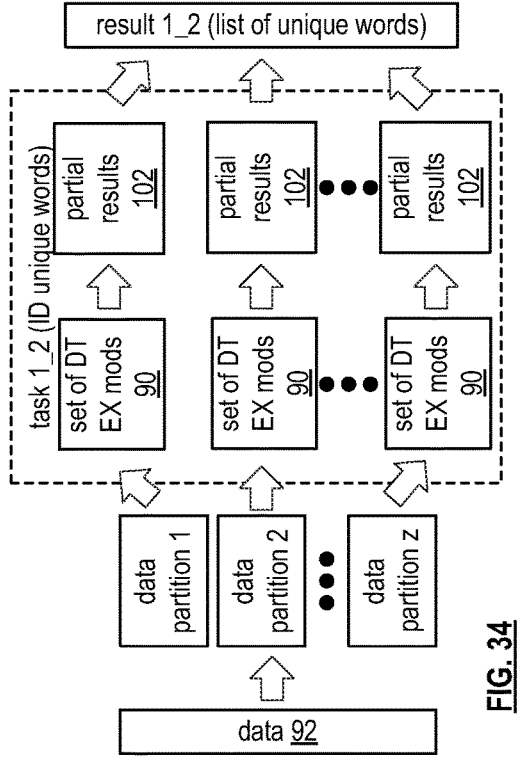
FIG. 34
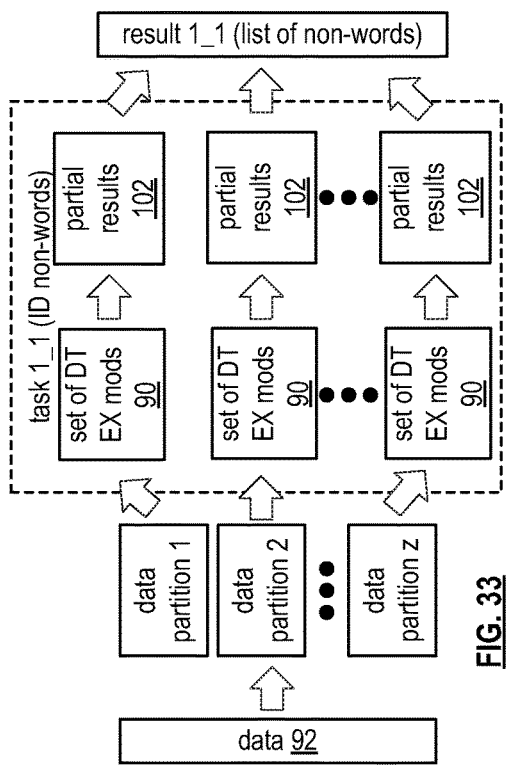
FIG. 33
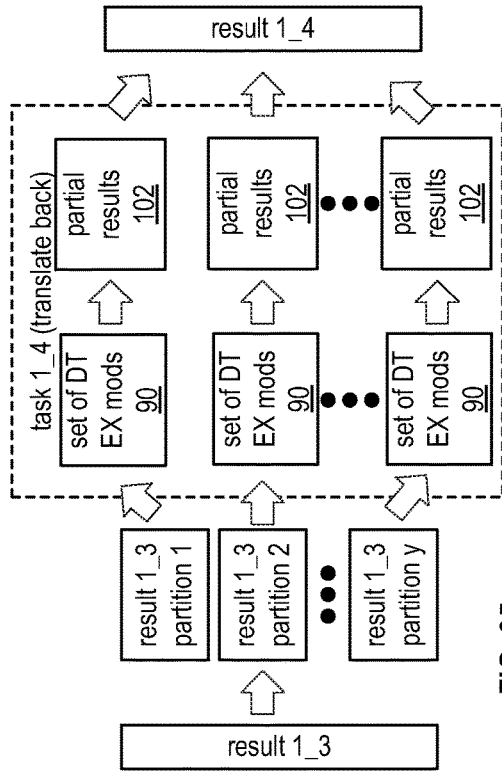
FIG. 35
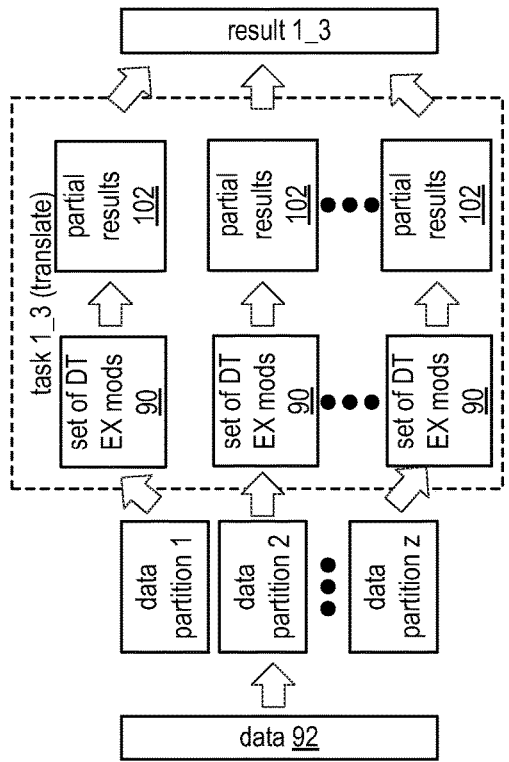

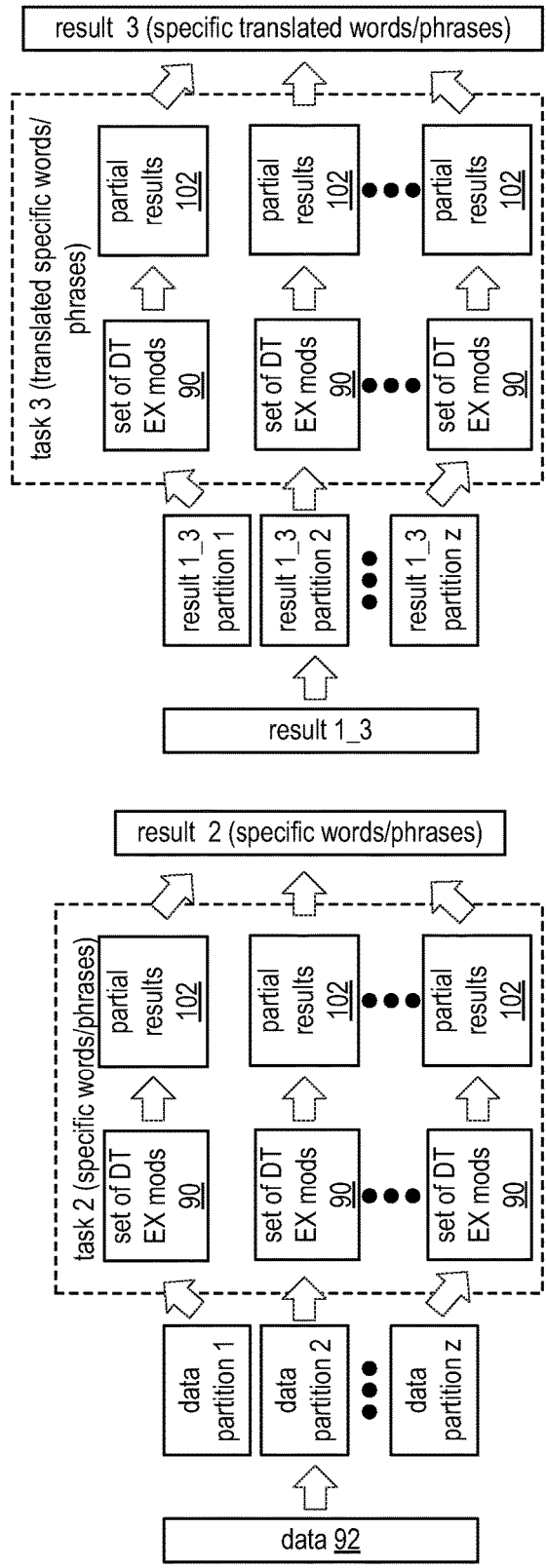
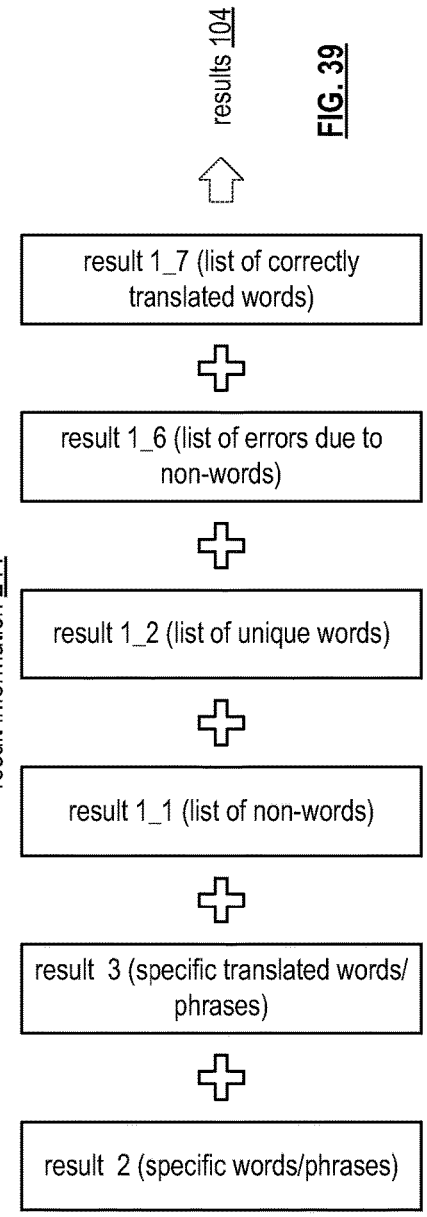

ACCESSING DATA BASED ON A DISPERSED STORAGE NETWORK REBUILDING ISSUE

CROSS REFERENCE TO RELATED PATENTS

The present U.S. Utility Patent Application claims priority pursuant to 35 U.S.C. § 119(e) to U.S. Provisional Application No. 62/008,182, entitled "UTILIZING LOCAL REDUNDANCY IN A DISPERSED STORAGE NETWORK", filed Jun. 5, 2014, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 48A:
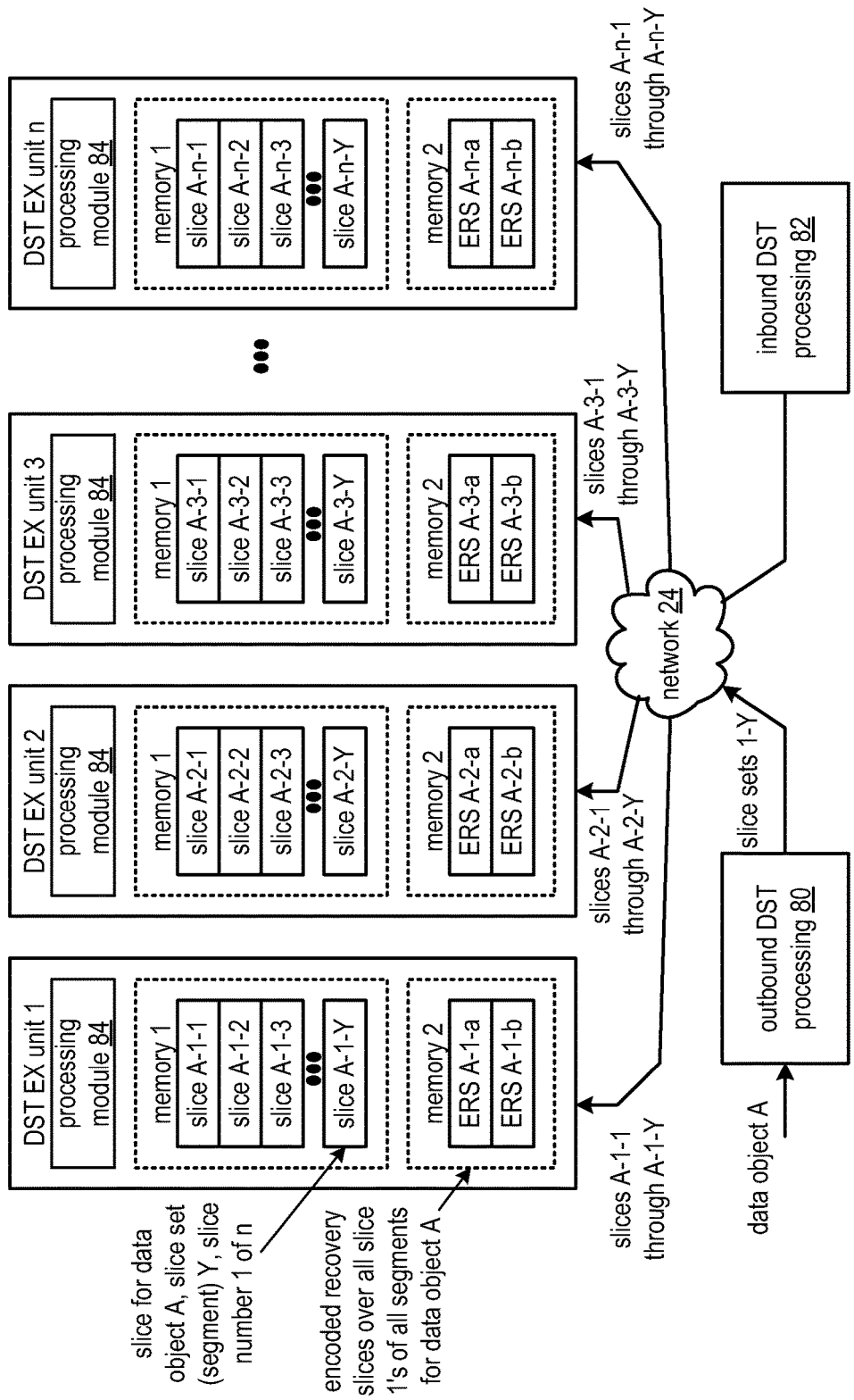
Figure 48B:
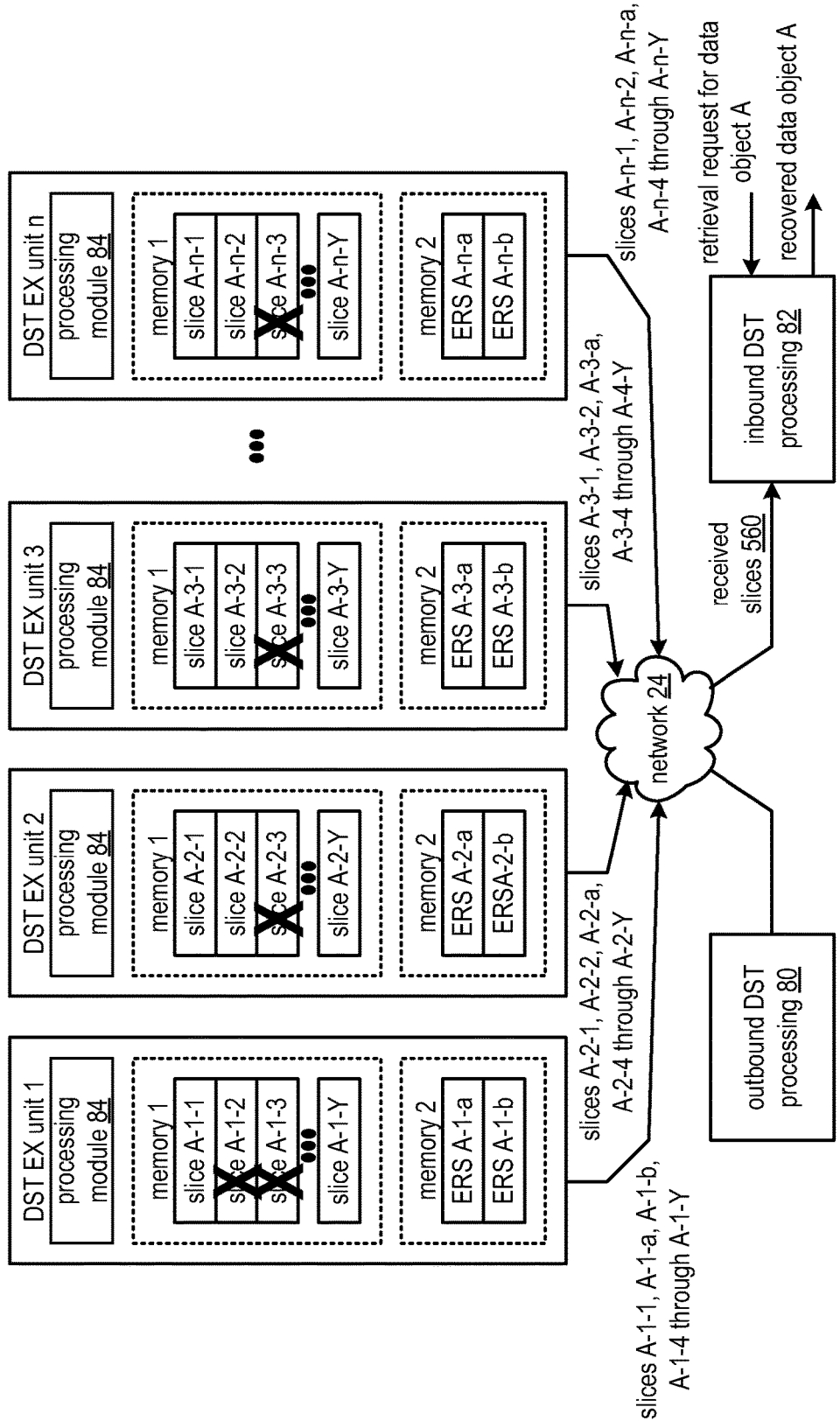
Figure 48C:
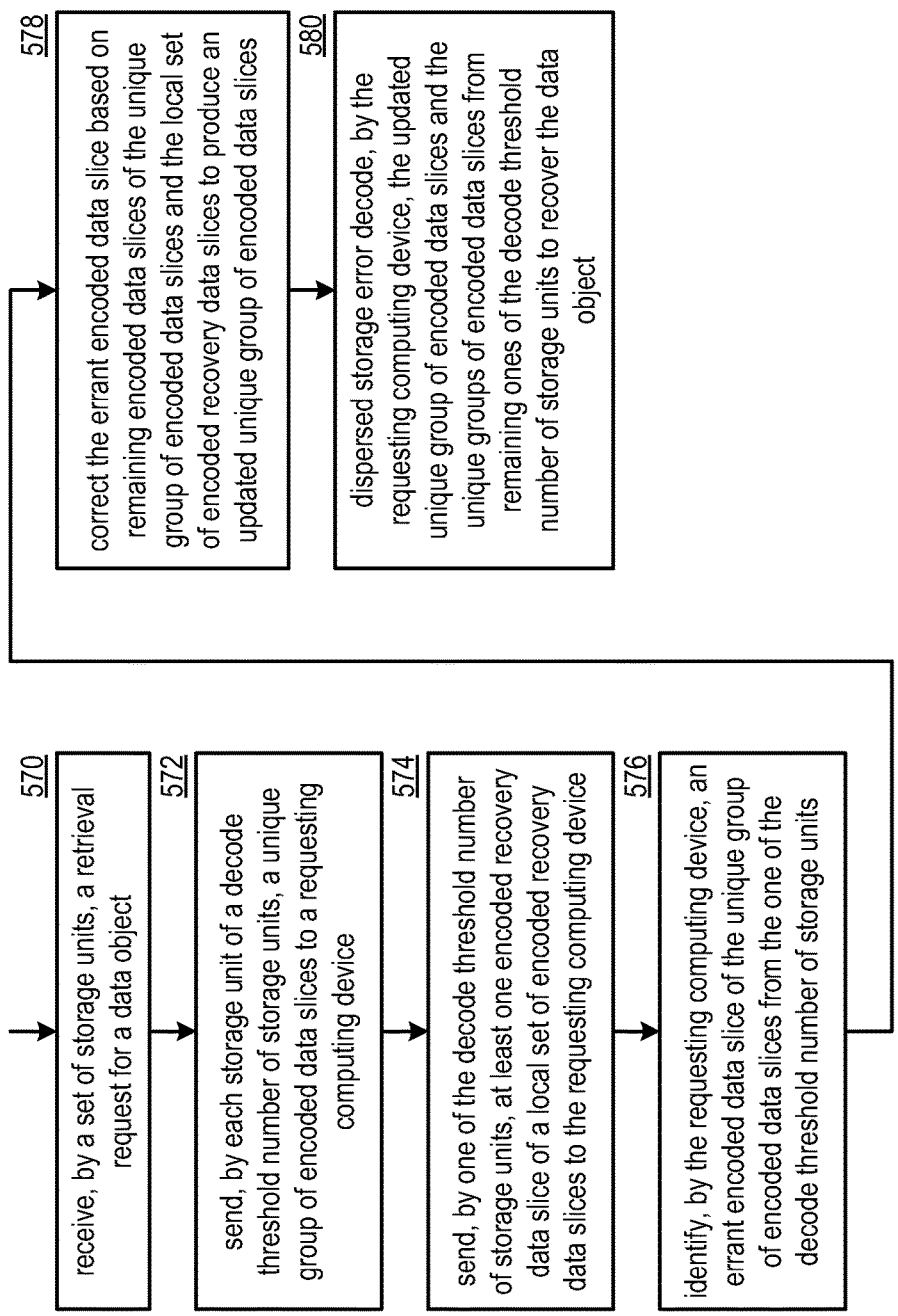

FIGS. 48A-B are a schematic block diagram of another embodiment of a dispersed storage network (DSN) in accordance with the present invention; and FIG. 48C is a flowchart illustrating an example of reliably recovering stored data in accordance with the present invention.

DETAILED DESCRIPTION OF THE INVENTION

Figure 1:
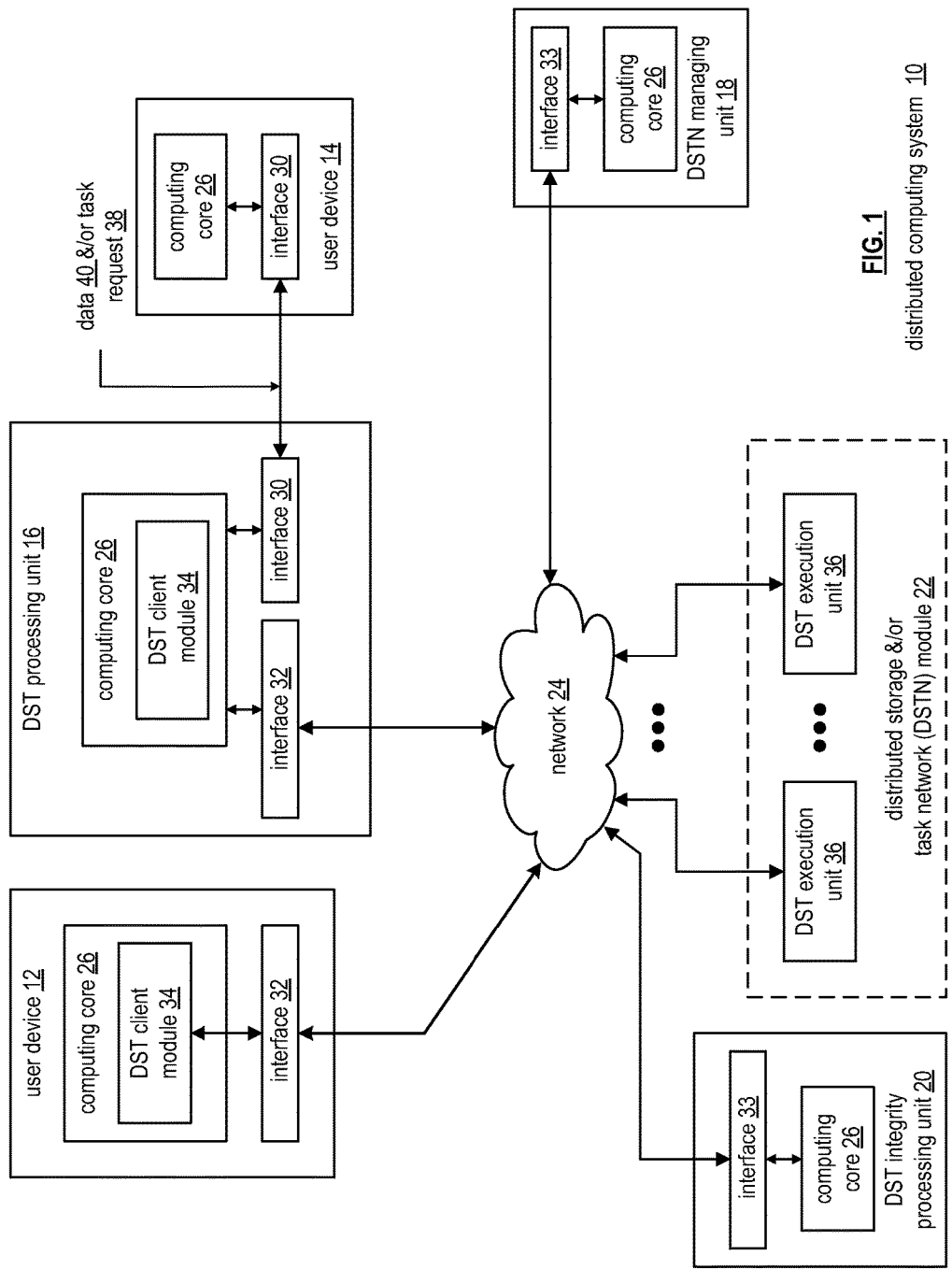
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/ deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
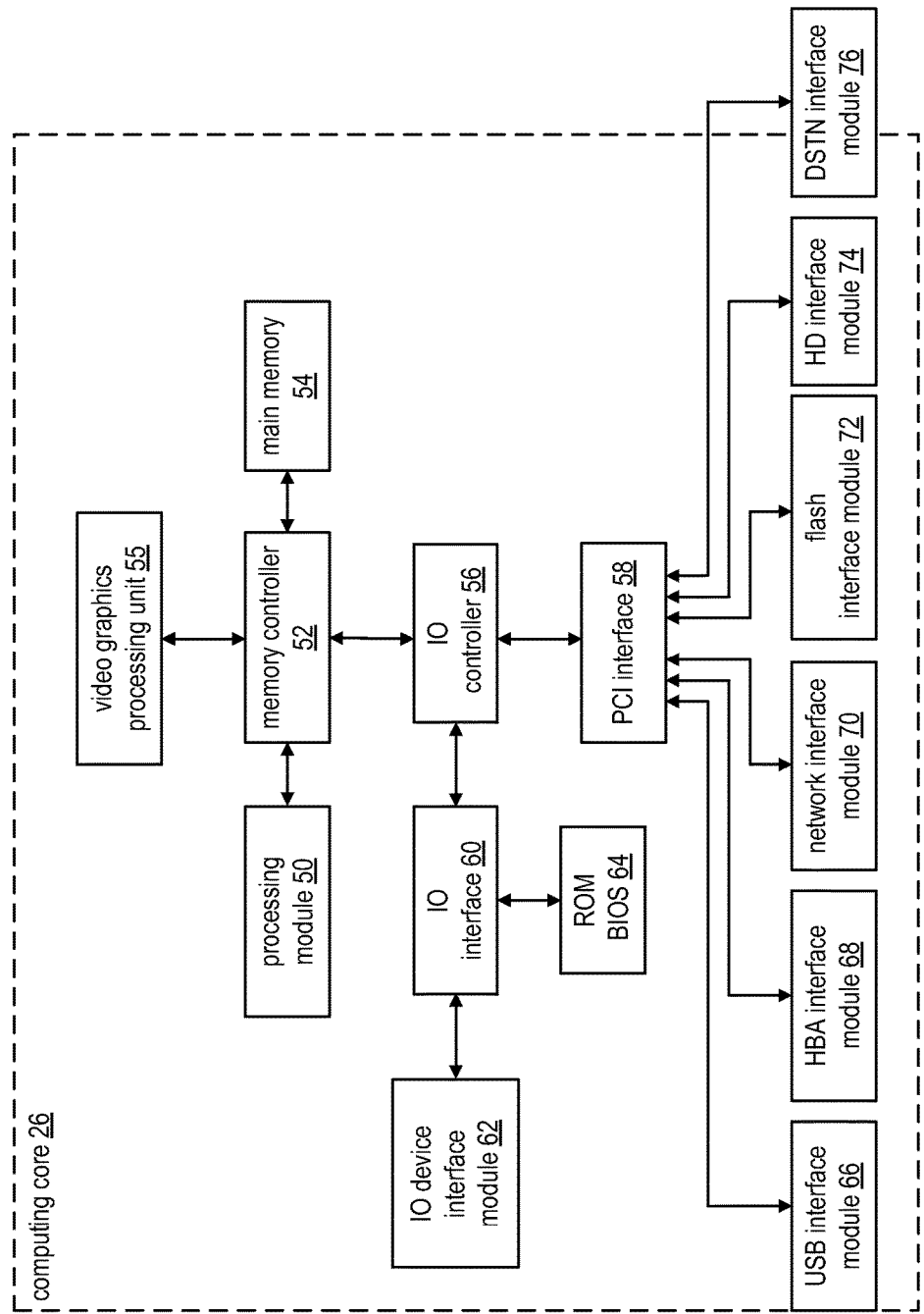
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
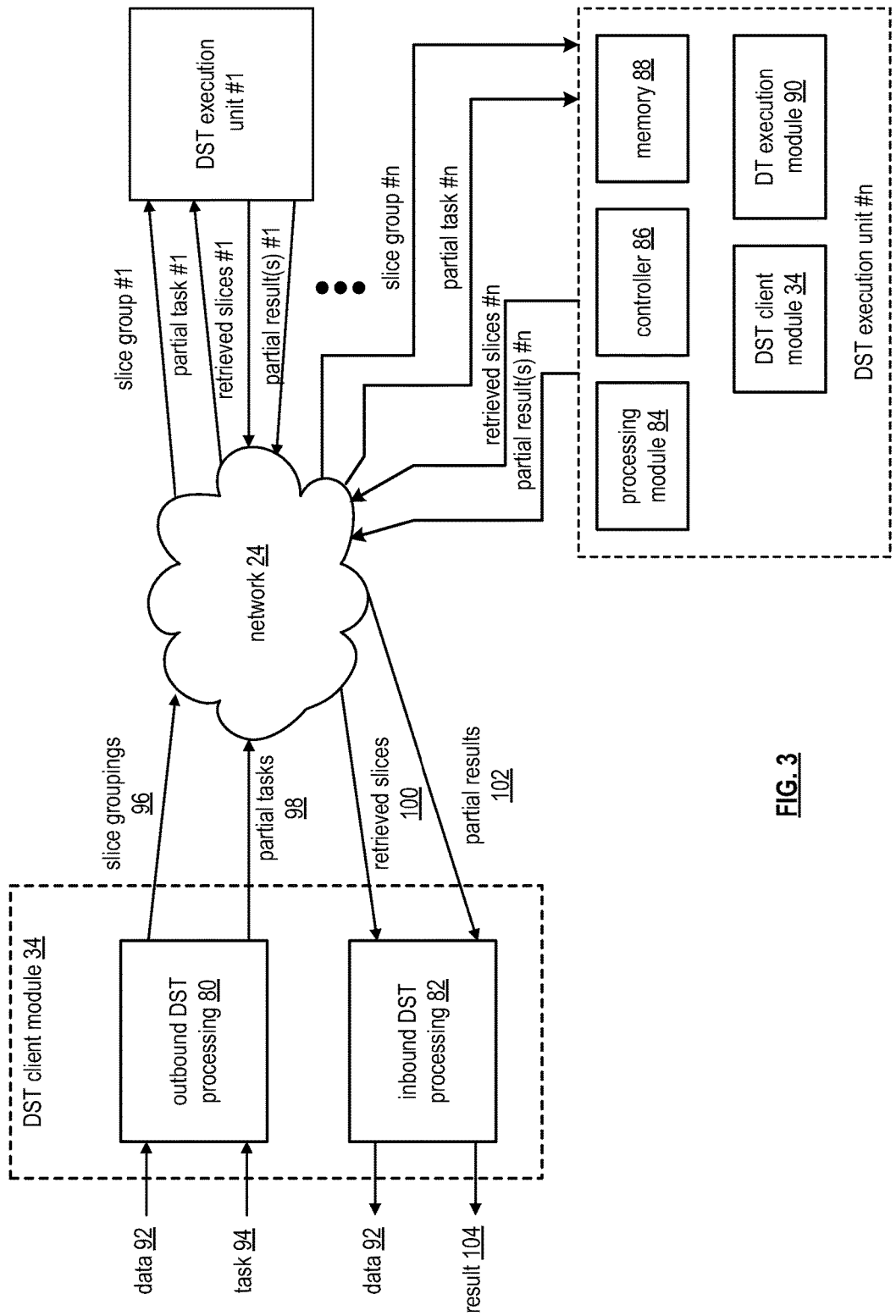
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
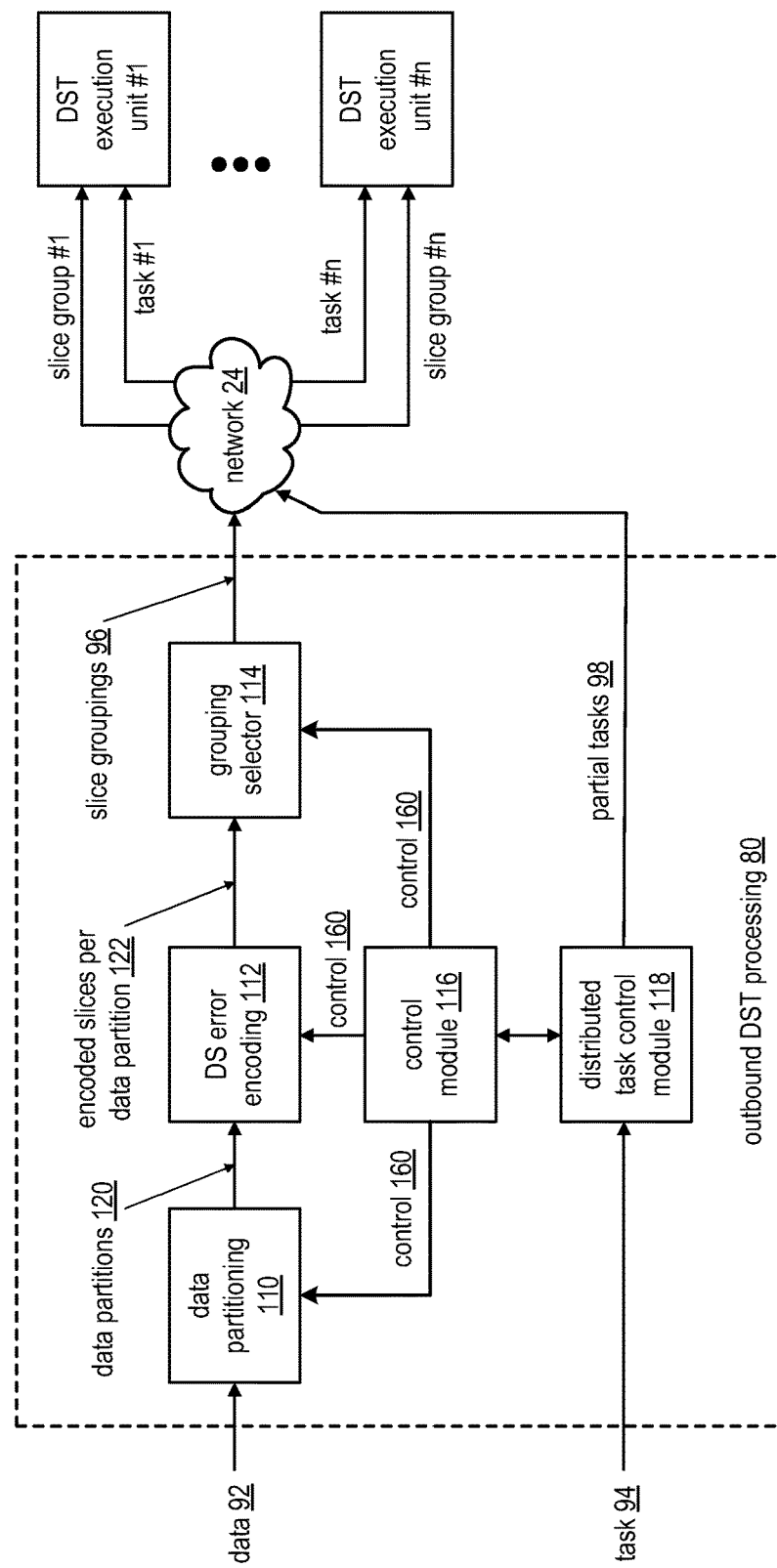
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
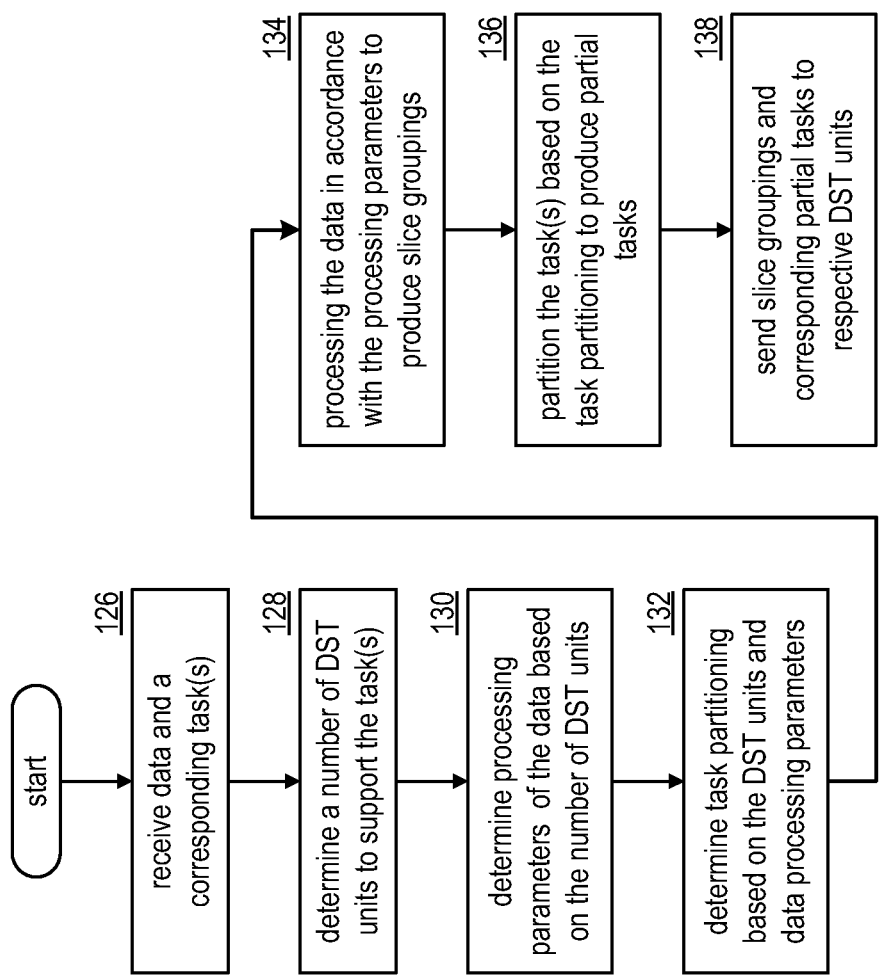
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
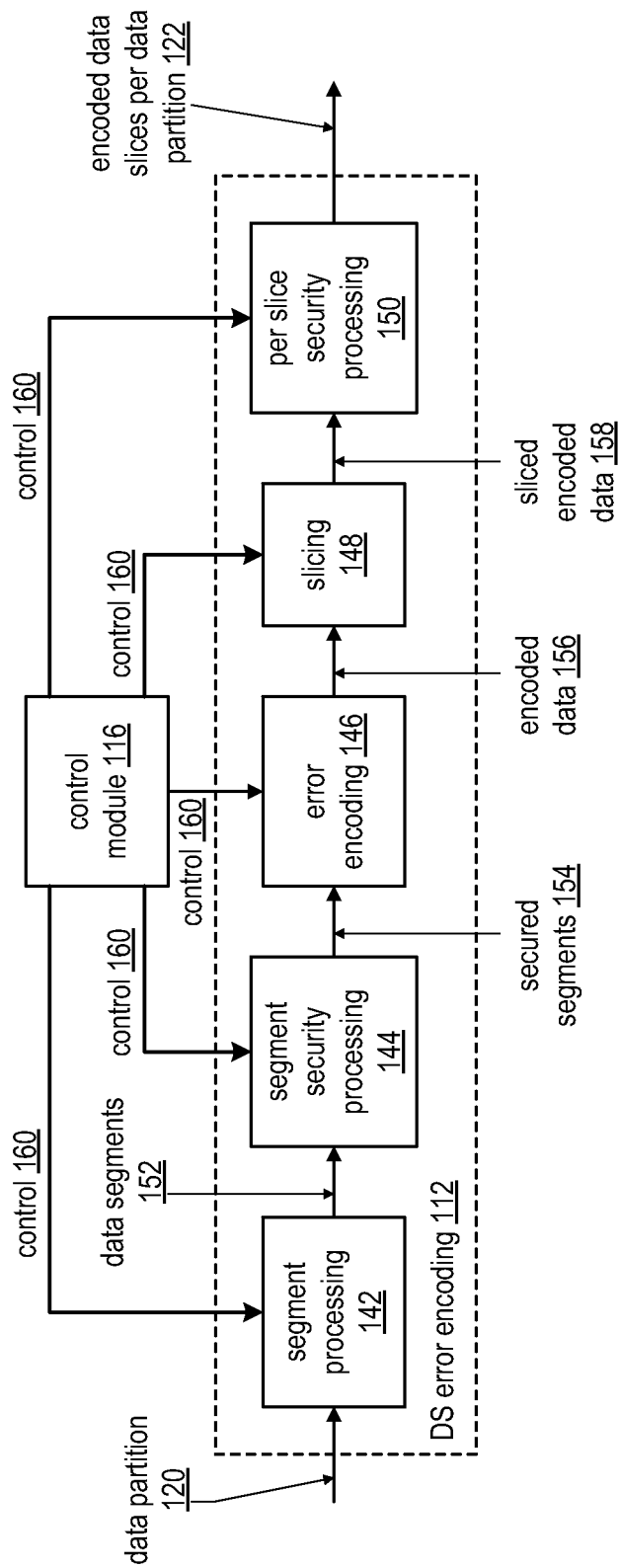
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
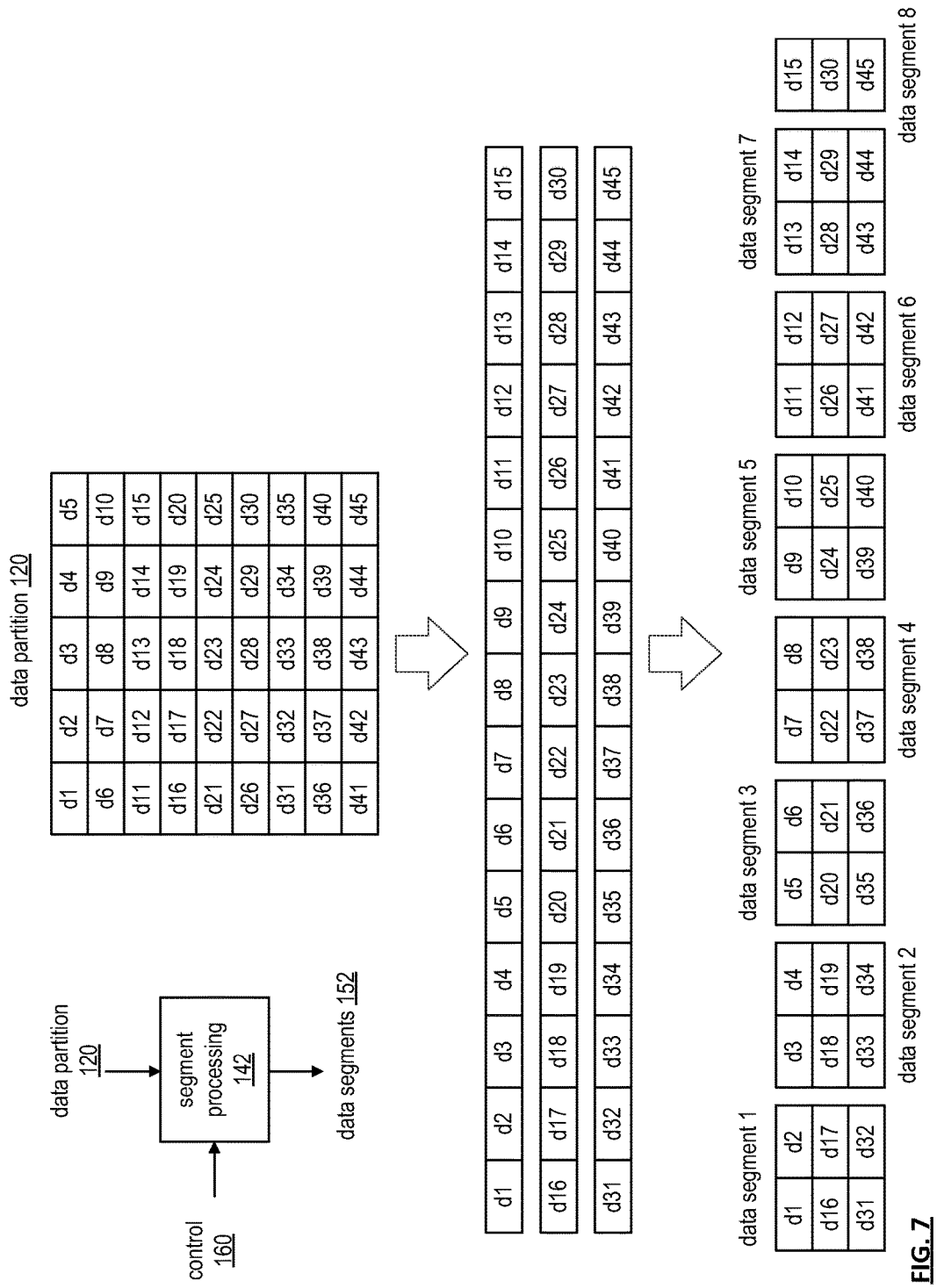
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
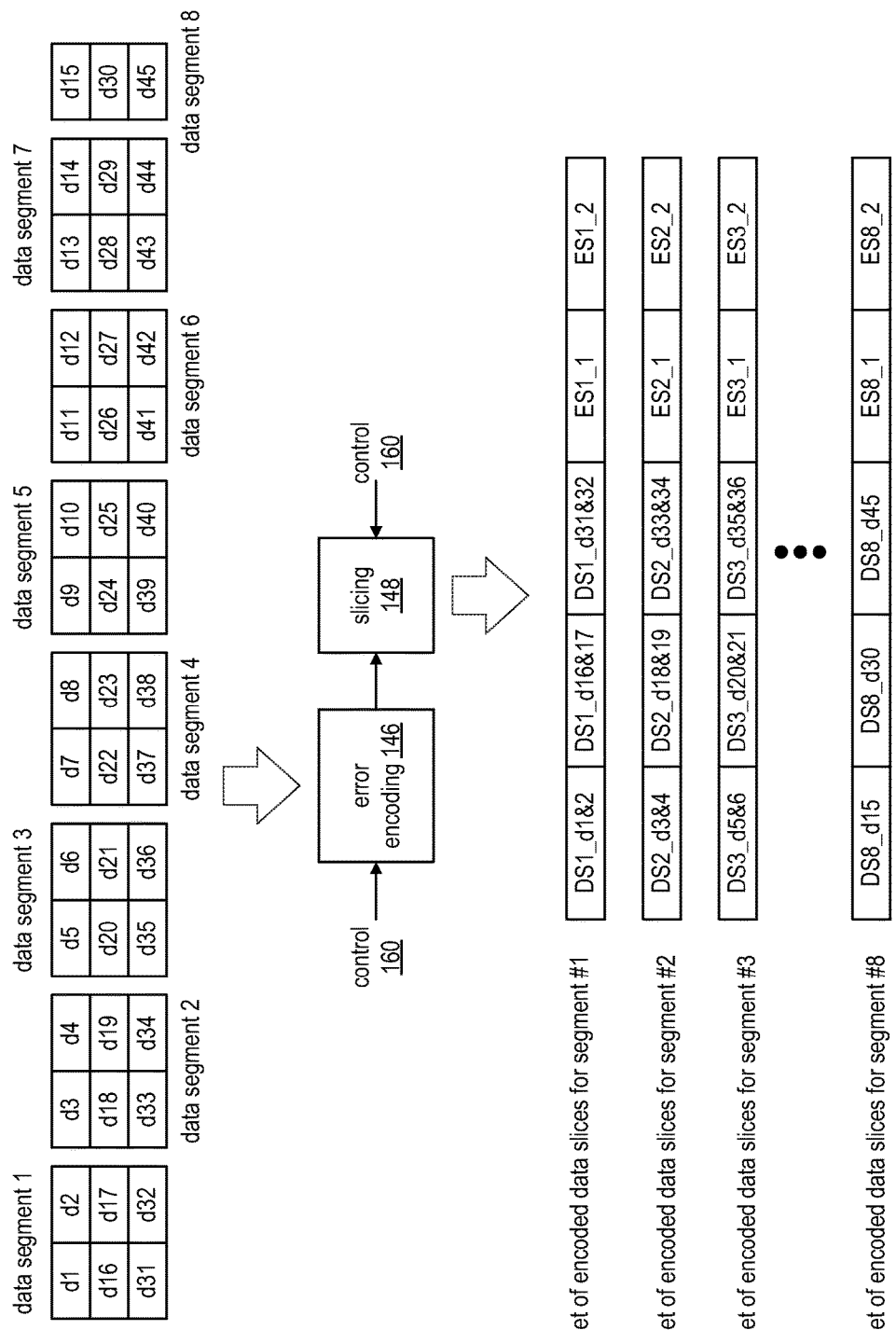
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
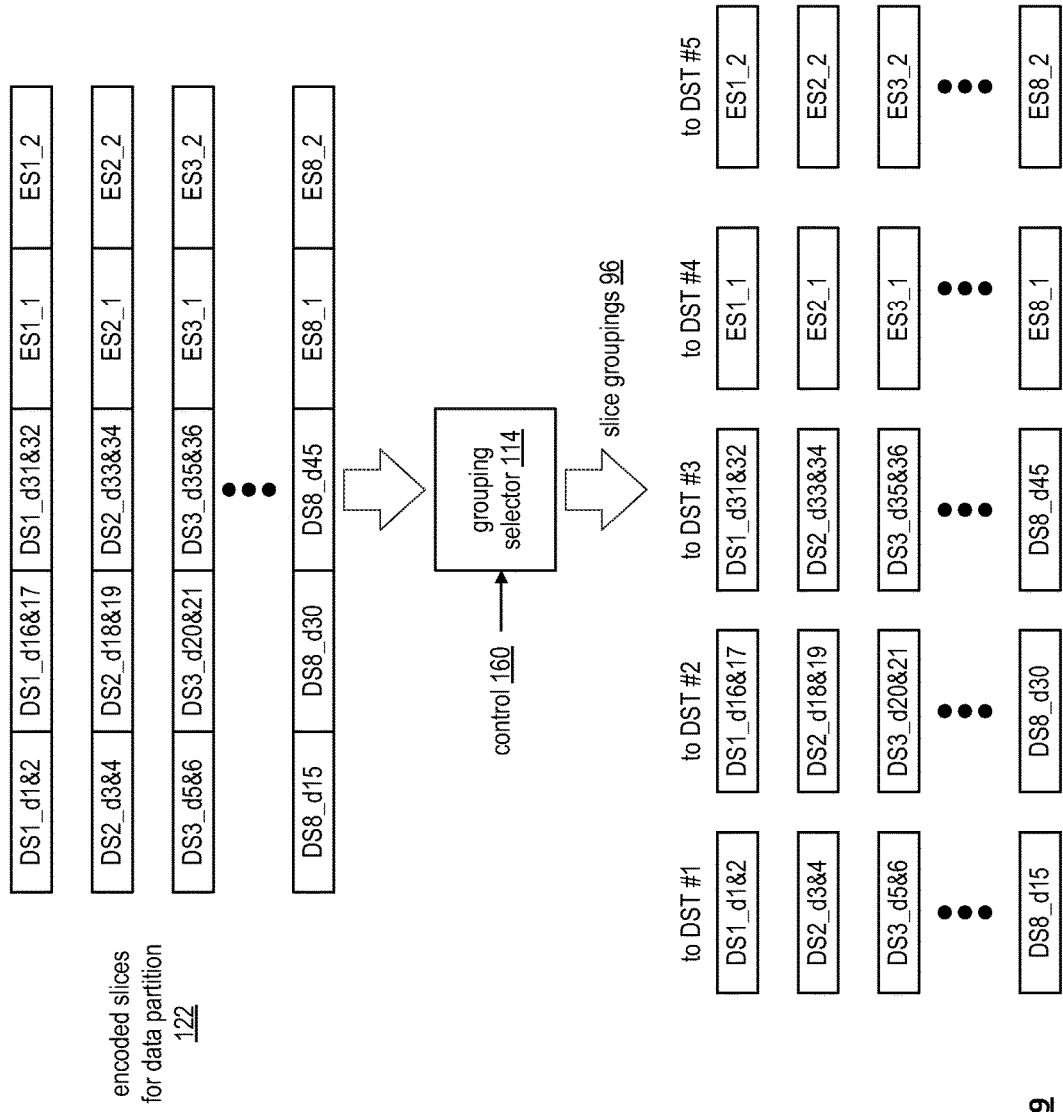
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
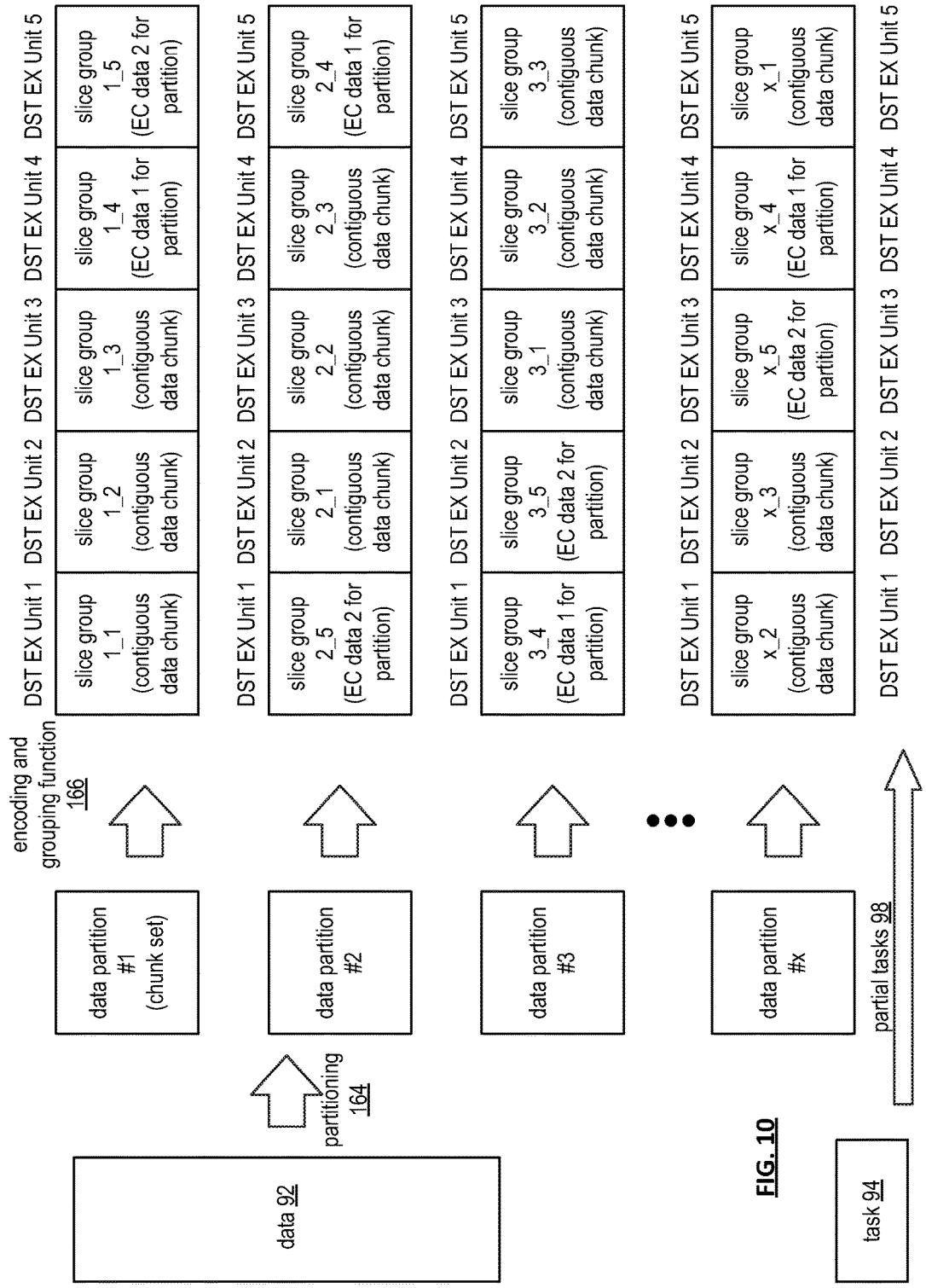
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
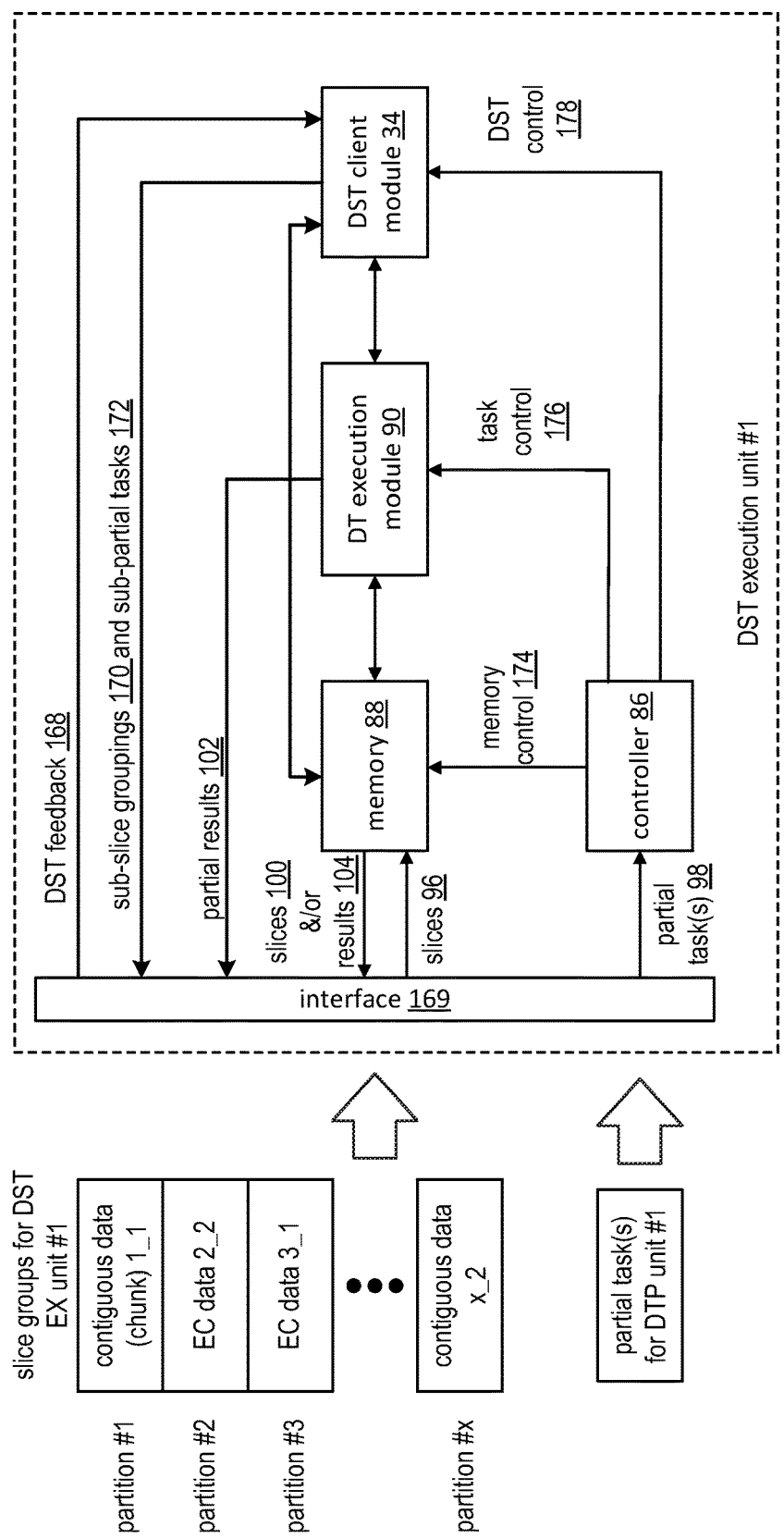
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
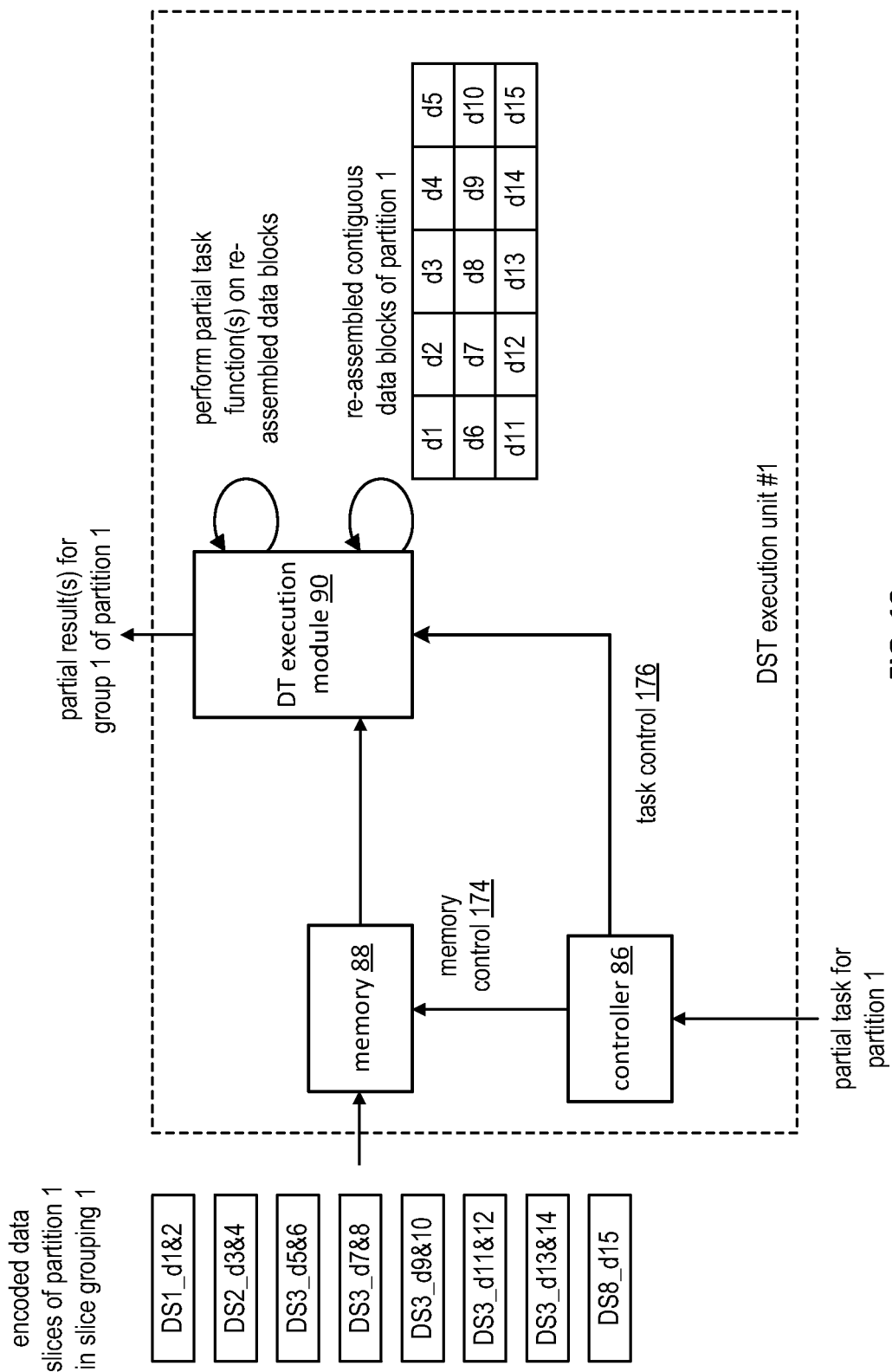
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
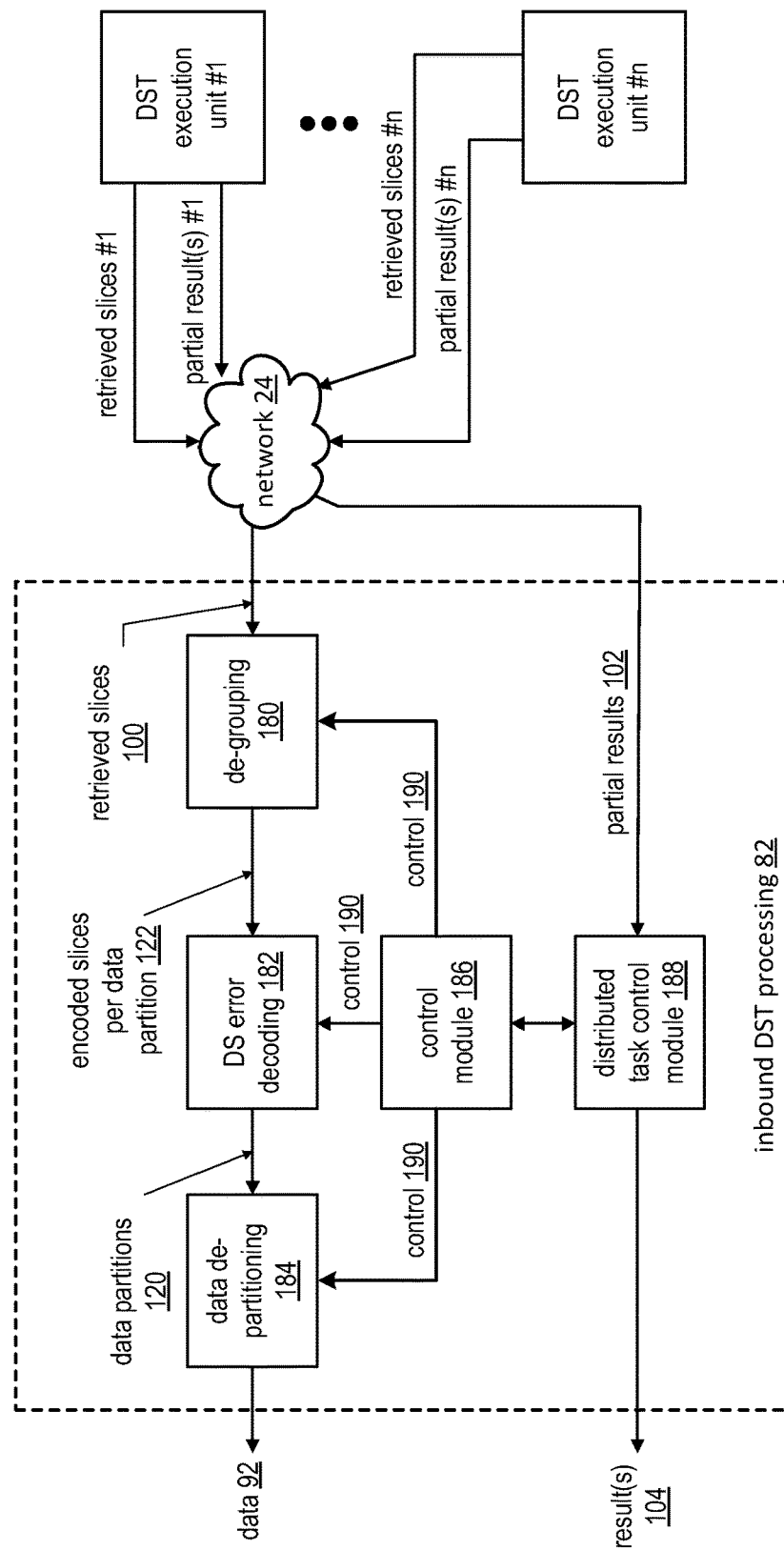
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
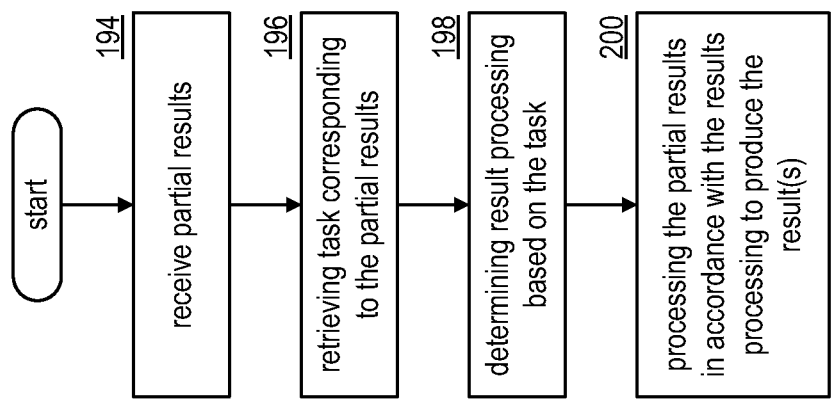
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
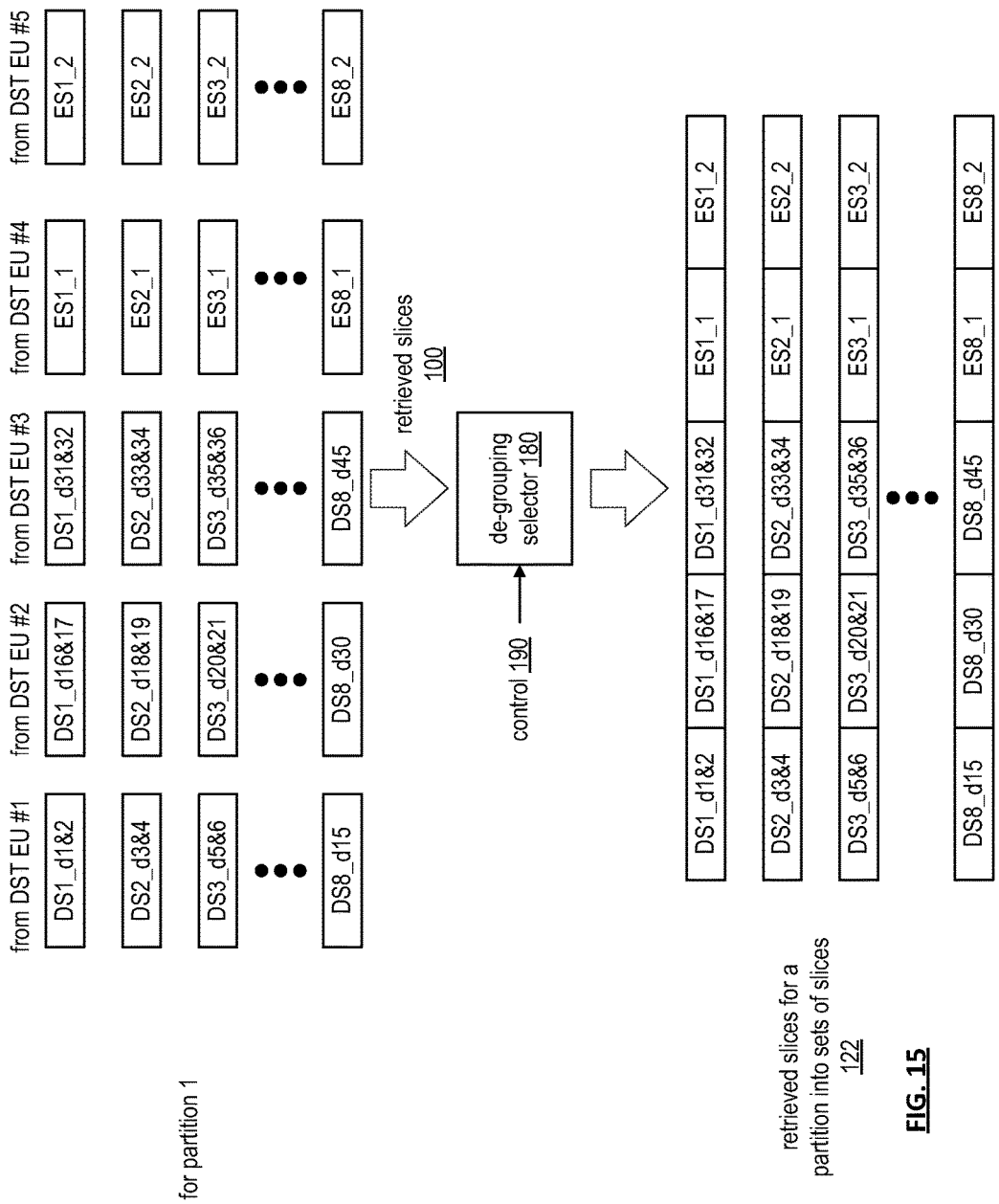
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
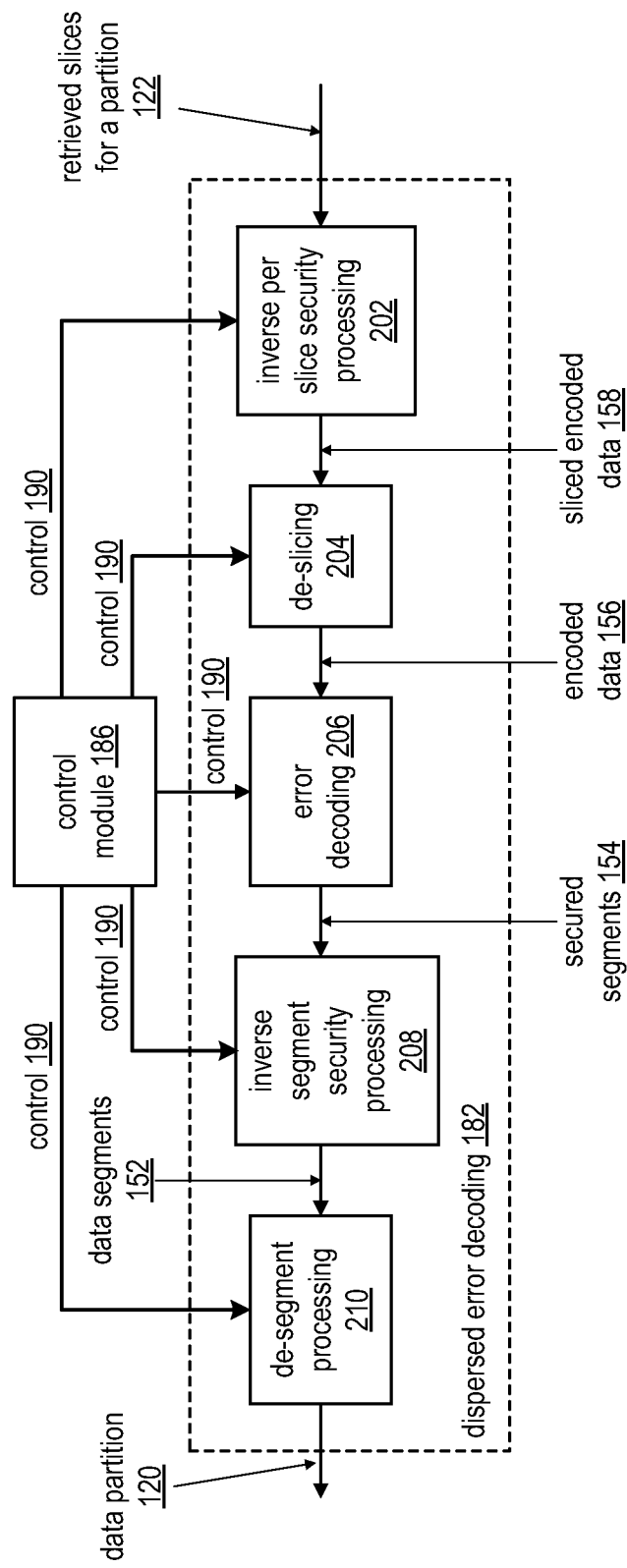
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
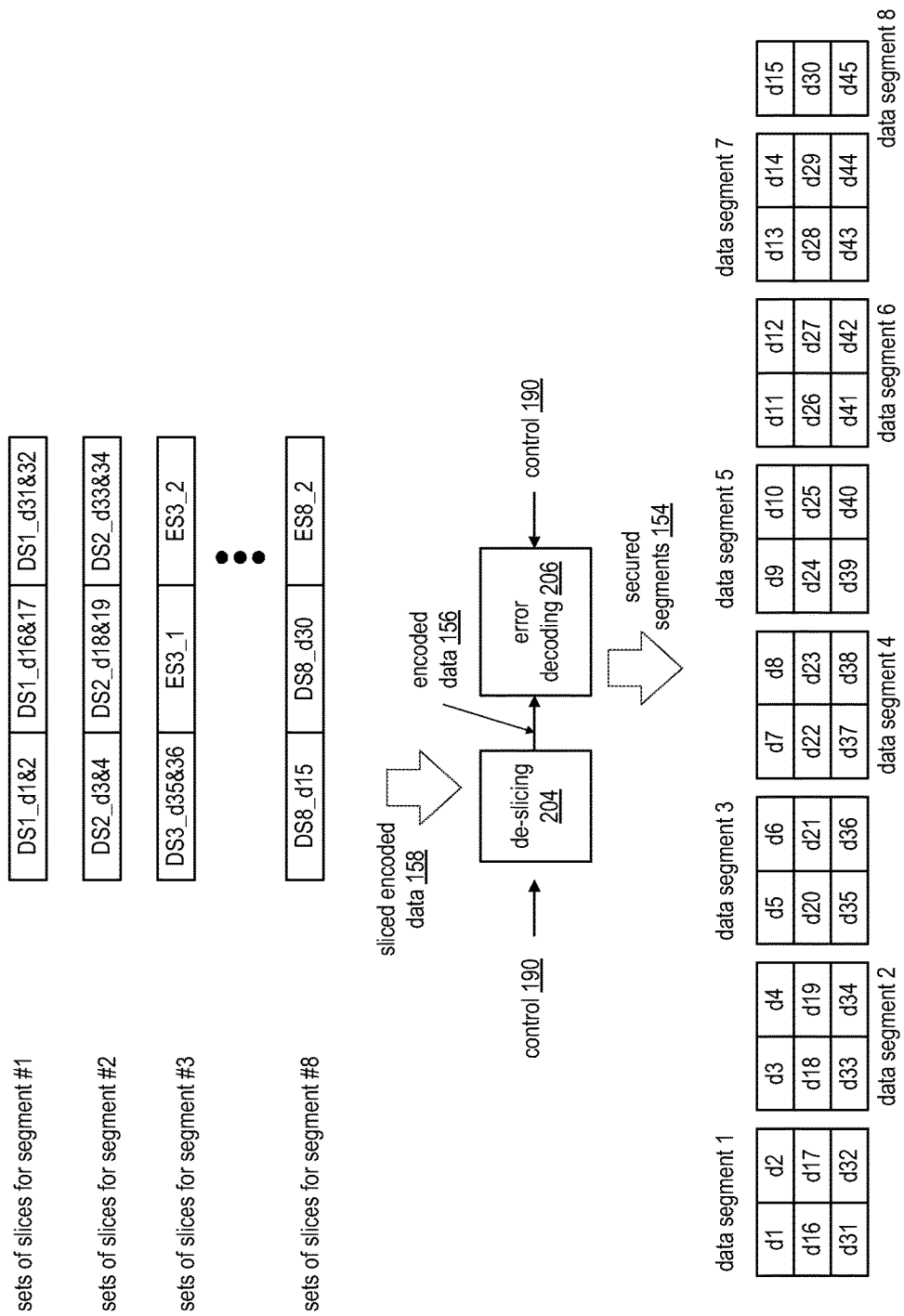
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
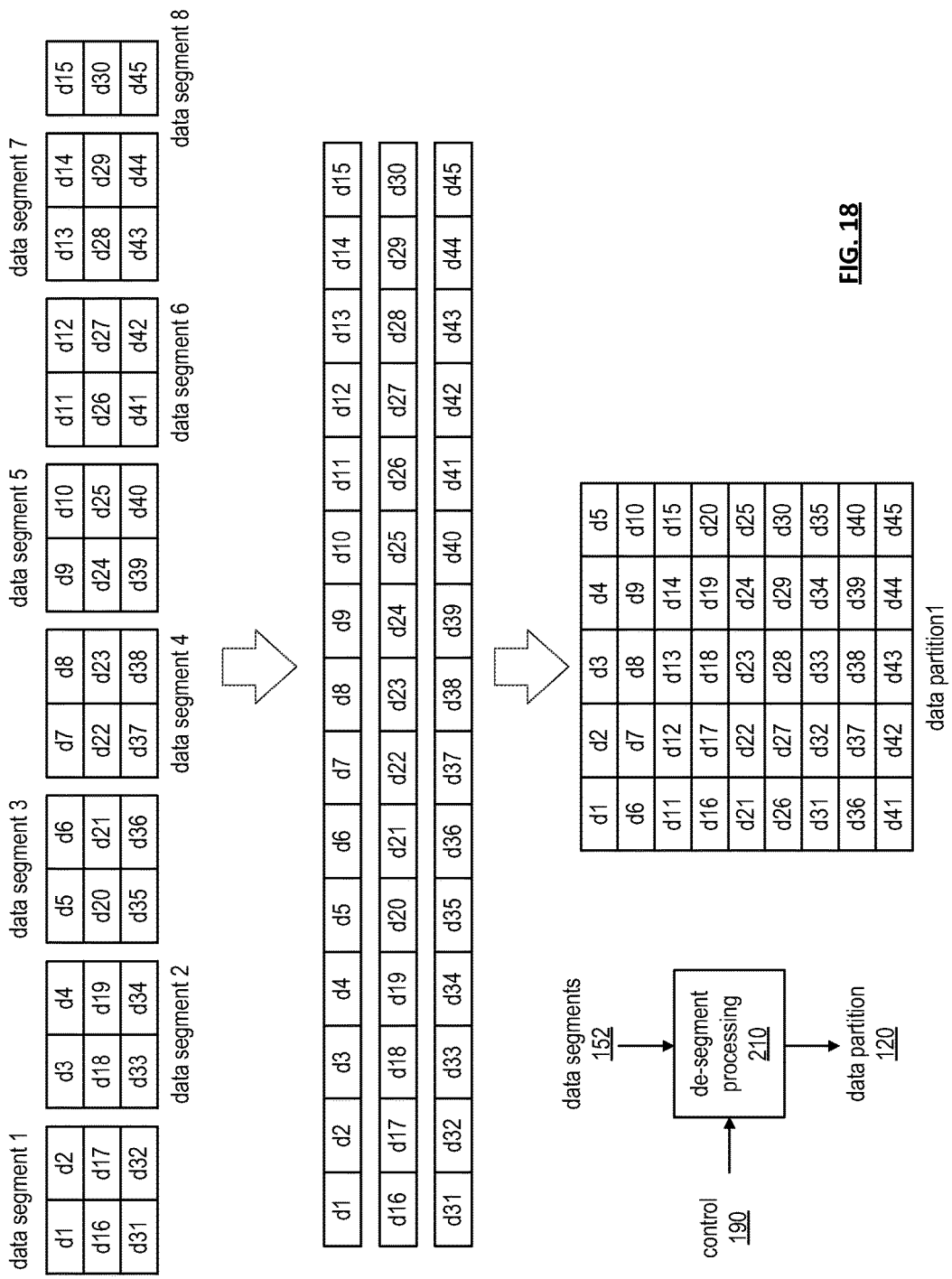
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
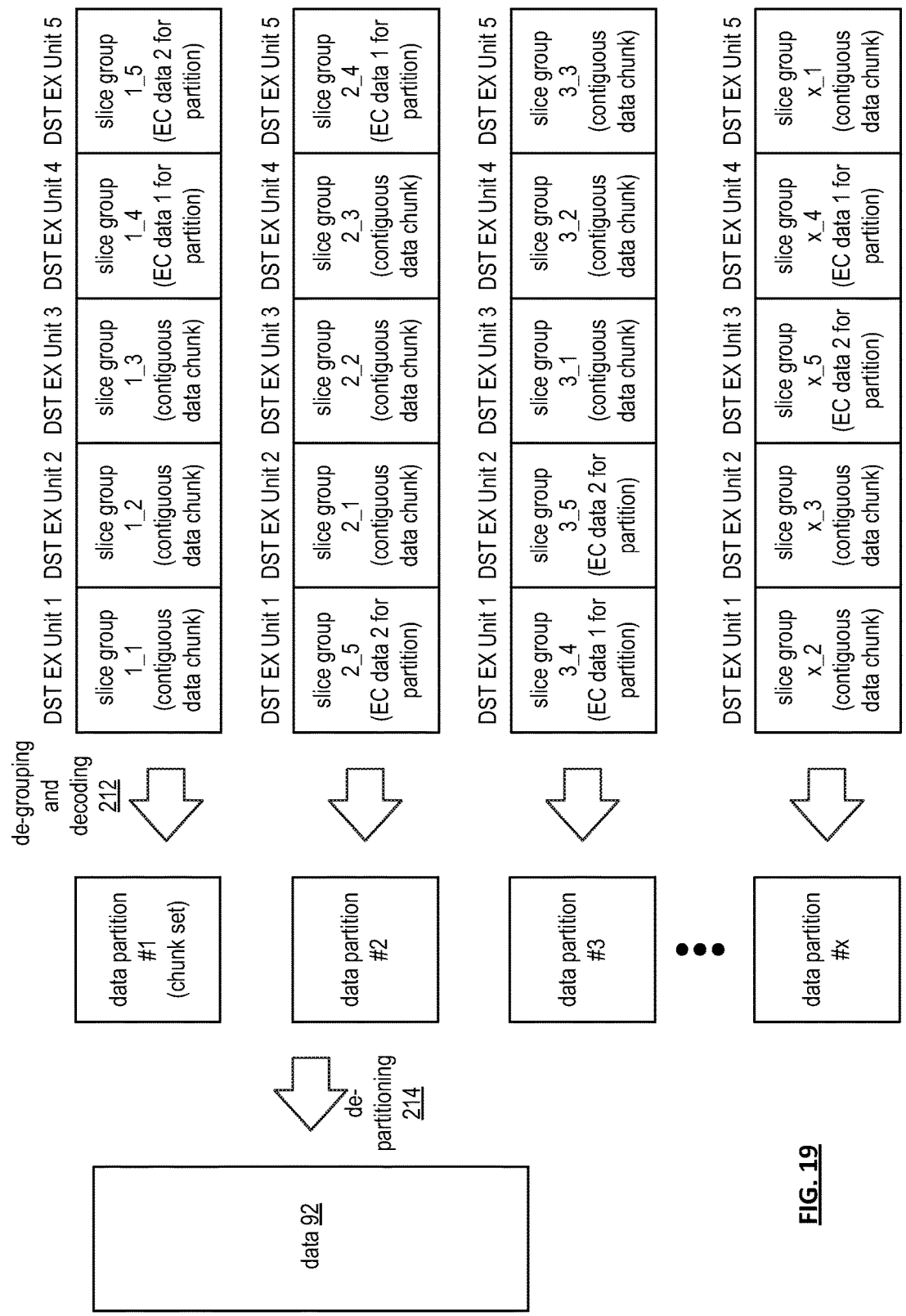
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
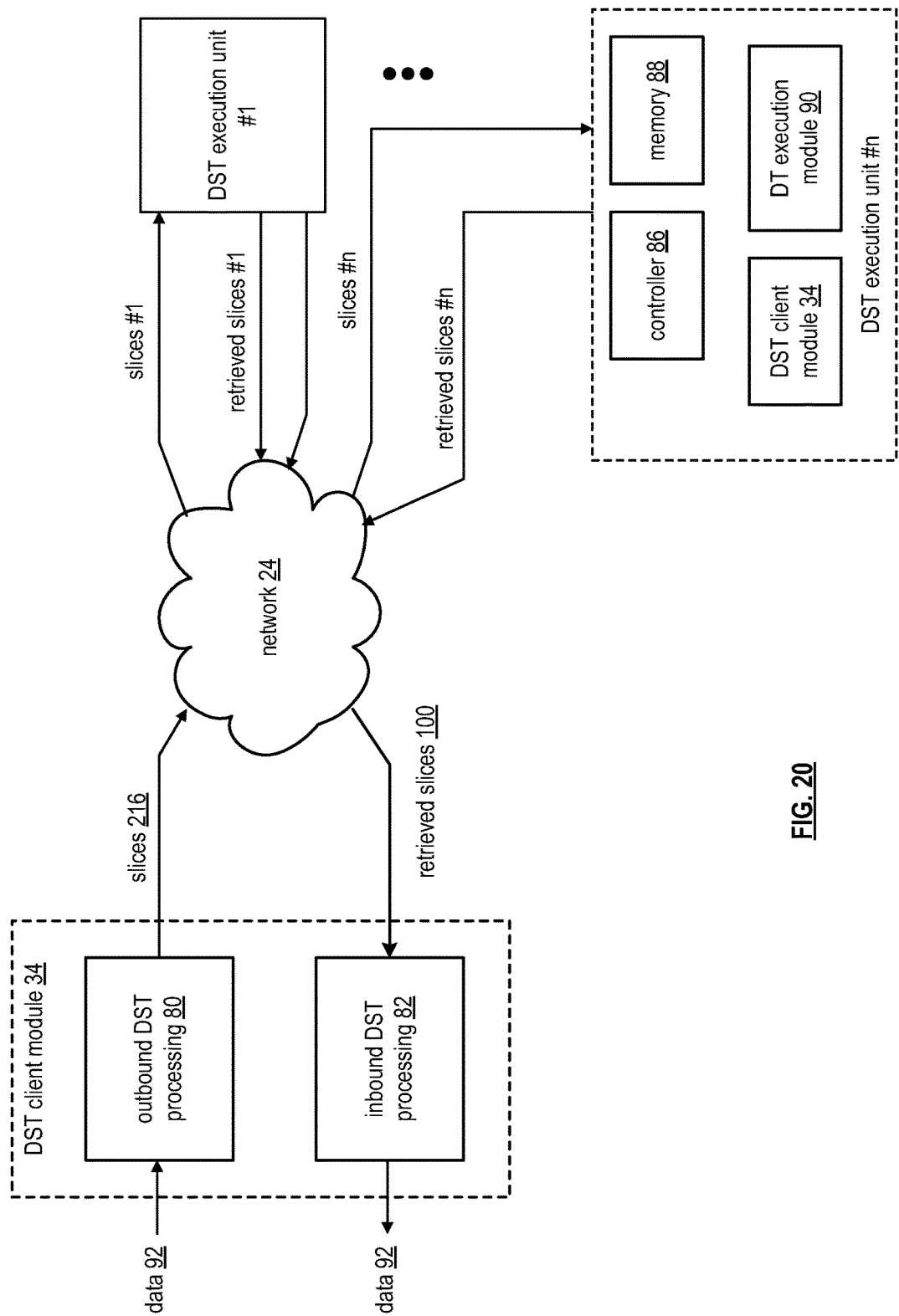
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
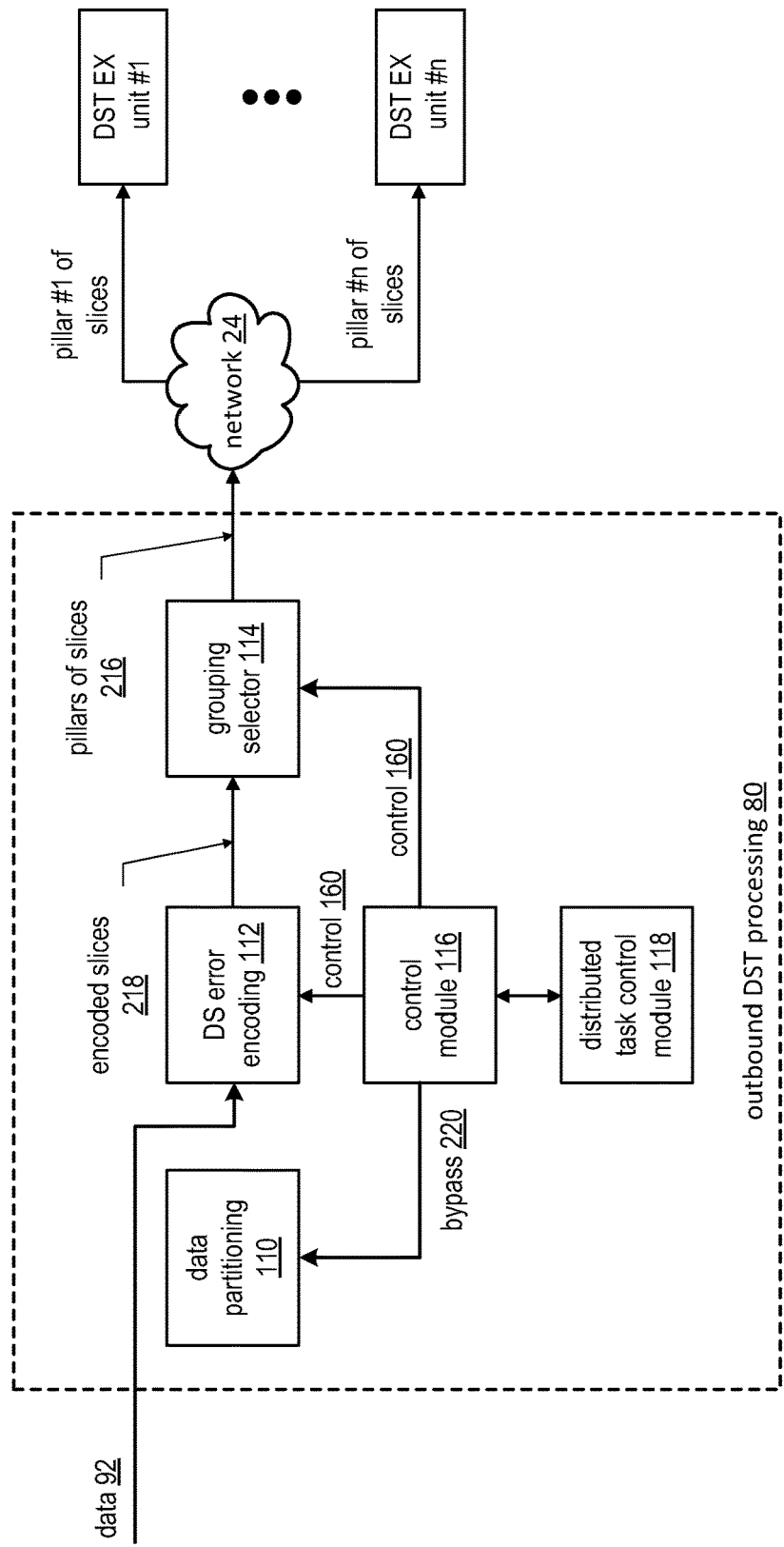
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
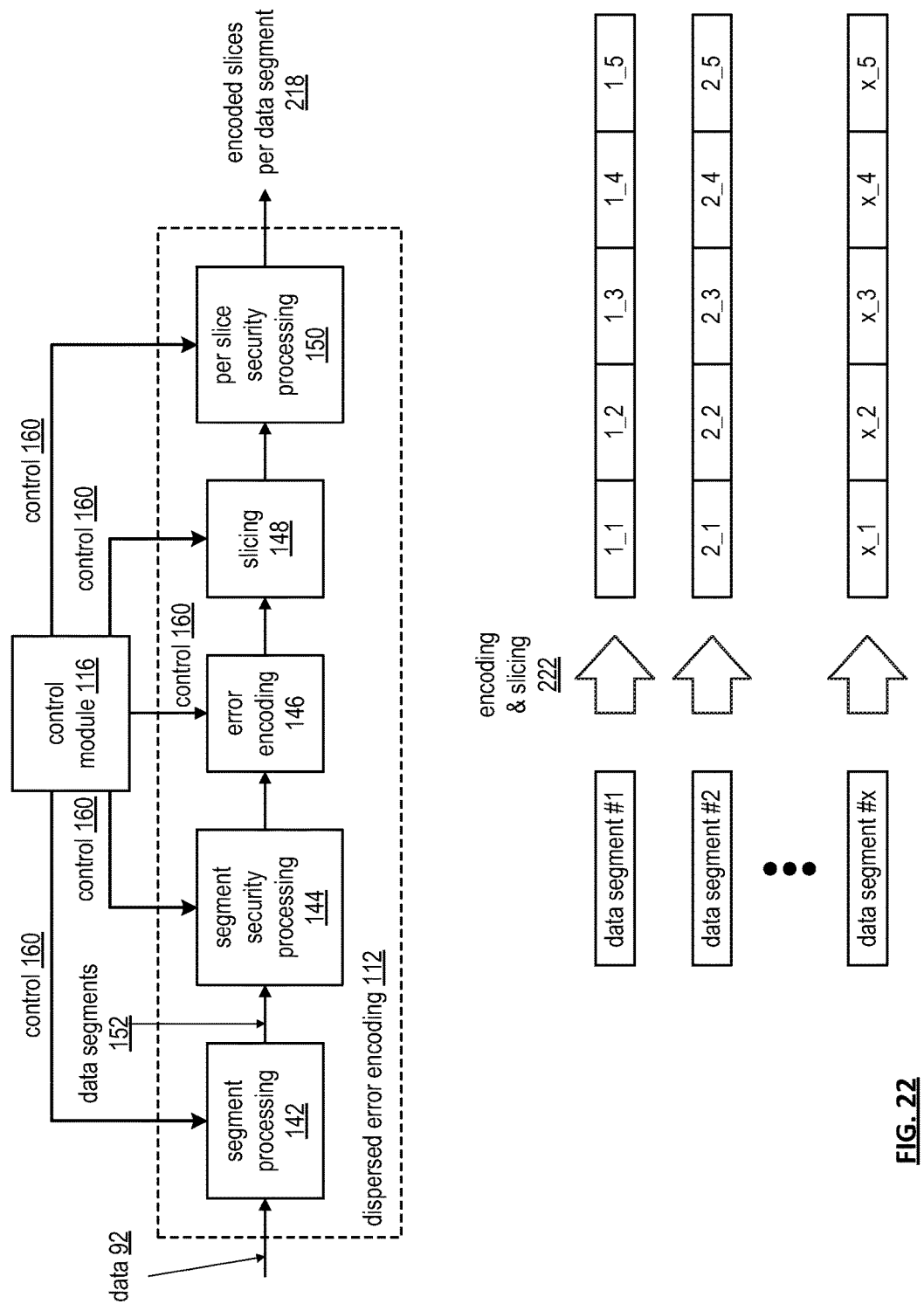
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
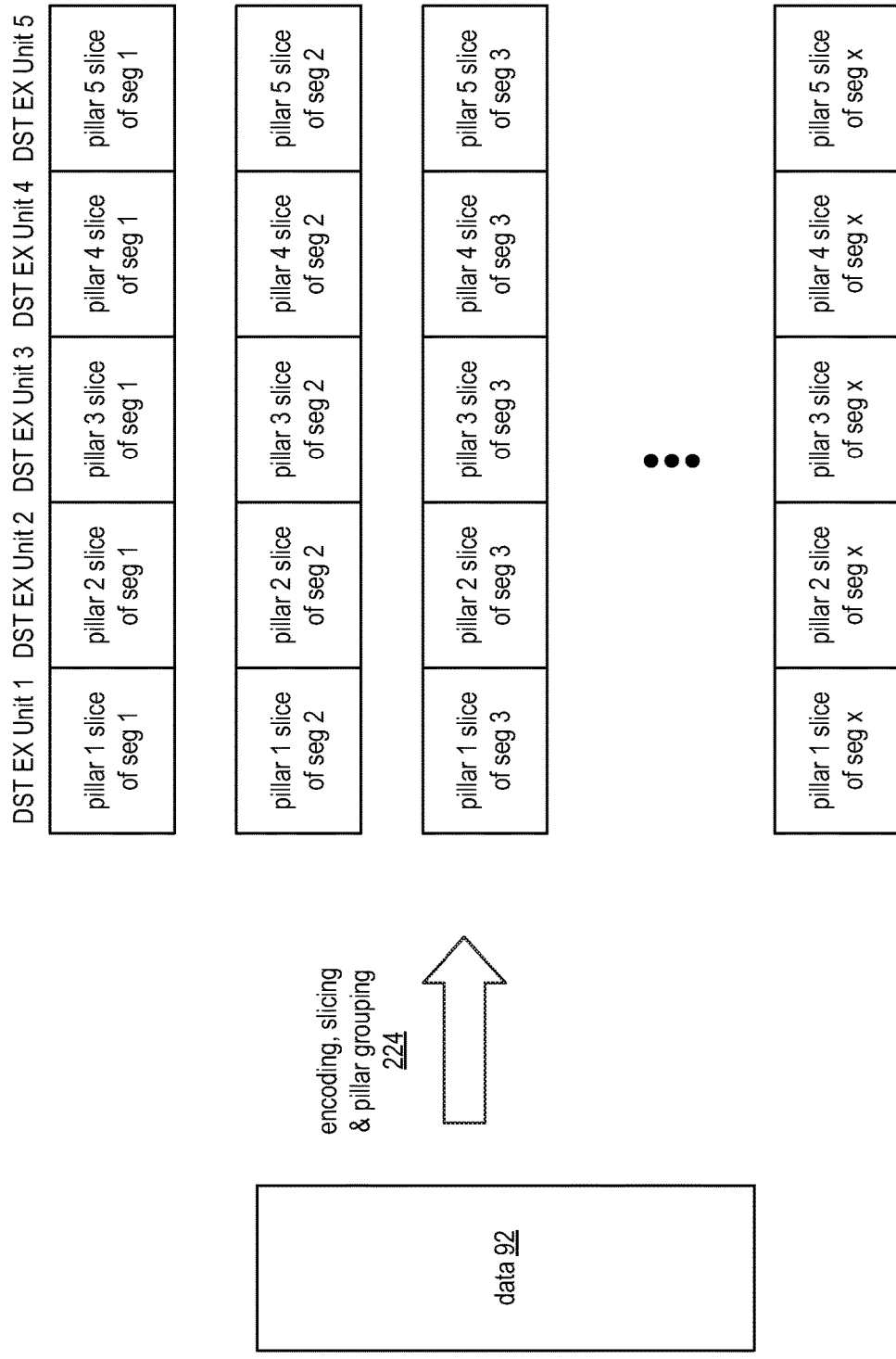
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

Figure 24:
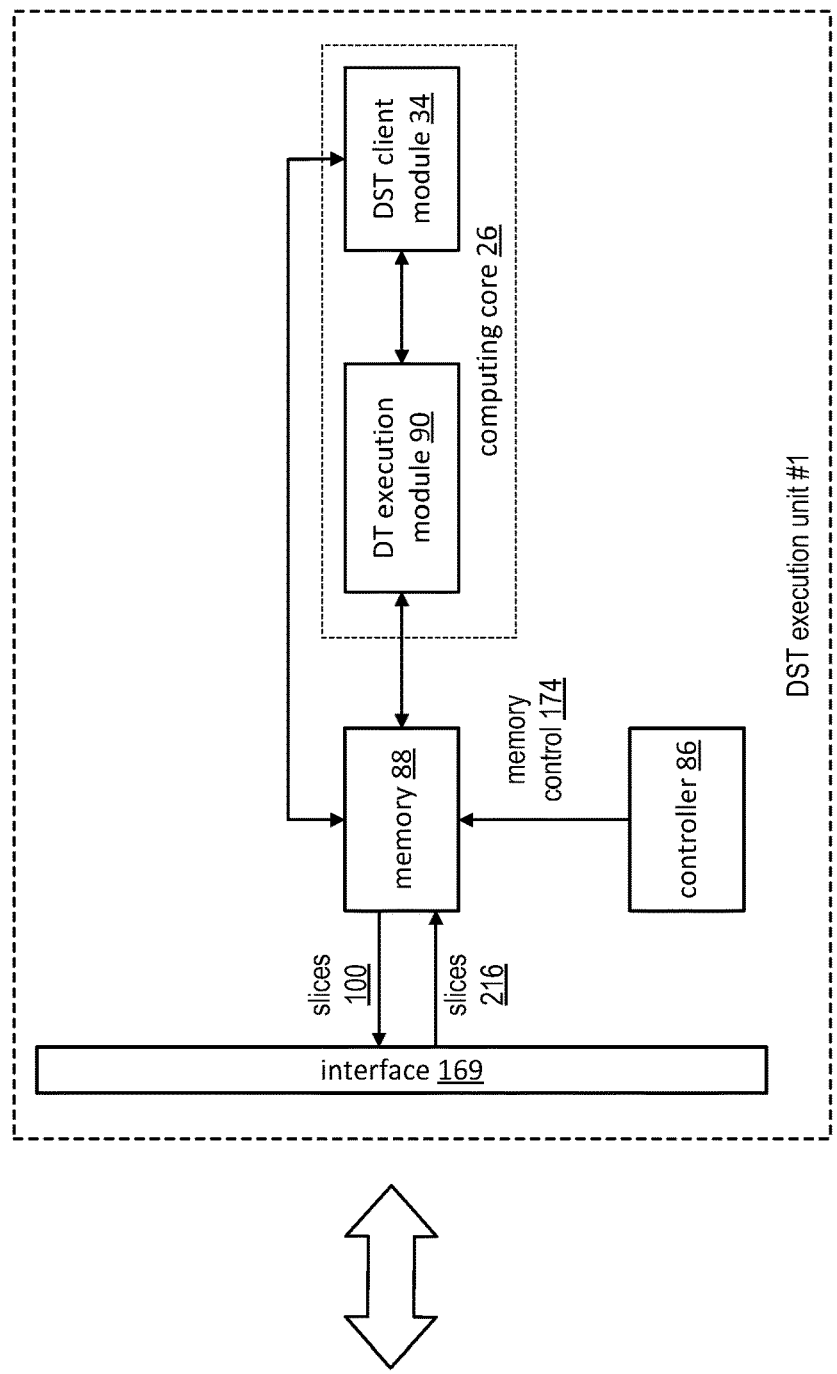
FIG. 24 is a diagram of an example of a storage operation of a DST execution unit in accordance with the present invention.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
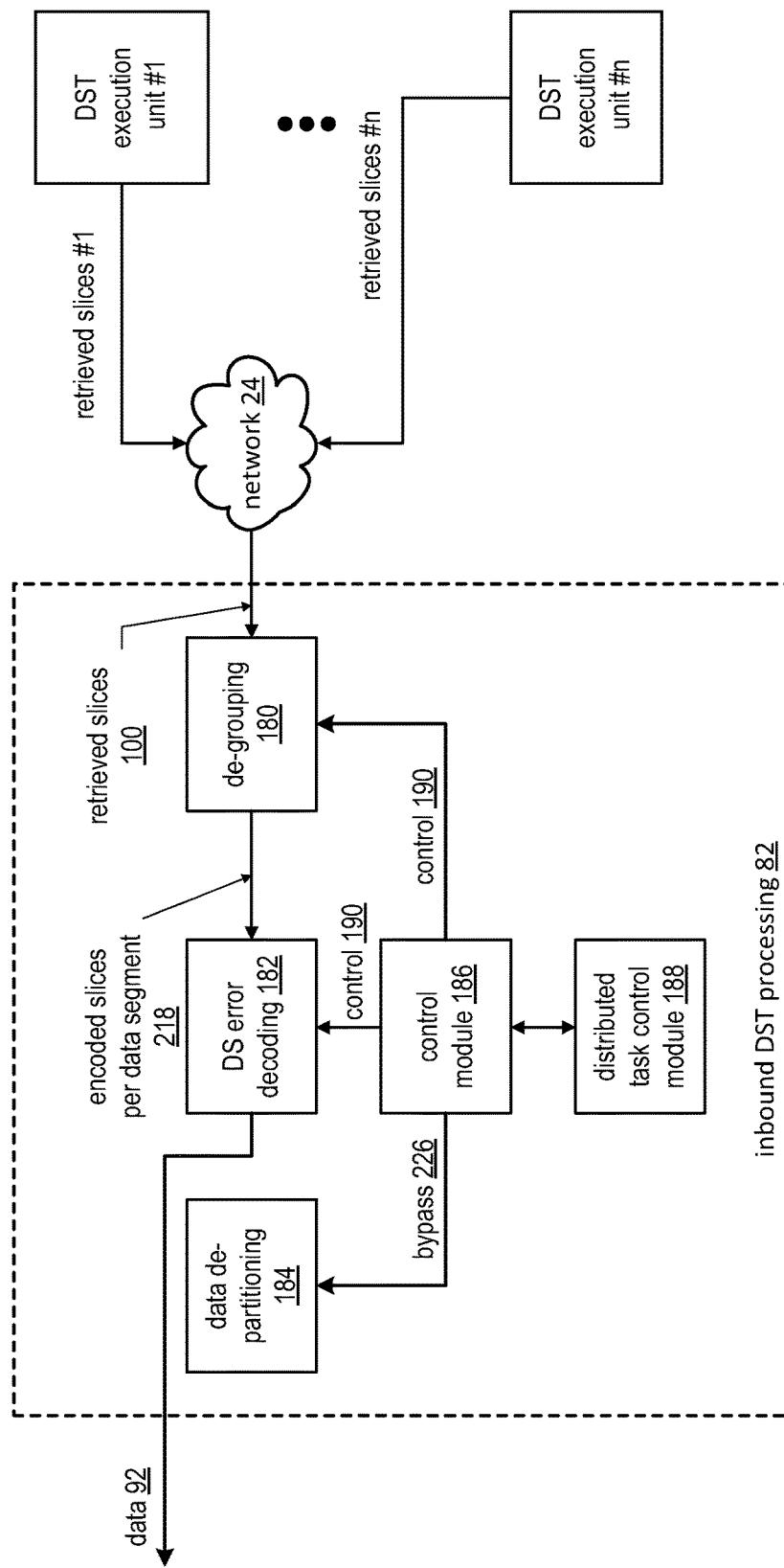
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
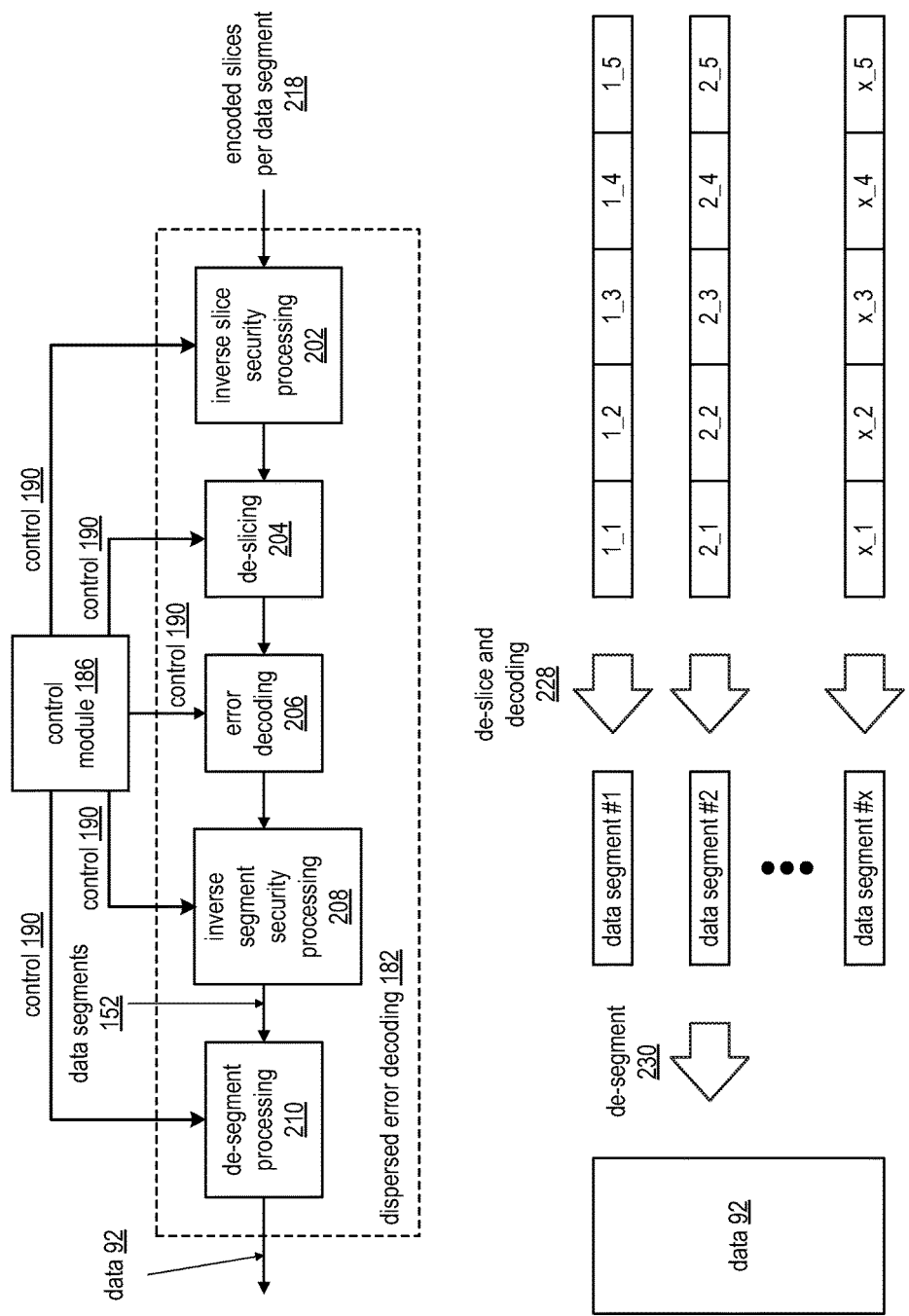
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
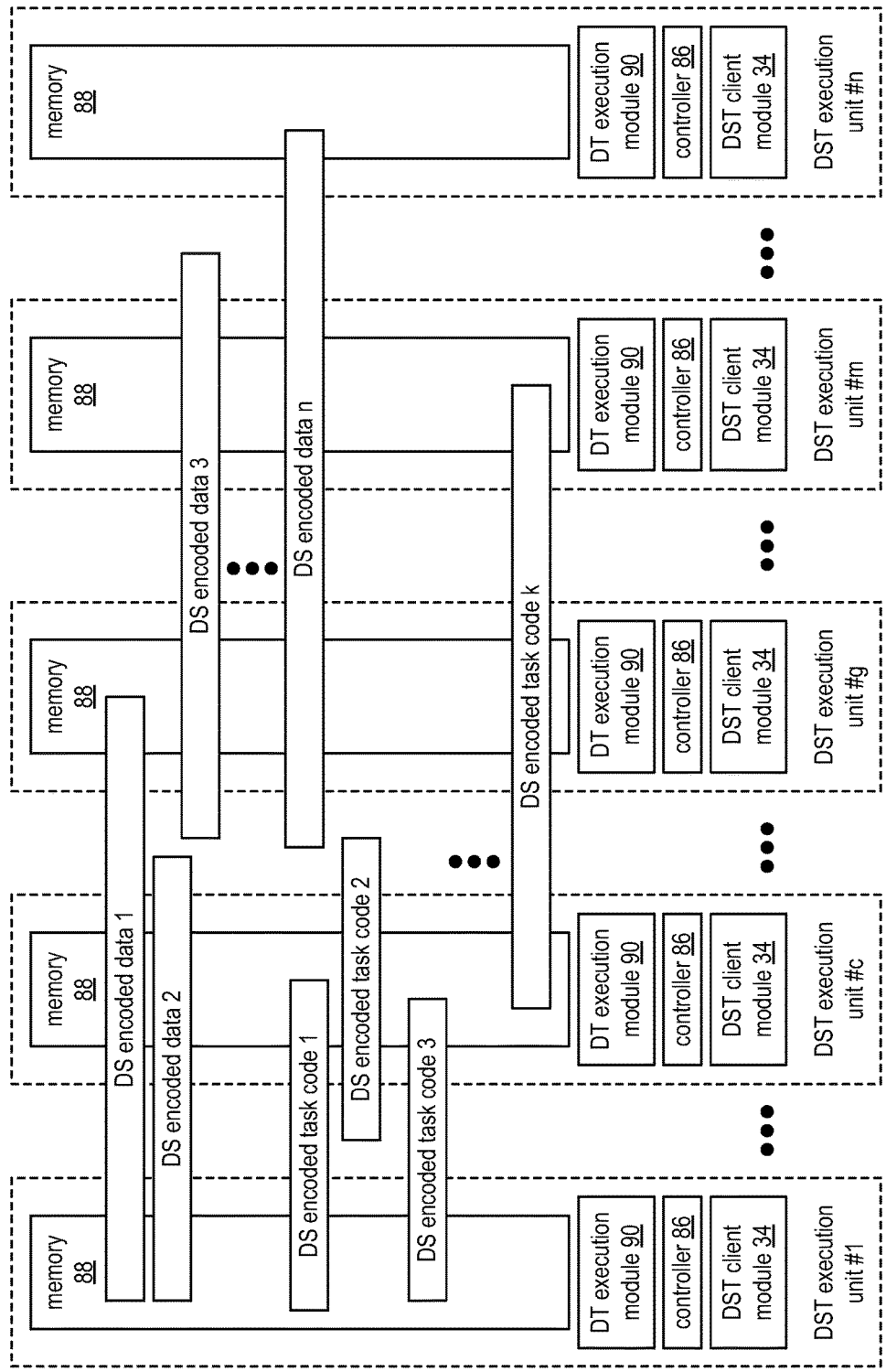
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
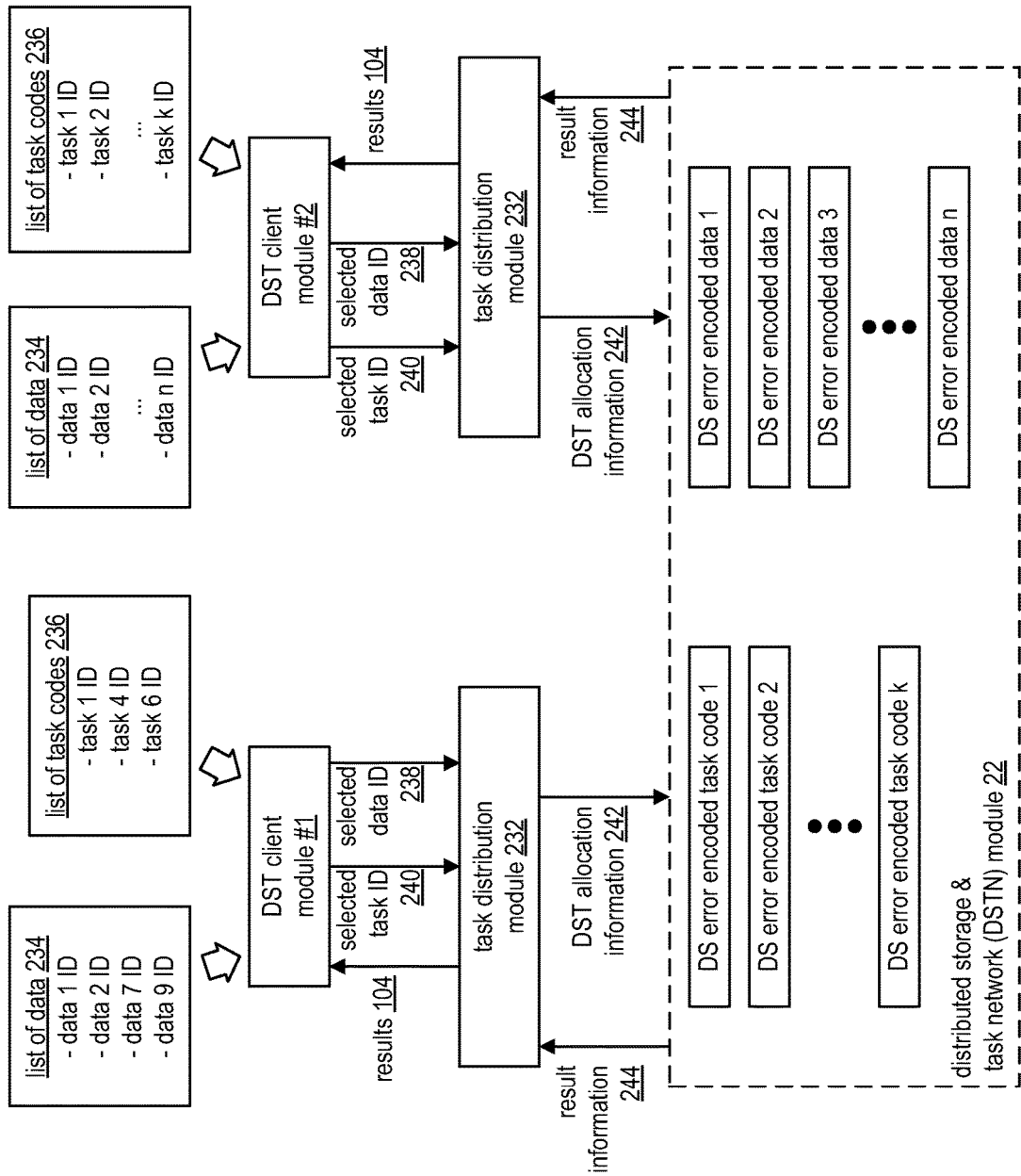
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID)

includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
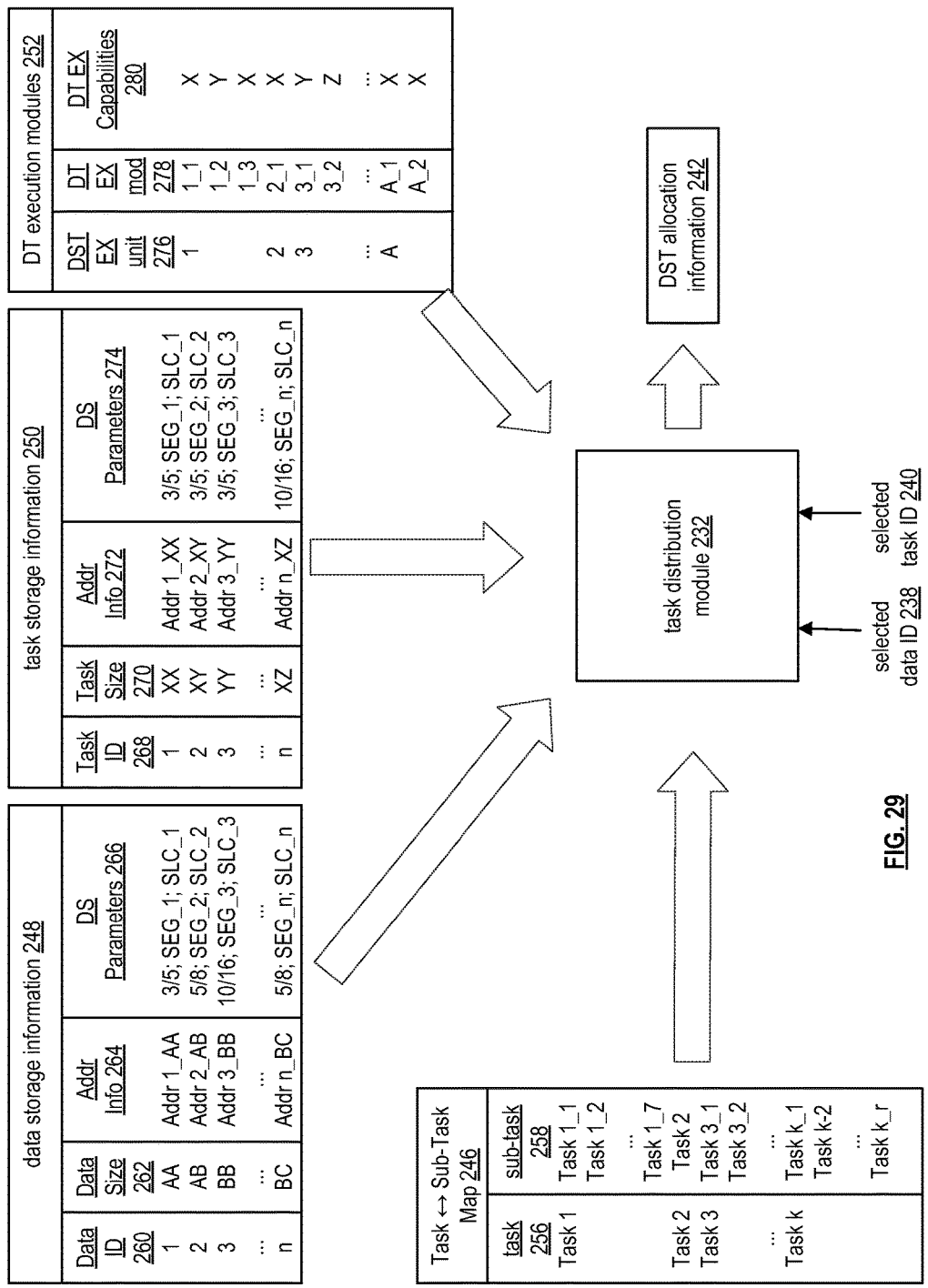
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
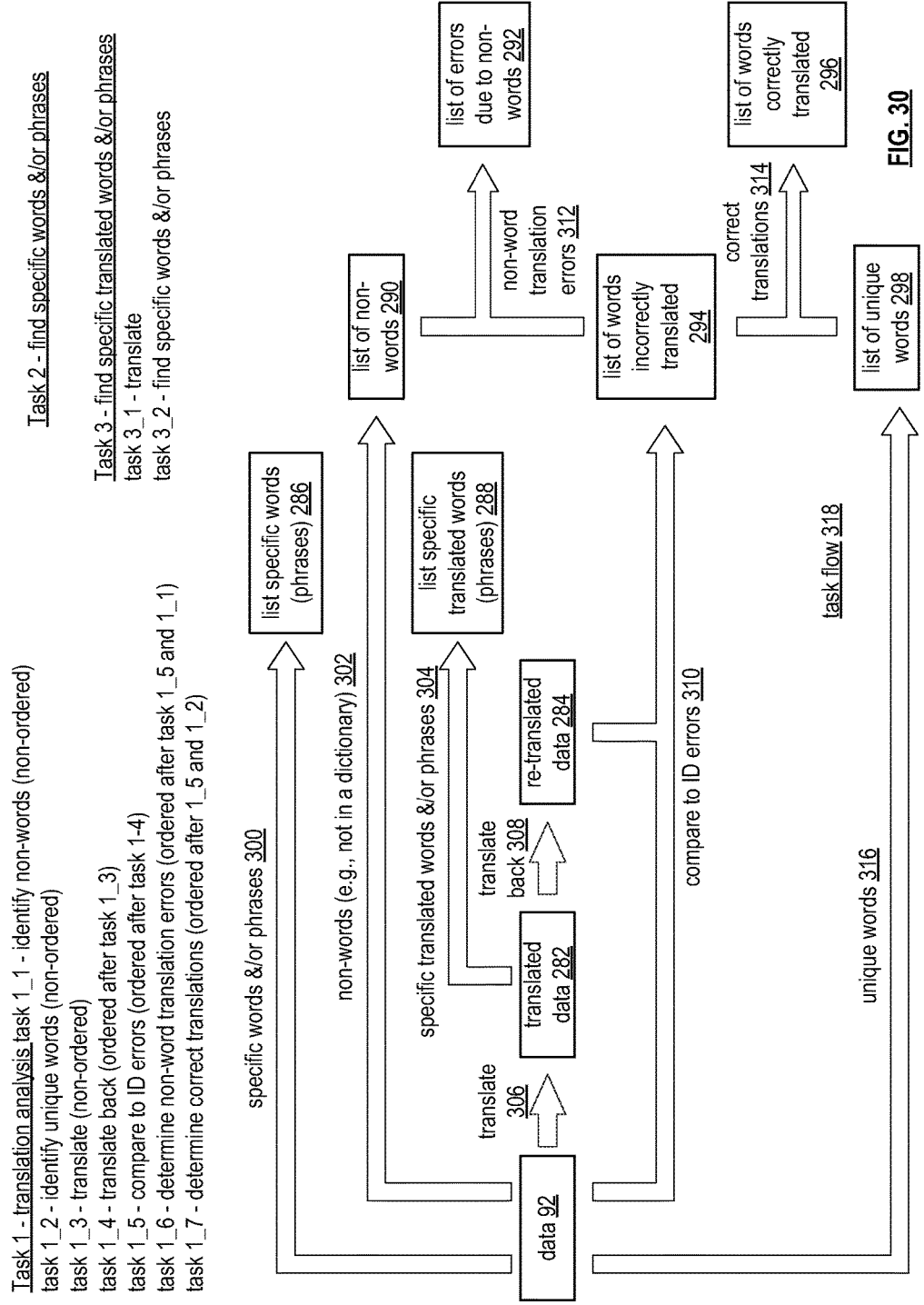
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
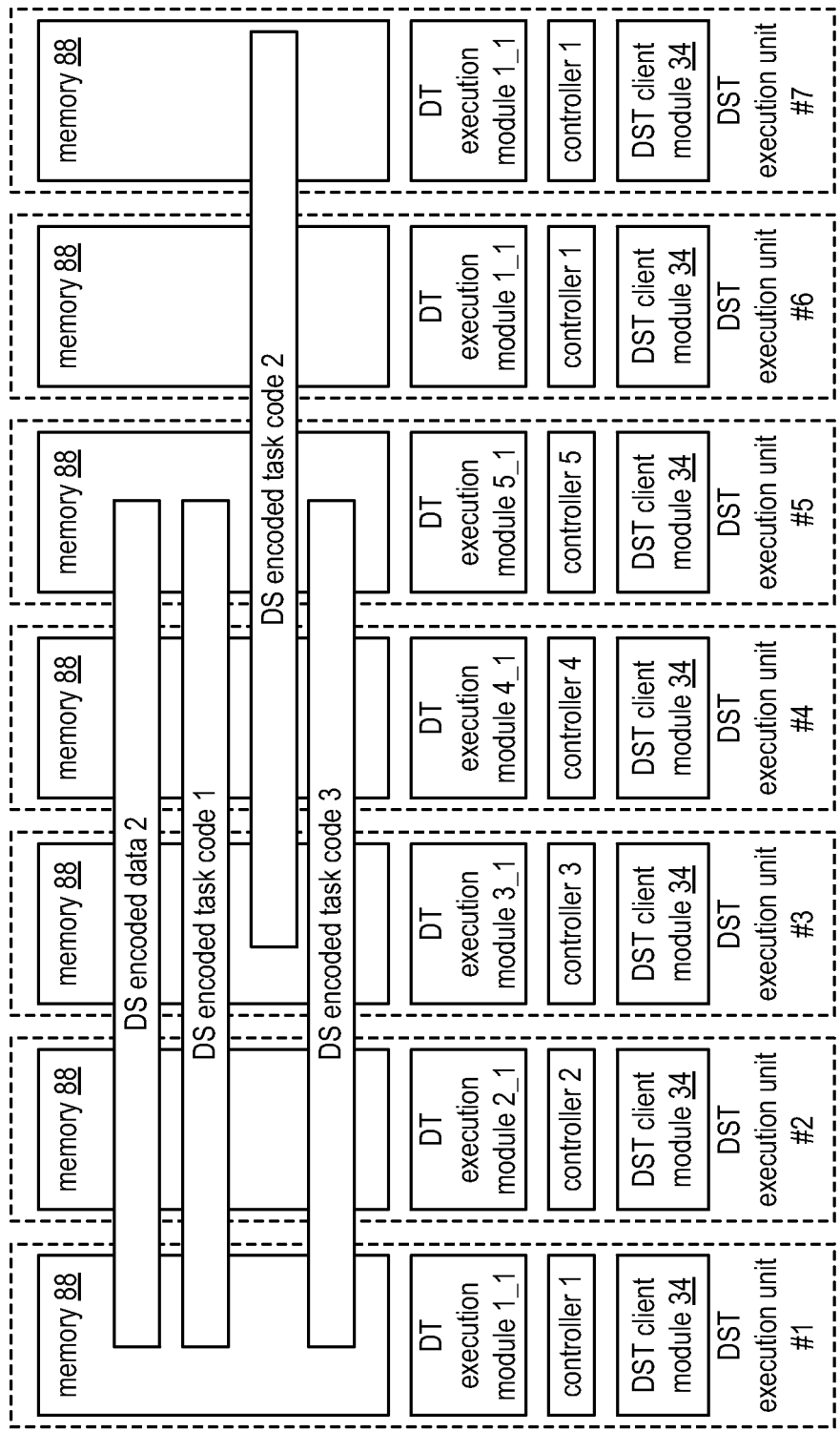
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1st through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1st through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
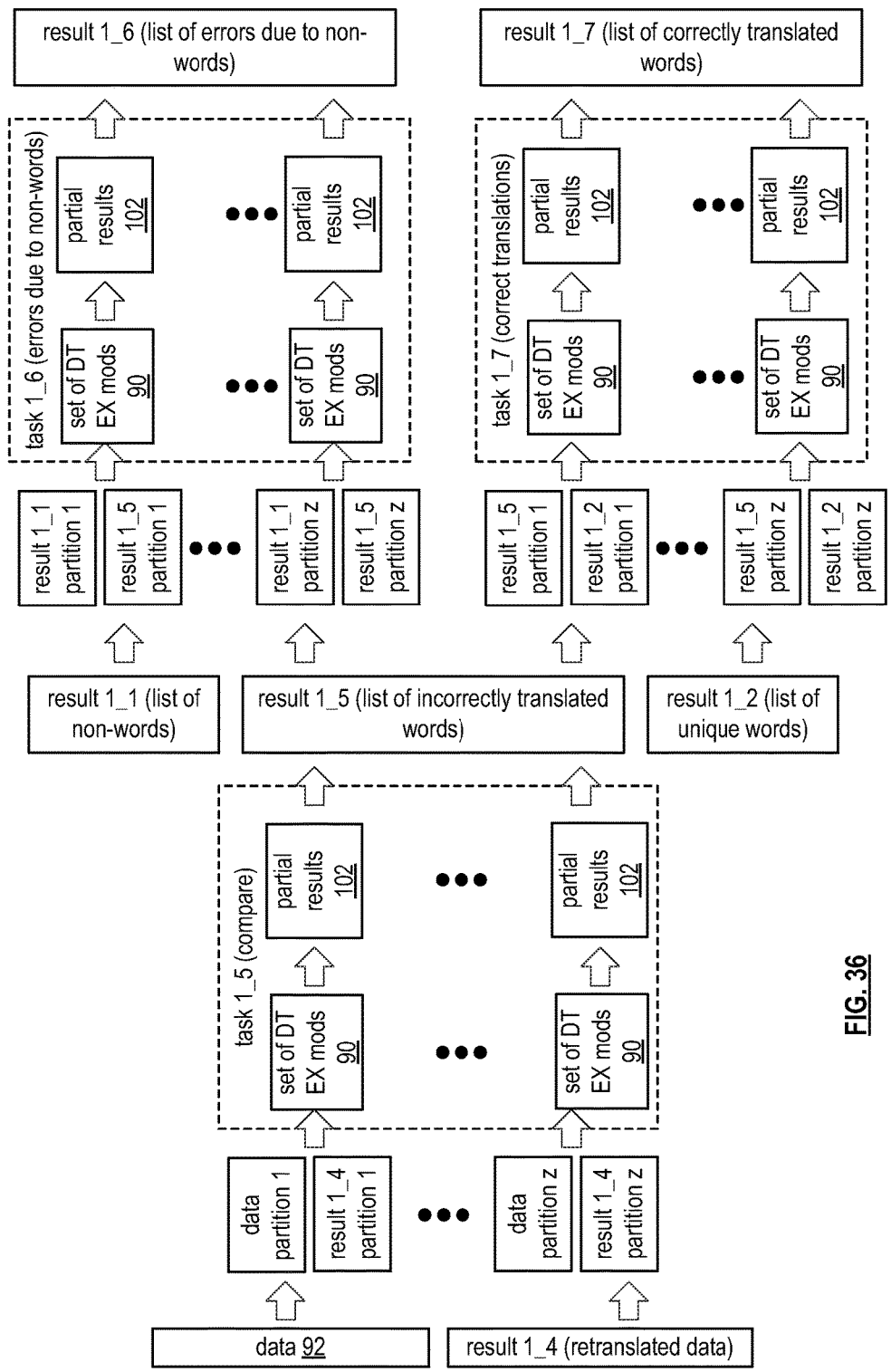

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
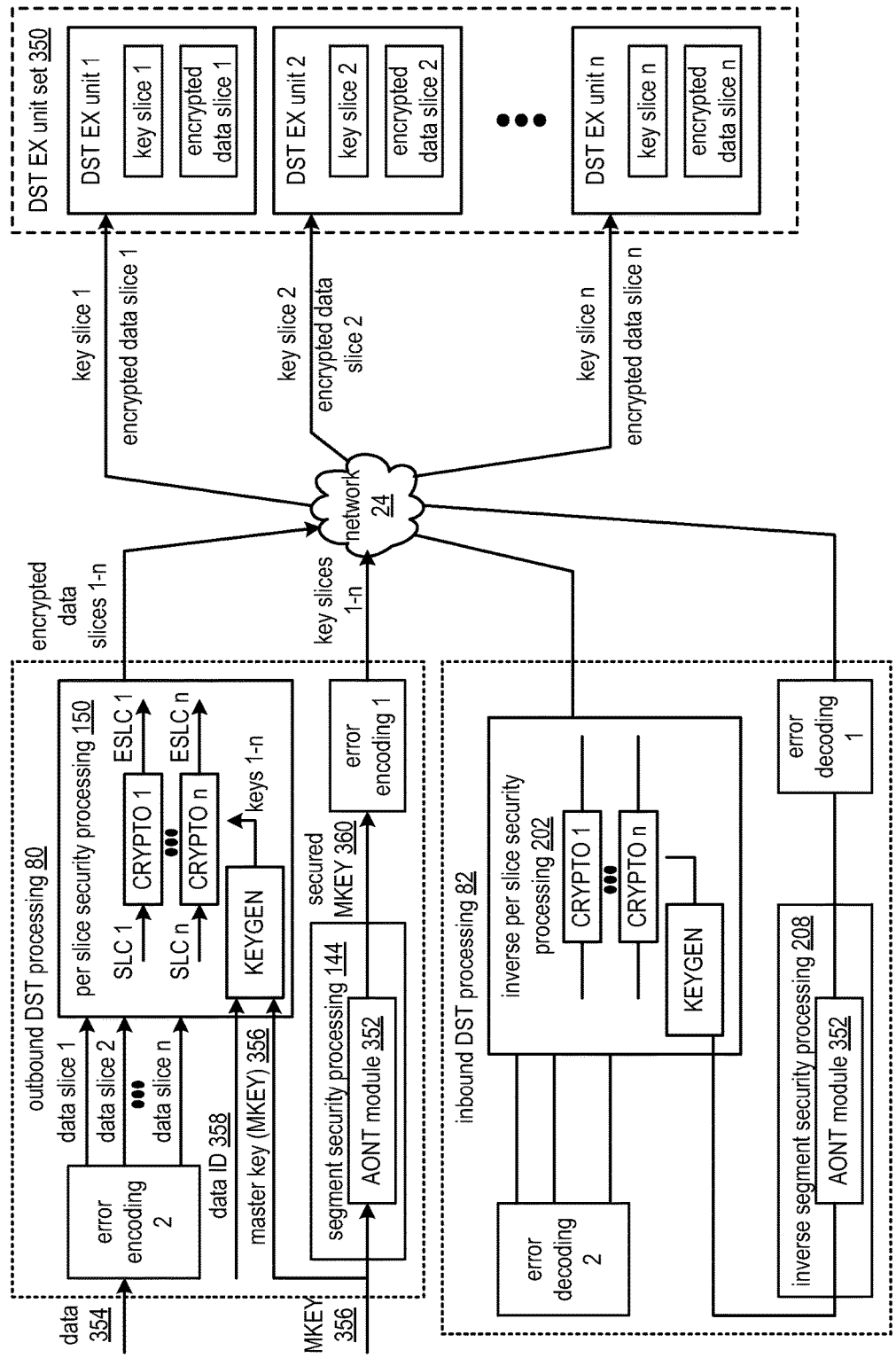
FIGS. 40A and 40B are a schematic block diagram of an embodiment of a dispersed storage network (DSN) in accordance with the present invention.
Figure 40B:
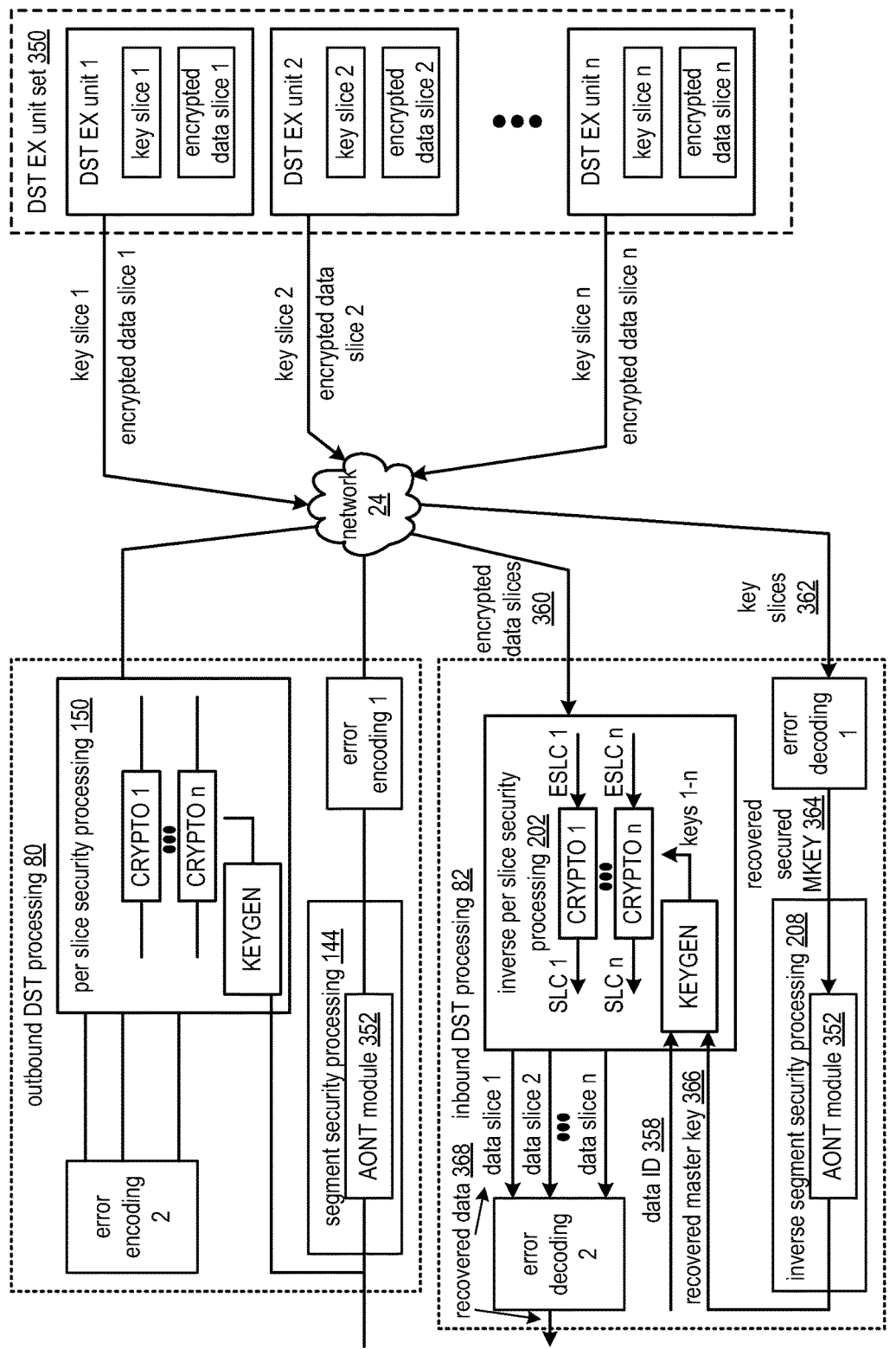

FIGS. 40A and 40B are a schematic block diagram of an embodiment of a dispersed storage network (DSN) that includes the outbound dispersed storage and task (DST) processing 80 of FIG. 3, the inbound DST processing 82 of FIG. 3, the network 24 of FIG. 1, and a DST execution (EX) unit 350. The DST execution unit set 350 includes a set of DST execution units 1-n. Each DST execution unit may be implemented utilizing the DST execution unit 36 of FIG. 1. Hereafter, a DST execution unit may be referred to interchangeably as a storage unit and the set of DST execution units may be interchangeably referred to as a set of storage units.

The outbound DST processing 80 includes an error encoding 1, an error encoding 2, the per slice security processing 150 of FIG. 6, and the segment security processing 144 of FIG. 6. The error encoding 1 and error encoding 2 may each be implemented utilizing the error encoding 146 of FIG. 6. The per slice security processing 150 includes a key generator (KEYGEN) and a set of crypto modules (CRYPTO) 1-n. The segment security processing 144 includes an all or nothing transform (AONT) module 352. The inbound DST processing 82 includes an error decoding 1, an error decoding 2, the inverse per slice security processing 202 of FIG. 16, and the inverse segment security processing 208 of FIG. 16. The error decoding 1 and error decoding 2 may be implemented utilizing the error decoding 206 of FIG. 16. The inverse per slice security processing 202 includes the key generator and the set of crypto modules 1-n. The inverse segment security processing 208 includes the AONT module 352.

The DSN functions to access data 354 stored in the DST execution unit set 350. The accessing includes storing the data 354 and retrieving stored data to produce recovered data. FIG. 40A illustrates an example of operation of the storing of the data 354 where the outbound DST processing 80 receives the data 354 for storage. Having received the data 354 for storage, the outbound DST processing 80 divides the data 354 into a plurality of data units. As a specific example, the error encoding 2 dispersed storage error encodes the data 354 to produce a plurality of encoded data slices as the plurality of data units. For instance, the error encoding 2 dispersed storage error encodes the data 354 to produce a set of encoded data slices 1-n, where the encoding includes matrix multiplying the data 354 by an encoding matrix where a first decode threshold number of rows includes a unity matrix to produce the set of encoded data slices where a first decode threshold number of encoded data slices includes substantially equal divisions of the data 354.

With the data 354 divided into the plurality of data units, the key generator generates a plurality of encryption keys from a master key 356 associated with the data 354 and a data identifier (ID) 358 associated with the data 354. The data identifier 358 includes one or more of a data name (e.g., a name associated with the data 354), a user password, a personal identification number, a plurality of data unit names (e.g., a set of slice names 1-n associated with the set of encoded data slices 1-n), and a random value. The outbound DST processing 80 may obtain the master key 356 by at least one of generating the master key 356 based on a random number, retrieving the master key 356, and receiving the master key 356. As a specific example of the generating the plurality of encryption keys, the key generator performs a one-way deterministic function on the master key 356 and the plurality of data unit names (e.g., slice names 1-n) to produce the plurality of encryption keys (e.g., keys 1-n), where the data identifier 358 includes the plurality of data unit names. As another specific example of the generating the plurality of encryption keys 1-n, the key generator performs a series of one-way deterministic functions (e.g., functions 1-n (on the master key 356 and the data identifier 358 to produce the plurality of encryption keys (e.g., the keys 1-n). The deterministic function may include one or more of a hash based message authentication code function, a hashing function, a sponge function, a mask generating function, and a logical function.

With the plurality of encryption keys generated, the set of crypto modules 1-n encrypts the plurality of data units using the plurality of encryption keys to produce a plurality of encrypted data units. For example, crypto 1 encrypts slice (SLC) 1 using a key 1 of the keys 1-n to produce an encrypted slice (ESLC) 1, etc. Having produced the plurality of encrypted data units, the outbound DST processing 80 sends the plurality of encrypted data units to a first set of storage units of the DSN for storage. For example, the outbound DST processing 80 sends, via the network 24, the encrypted data slices 1-n to the set of DST execution units 1-n for storage.

Having stored the plurality of encrypted data units, the outbound DST processing 80 encodes the master key 356 to produce a plurality of encoded master key units (e.g., a set of key slices 1-n). As a specific example, the AONT module 352 of the segment security processing 144 performs an all-or-nothing transformation on the master key 356 to produce a secure master key (secured MKEY) 360. For instance, the AONT module 352 encrypts the master key 356 utilizing another random key to produce a temporary encrypted key, performs a deterministic function on the temporary encrypted key to produce a digest, masks the other random key using the digest to produce a masked key (e.g., applies an exclusive OR function), and combines (e.g., appends, interleaves) the masked key with the temporary encrypted key to produce the secure master key 360. Having produced the secure master key, the error encoding 1 dispersed storage error encodes the secure master key 360 to produce a plurality of encoded master key slices as the plurality of encoded master key units (e.g., key slices 1-n).

As another specific example of producing the plurality of encoded master key units, the outbound DST processing 80 performs a Shamir secret sharing encoding function on the master key 356 to produce a plurality of secret master key shares as the plurality of encoded master key units (e.g., key slices 1-n). Having produced the plurality of encoded master key units, the outbound DST processing 80 sends, via the network 24, the plurality of encoded master key units to a second set of storage units of the DSN for storage, where the first and second sets of storage units may include at least one storage unit in common. For instance, the first and second sets of storage units includes a set of storage units in common when the outbound DST processing 80 sends the plurality of encrypted data units and the plurality of encoded master key units to the set of DST execution units 1-n.

FIG. 40B illustrates an example of operation of the retrieving of the data where the inbound DST processing 82 receives a request to retrieve a data unit of the plurality of data units. For instance, the inbound DST processing 82 receives a request from a requesting entity to retrieve data slice 2 only. In another instance, the inbound DST processing 82 receives a request from the requesting entity to retrieve the data 354. Having received the request to retrieve the dating unit, the inbound DST processing 82 retrieves an encrypted data unit of the plurality of encrypted data units from a storage unit of the first set of storage units, where the encrypted data unit corresponds to the data unit. For example, the inbound DST processing 82 issues, via the network 24, a read slice request to the DST execution unit 2, where the read slice request includes a slice name corresponding to the encrypted data slice 2, and receives the encrypted data slice 2 as an encrypted data slice 360. When recovering the data 354, the inbound DST processing 82 retrieves at least a decode threshold number of encrypted data slices 360.

Having retrieved the encrypted data unit (e.g., encrypted data slice 2), the inbound DST processing 82 retrieves at least some of the plurality of encoded master key units from the second set of storage units. For example, the inbound DST processing 82 issues, via the network 24, at least a decode threshold number of read slice requests to the DST execution units 1-n, where the at least a decode threshold number of read slice requests includes slice names corresponding to a decode threshold number of key slices 362, and receives at least a decode threshold number of key slices 362.

Having received the at least some of the plurality of encoded master key units, inbound DST processing 82 decodes the at least some of the plurality of encoded master key units to produce a recovered master key 366. For example, the error decoding 1 decodes the received at least a decode threshold number of key slices 364 to produce a recovered secured master key 364, the AONT module 352 of the inverse segment security processing 208 performs a reverse all or nothing transform function on the recovered secured master key 364 to produce the recovered master key 366. For instance, the AONT module 352 de-combines the masked key and the encrypted key from the recovered secured master key 364, performs a deterministic function on the encrypted key to reproduce the digest, de-masks masked key using the digest (e.g., applies the exclusive OR function) to reproduce the other random key, and decrypts the encrypted key using the reproduced other random key to produce the recovered master key 366.

With the recovered master key 366 produced, the key generator of the inverse per slice security processing 202 generates an encryption key of the plurality of encryption keys from the recovered master key 366 and the data identifier 358 (e.g., obtained with the request to retrieve). For example, the key generator performs a deterministic function on the recovered master key 366 and a slice name 2 of the data slice 2 as the data identifier 358 to produce a key 2. With the encryption key generated, the inverse per slice security processing 202 decrypts the received encrypted data unit using the encryption key to recover the data unit. For example, the CRYPTO 2 decrypts the received encrypted data slice 2 using the key 2 to produce the data slice 2 as recovered data 368.

Alternatively, when recovering the data 354, the key generator generates at least a decode threshold number of encryption keys of the plurality of encryption keys, at least a decode threshold number of CTPYTO modules decrypt at least a decode threshold number of received encrypted data slices 360 to produce at least a decode threshold number of data slices, and the error decoding 2 dispersed storage error decodes the at least a decode threshold number of data slices to reproduce the data 354 as recovered data 368.

Figure 40C:
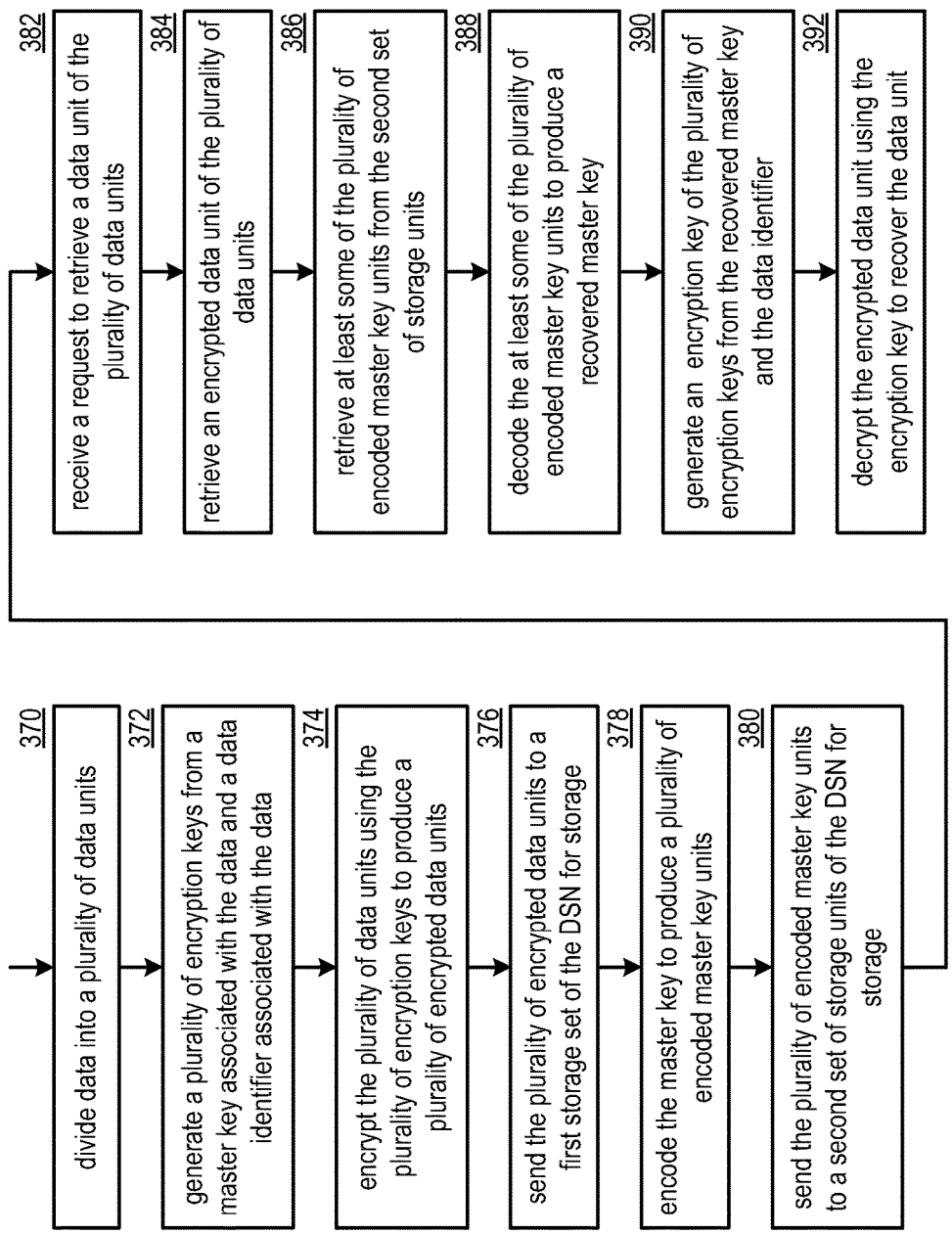
FIG. 40C is a flowchart illustrating an example of accessing data in accordance with the present invention.

FIG. 40C is a flowchart illustrating an example of accessing data in a dispersed storage network (DSN). In particular, a method is presented for use in conjunction with one or more functions and features described in conjunction with FIGS. 1-39, 40A-B, and also FIG. 40C. The method begins or continues at step 370 when storing the data in the DSN where a processing module of a computing device of one or more computing devices of the DSN divides the data into a plurality of data units. For example, the processing module dispersed storage error encodes the data to produce a plurality of encoded data slices as the plurality of data units.

The method continues at step 372 where the processing module generates a plurality of encryption keys from a master key associated with the data and a data identifier associated with the data. The generating may include obtaining the master key by generating a random number and performing a key generating function on the random number to produce the master key (e.g., with a sufficient number of bits). As a specific example of generating the plurality of encryption keys, the processing module performs a one-way deterministic function on the master key and a plurality of data unit names to produce the plurality of encryption keys, where the data identifier includes the plurality of data unit names. As another specific example of generating the plurality of encryption keys, the processing module performs a series of one-way deterministic functions on the master key and the data identifier to produce the plurality of encryption keys.

The method continues at step 374 where the processing module encrypts the plurality of data units using the plurality of encryption keys to produce a plurality of encrypted data units. The method continues at step 376 where the processing module sends the plurality of encrypted data units to a first set of storage units of the DSN for storage. The method continues at step 378 where the processing module encodes the master key to produce a plurality of encoded master key units. As a specific example, the processing module performs an all-or-nothing transformation on the master key to produce a secure master key and dispersed storage error encodes the secure master key to produce a plurality of encoded master key slices as the plurality of encoded master key units. As another specific example, the processing module performs a Shamir secret sharing encoding function on the master key to produce a plurality of secret master key shares as the plurality of encoded master key units.

The method continues at the step where the processing module sends the plurality of encoded master key units to a second set of storage units of the DSN for storage. The first and second sets of storage units may include at least one storage unit in common.

The method continues or begins, when retrieving the data from the DSN, at step 382 where the processing module receives a request to retrieve a data unit of the plurality of data units. The method continues at step 384 of the processing module retrieves an encrypted data unit of the plurality of encrypted data units from a storage unit of the first set of storage units, where the encrypted data unit corresponds to the data unit. The method continues at step 386 where the processing module retrieves at least some (e.g., a decode threshold number) of the plurality of encoded master key units from the second set of storage units.

The method continues at step 388 where the processing module decodes the at least some of the plurality of encoded master key units to produce a recovered master key. The method continues at step 390 where the processing module generates an encryption key of the plurality of encryption keys from the recovered master key and the data identifier. The method continues at step 392 where the processing module decrypts the encrypted data unit using the encryption key to recover the data unit.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

Figure 41A:
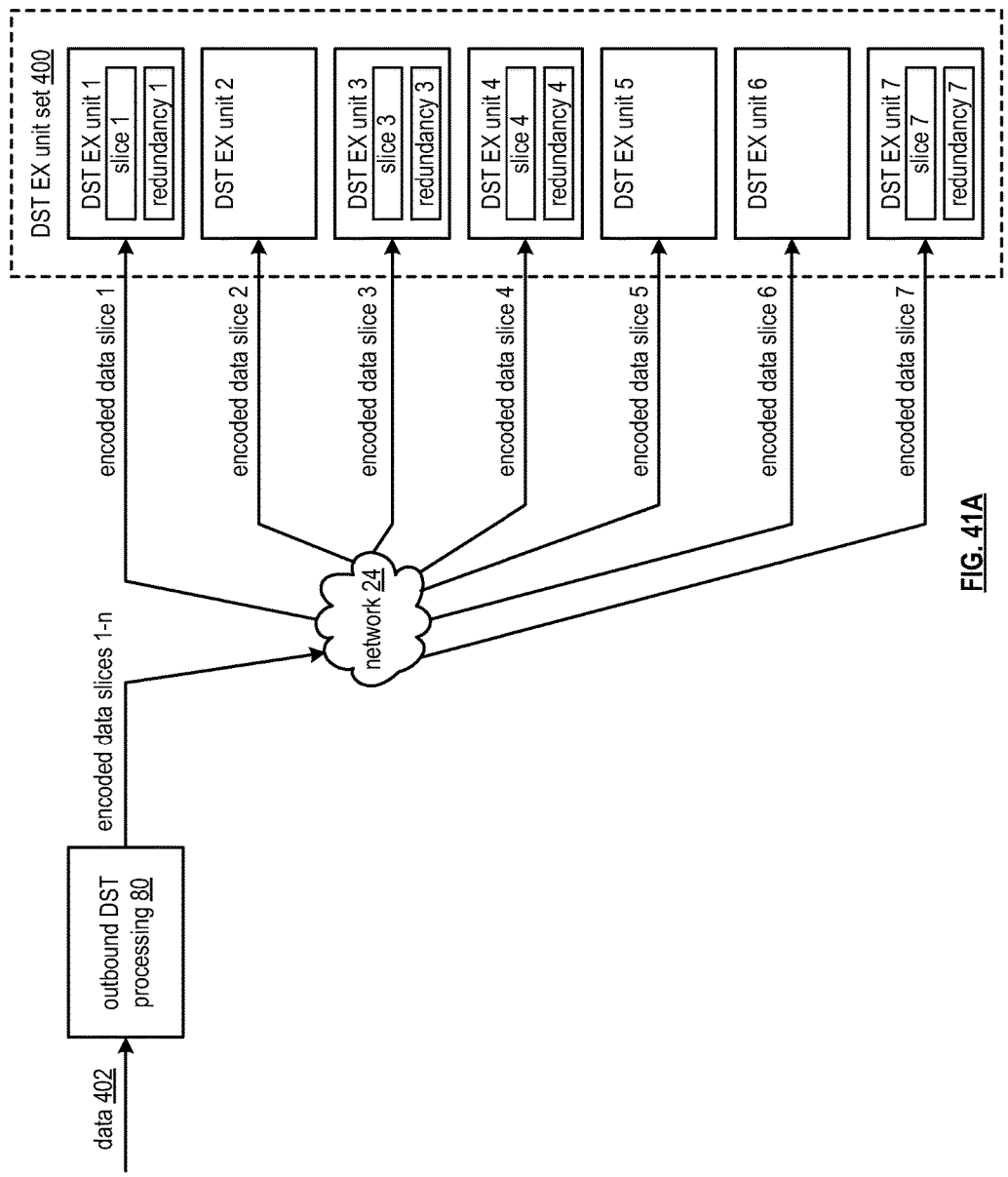
FIGS. 41A and 41B are a schematic block diagram of another embodiment of a dispersed storage network (DSN) in accordance with the present invention.
Figure 41B:
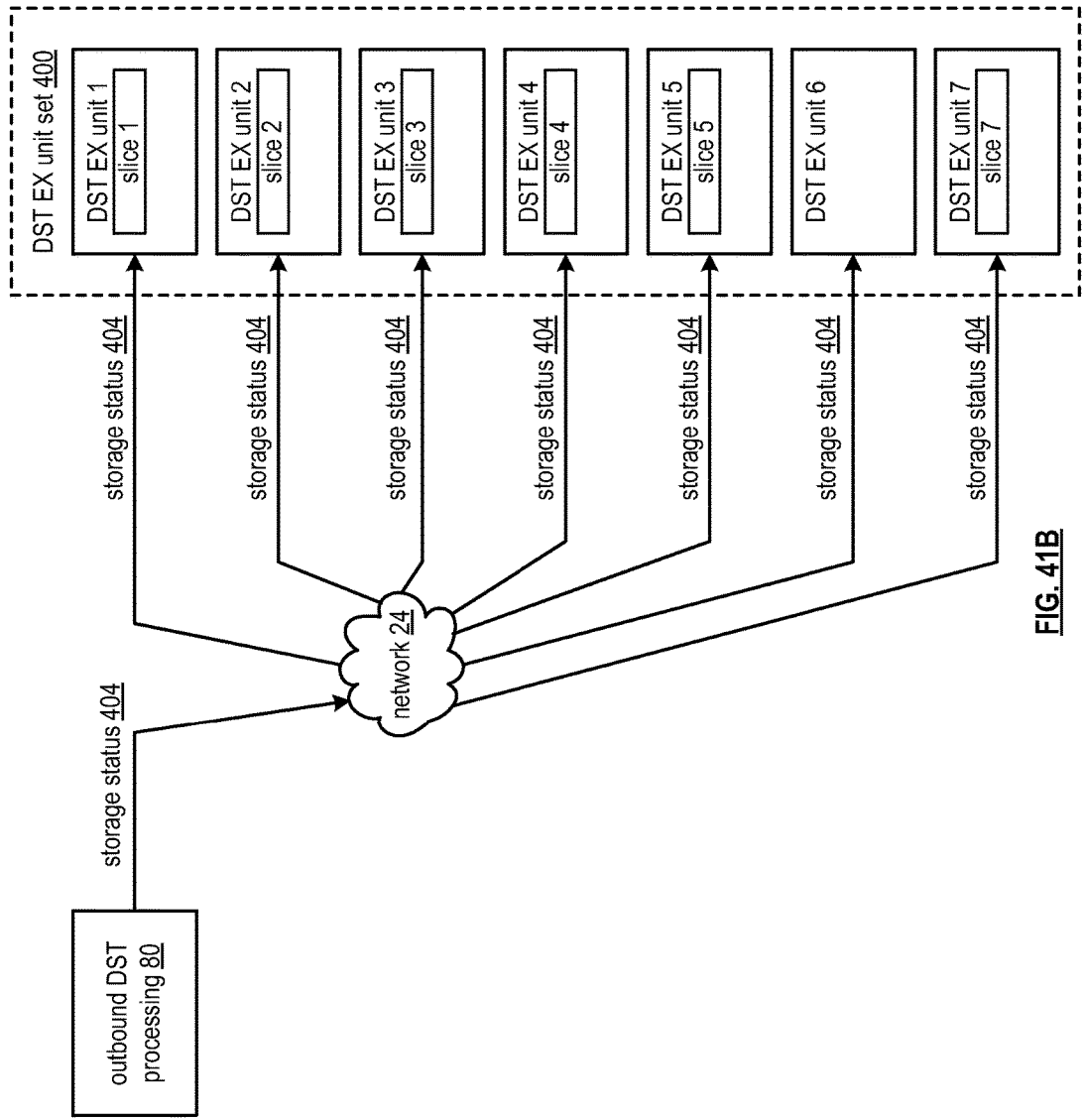

FIGS. 41A and 41B are a schematic block diagram of another embodiment of a dispersed storage network (DSN) that includes the outbound distributed storage and task (DST) processing 80 of FIG. 3, the network 24 of FIG. 1, and a DST execution (EX) unit set 400. The DST execution unit set 400 includes a set of DST execution units 1-7. Alternatively, the set of DST execution units 400 may include any number of DST execution units. Each DST execution unit may be implemented utilizing the DST execution unit 36 of FIG. 1. The DSN functions to reliably store data 402 in the DST execution unit set 400.

FIG. 41A illustrates steps of an example of operation of the storing of the data, where the outbound DST processing 80 dispersed storage error encodes the data 402 to produce one or more sets of encoded data slices 1-n (e.g., where n=7). Having produced the one or more sets of encoded data slices, the outbound DST processing 80 sends, via the network 24, the one or more sets of encoded data slices to the set of DST execution units 1-7 for storage. At least some of the DST execution units receive a corresponding encoded data slice of the set of encoded data slices for storage. For example, DST execution units 1, 3, 4, and 7 successfully receive a corresponding encoded data slice for storage within a first timeframe.

Each DST execution unit receiving an encoded data slice receives a corresponding one or more encoded data slices for local storage. The DST execution unit stores the one or more encoded data slices in the local memory. Having stored the one or more encoded data slices, the DST execution unit determines a level of redundancy for at least some of the one or more encoded data slices. The level of redundancy includes no redundancy and generating a number of error coded slices from the one or more encoded data slices. The determining may be based on one or more of a historical availability level of the set of DST execution units, an expected time for completion of writing of all of the encoded data slices to the set of DST execution units, a desired level of DST execution unit availability, a desired level of DST execution unit retrieval reliability, and a predetermination. For example, the DST execution unit indicates that no redundancy is required when the historical availability level of the set of DST execution units is greater than a high availability threshold level. As another example, the DST execution unit indicates that local redundancy is required when the expected time for completion of writing of all of the encoded data slices to the set of DST execution units is greater than a writing time threshold level.

Having determined the level of redundancy, the DST execution unit dispersed storage error encodes the one or more encoded data slices in accordance with the level redundancy to produce redundancy information. For example, the DST execution unit 1 dispersed storage error encodes the one or more encoded data slices to produce one error coded slices as the redundancy information 1. Having produced the redundancy information, the DST execution unit stores the redundancy information to enable subsequent local rebuilding of the one or more encoded data slices utilizing remaining encoded data slices of the one or more encoded data slices and the redundancy information. The DST execution unit may issue storage information to indicate to the outbound DST processing 80 whether each of the corresponding one or more encoded data slices has been successfully stored by the DST execution unit.

FIG. 41B illustrates further steps of the example of operation of the storing of the data 402, where the outbound DST processing 80 issues storage status 404 to the set of DST execution units based on received storage information from one or more of the DST execution units, where the storage status 400 for indicates a number of favorably stored encoded data slices of a set of encoded data slices. Alternatively, or in addition to, each DST execution unit directly shares storage information.

Each DST execution unit determines to update the level of redundancy of a set of encoded data slices by one or more of interpreting received storage status 400 for, receiving a request, detecting that an estimated retrieval reliability level is greater than a reliability threshold level, and detecting that a storage utilization level is greater than a storage utilization threshold level. When updating a level of redundancy, the DST execution unit determines an updated level of redundancy based on one or more of a storage utilization level and a storage reliability factor. For example, the DST execution unit determines to eliminate redundancy information when the number of favorably stored encoded data slices of the set of encoded data slices is equal to or greater than a threshold level. For instance, the DST execution unit determines to eliminate the redundancy information when six of seven encoded data slices of the set of encoded data slices has been successfully stored. In another instance, the DST execution unit determines to add more redundancy information (e.g., one or more extra error coded slices) when less than the threshold level of encoded data slices has been successfully stored and a timeframe of writing is greater than a time frame threshold level. Having determined the updated level redundancy, the DST execution unit updates the redundancy information based on the updated level redundancy. For example, DST execution units 1-5 and 7 delete corresponding redundancy information.

Figure 41C:
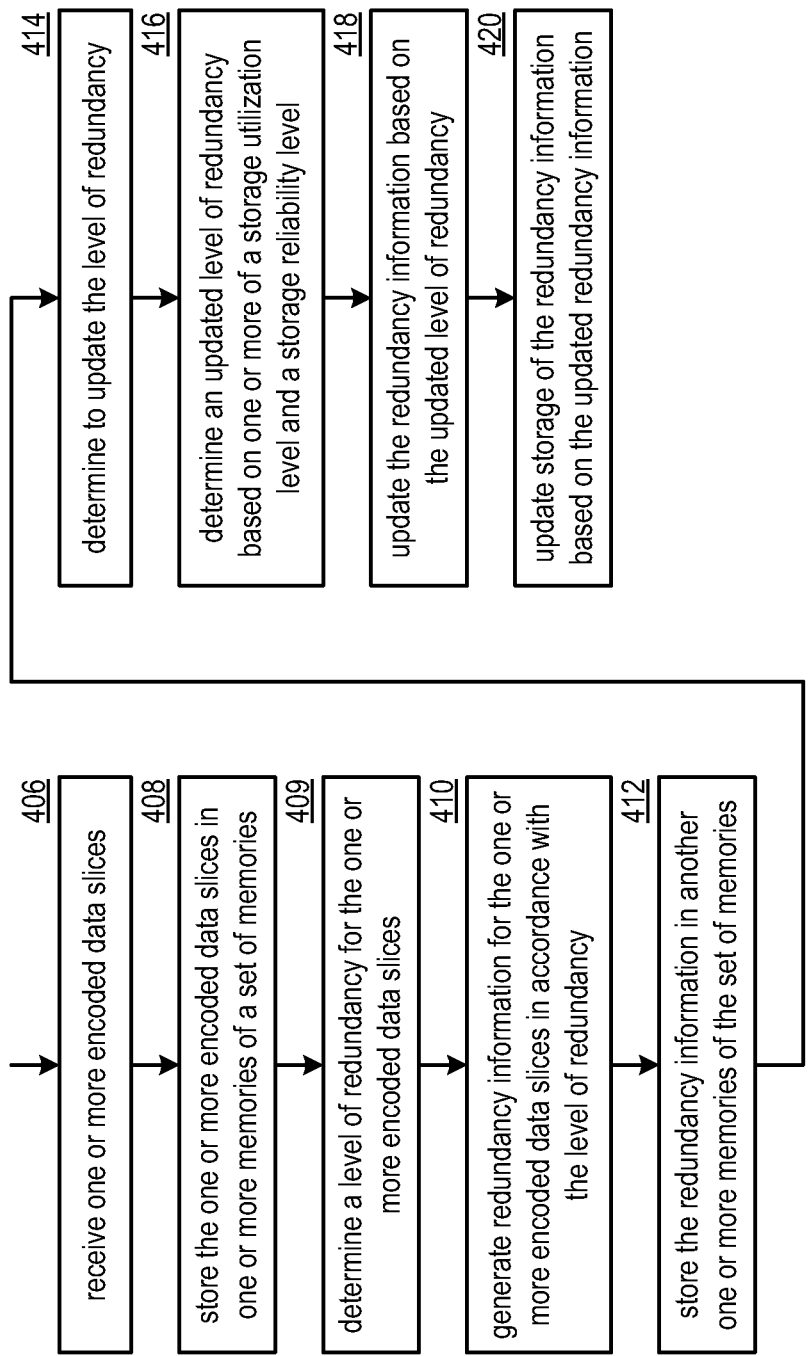
FIG. 41C is a flowchart illustrating an example of storing an encoded data slice in accordance with the present invention.

FIG. 41C is a flowchart illustrating an example of storing an encoded data slice. The method begins or continues at step 406 where a processing module (e.g., of a distributed storage and task (DST) execution unit) receives one or more encoded data slices for storage. The method continues at step 408 where the processing module stores the one or more encoded data slices in one or more memories of a set of memories. For example, the processing module stores the one or more encoded data slices associated with a common data object in a common memory. As another example, the processing module stores each encoded data slice in a different memory.

The method continues at step 409 where the processing module determines a level redundancy for the one or more encoded data slices. The determining may be based on one or more of a predetermined level, calculating based on historical retrieval reliability levels, and calculating based on historical storage availability levels. The method continues at step 410 where the processing module generates redundancy information further one or more encoded data slices in accordance with the level redundancy. For example, the processing module dispersed storage error encodes the one or more encoded data slices to produce one or more error coded slices as the redundancy information. As another example, the processing module replicates the one or more encoded data slices as the redundancy information. The method continues at step 412 where the processing module stores the redundancy information in another one or more memories of the set of memories. For example, the other one or more memories may include the one or more memories of the set of memories. As another example, the other one or more memories does not include the one or more memories.

The method continues at step 414 where the processing module determines to update the level of redundancy. For example, the processing module detects a change in a required retrieval reliability level. As another example, the processing module detects a threshold number of favorably stored slices of a set of encoded data slices that includes a slice of the one or more slices. As another example, the processing module detects that a storage utilization level is greater than a storage utilization threshold level.

The method continues at step 416 where the processing module determines an updated level of redundancy based on one or more of a storage utilization level and a storage reliability level. The determining includes identifying an approach based on an updated acquired retrieval reliability level. The method continues at step 418 where the processing module updates the redundancy information based on the updated level of redundancy. The determining includes one of indicating no redundancy information required, maintaining the current level of redundancy, revising upwards the level of redundancy, and revising downwards the level redundancy. The method continues at step 420 where the processing module updates storage of the redundancy information based on the updated redundancy information. For example, the processing module encodes more error coded slices when the level of redundancy has been revised upwards. As another example, the processing module deletes all error coded slices of the redundancy information when the determination is no redundancy information is required.

Figure 42A:
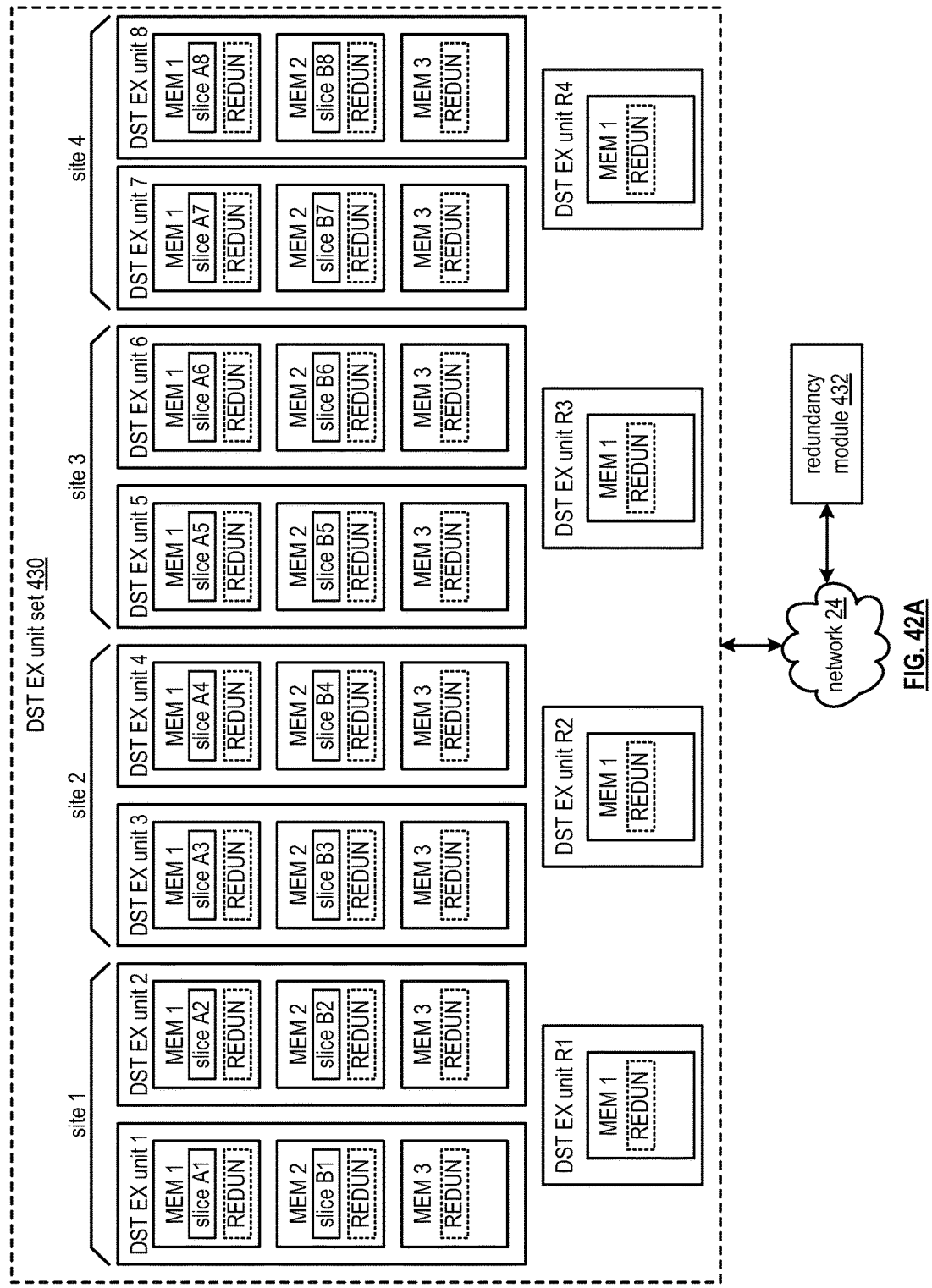
FIG. 42A is a schematic block diagram of another embodiment of a dispersed storage network (DSN) in accordance with the present invention.

FIG. 42A is a schematic block diagram of another embodiment of a dispersed storage network (DSN) that includes a distributed storage and task (DST) execution (EX) unit set 430, the network 24 of FIG. 1, and a redundancy module 432. The DST execution unit set includes a set of DST execution units 1-8 and redundancy DST execution units R1-R4 implemented at a plurality of sites. Alternatively, the set of DST execution units may include any number of DST execution units and the redundancy DST execution units may include any number of redundancy DST execution units. For example the DST execution unit set includes four sites, where each site includes two DST execution units and one redundancy DST execution unit.

Each DST execution unit includes one or more memories. Each DST execution unit may be implemented utilizing the DST execution unit 36 of FIG. 1. The redundancy module 432 may be implemented utilizing the processing module 84 of FIG. 3. The redundancy module 432 may be further implemented within one or more of the DST processing unit 16 of FIG. 1, the DST integrity processing unit 20 of FIG. 1, and any one or more of the DST execution units of the DST execution unit set. The DSN functions to generate and store local redundancy for data stored as sets of encoded data slices in the set of DST execution units 1-8.

In an example of operation to generate and store the local redundancy, the redundancy module 432 determines a fault domain for local redundancy, where the fault domain includes a domain over at least one of a memory device, a plurality of memory devices, storage units implemented at a common site, and a subset of the set of storage units. The determining may be based on one or more of DSN topology information, expected failure rate information, a predetermination, and a rebuilding goal. For example, the redundancy module 432 determines a first fault domain for the DST execution unit 1 to include a first memory. As another example, the redundancy module determines a second fault domain for the DST execution unit 1 to include the first memory and a second memory. As yet another example, the redundancy module 432 determines another fault domain to include all memories of DST execution units 1 and 2 at common site 1.

Having determined the fault domain for local redundancy, the redundancy module 432 generates the local redundancy for the fault domain. For example, the redundancy module 432 dispersed storage error encodes slices stored in memory 1 of the DST execution unit 1 to produce one or more error coded slices as the redundancy for the first fault domain. As another example, the redundancy module 432 dispersed storage error encodes slices stored in memories 1 and 2 of the DST execution unit 1 to produce one or more other error coded slices as the redundancy for the second fault domain. As yet another example, the redundancy module 432 dispersed storage error encodes all slices stored in all memories of the DST execution units 1 and 2 to produce still further error coded slices as the redundancy for the other fault domain.

Having generated the local redundancy, the redundancy module 432 identifies available storage locations for storing of the local redundancy. Such available storage locations includes available storage of memory devices that are also storing the encoded data slices, the available memory space on memories devoted to storing local redundancy, and available storage of storage units dedicated to storing the redundancy. The identifying includes one or more of performing a lookup, initiating a query, receiving a response, identifying storage locations with a most amount of available storage capacity, and selecting storage locations associated with a highest level of fault tolerance.

Having identified the available storage locations, the redundancy module 432 selects one or more storage locations of the available storage locations for storage of the local redundancy. The selecting may include one or more of rank ordering the storage locations based on the rebuilding goal and expected failure correlations. For example, the redundancy module assigns a low rank ordering for a storage location that includes a common memory with storage of an encoded data slice and the signs a high rank ordering for another storage location that is separate from storage of encoded data slices.

Having selected the one or more storage locations, the redundancy module 432 facilitate storage of the local redundancy and the selected one or more storage locations. When detecting a storage failure, the redundancy module identifies and associated fault domain (e.g., a lookup, a developing a correlation, interpreting the DSN topology information). Having identified the fault domain, the redundancy module 432 identifies associated local redundancy of the fault domain (e.g., a lookup, initiating a query, receiving a response). Having identified the associated local redundancy, the redundancy module recovers the local redundancy (e.g., retrieves error coded slices from a memory).

Having recovered the local redundancy, the redundancy module 432 corrects the storage error utilizing the recovered local redundancy. For example, the processing module recovers further encoded data slices of a set of encoded data slices and dispersed storage error decodes a decode threshold number of encoded data slices that includes the recovered local redundancy and at least some of the recovered further encoded data slices to produce a recovered data segment. Having produced the recovered data segment, the redundancy module 432 dispersed storage error encodes the recovered data segment to reproduce an encoded data slice associated with the storage error.

Figure 42B:
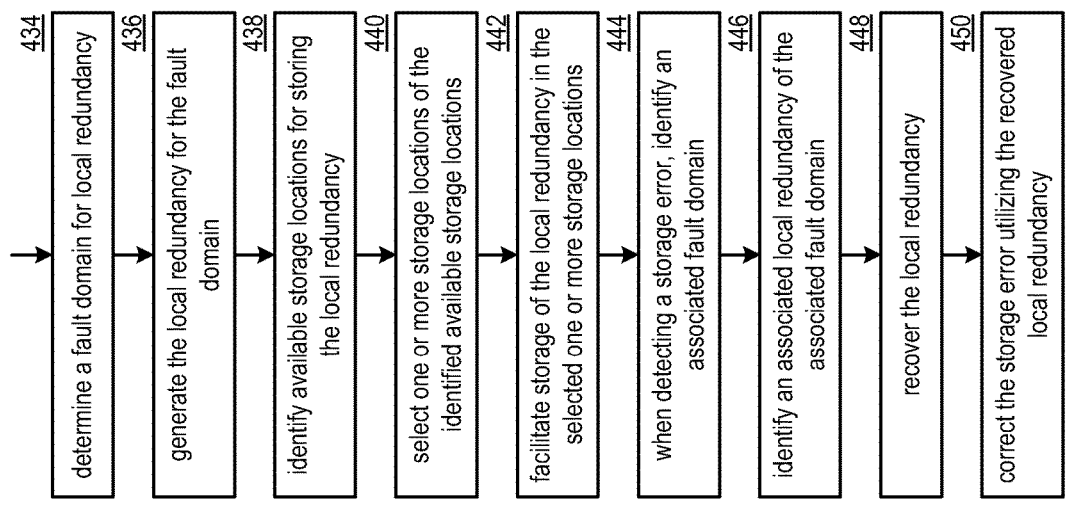
FIG. 42B is a flowchart illustrating an example of storing local redundancy in accordance with the present invention.

FIG. 42B is a flowchart illustrating an example of storing local redundancy. The method begins or continues at step 434 where a processing module (e.g., of a redundancy module) determines a fault domain for local redundancy. For example, the processing module detects newly stored slices, initiates the determining of the fault domain based on dispersed storage network topology information, and stores fault domain information that indicates identifiers of one or more memory devices associated with the fault domain. The method continues at step 436 where the processing module generates the local redundancy for the fault domain. For example, the processing module dispersed storage error encodes stored encoded data slices associated with the fault domain to produce one or more error coded slices as the local redundancy.

The method continues at step 438 where the processing module identifies available storage locations for storing the local redundancy. The method continues at step 440 where the processing module selects one or more storage locations of the identified available storage locations. For example, the processing module selects a storage location with a minimal failure correlation to the fault domain. The method continues at step 442 where the processing module facilitates storage of the local redundancy in the selected one or more storage locations. The processing module may update the fault domain information to include an identifier of the one or more storage locations When detecting a storage error, the method continues at step 444 where the processing module identifies an associated fault domain (e.g., a lookup of the fault domain information). The method continues at step 446 where the processing module identifies an associated local redundancy of the associated fault domain (e.g., extracted from recovered fault domain information). The method continues at step 448 where the processing module recovers the local redundancy. For example, the processing module retrieves one or more error coded slices of the local redundancy from the corresponding selected one or more storage locations extracted from the recovered fault domain information.

The method continues at 450 where the processing module corrects the storage error utilizing the recovered local redundancy. For example, the processing module disperse storage error decodes the retrieved error coded slices of the local redundancy and one or more encoded data slices associated with storage error to produce a reproduced data segment, dispersed storage error encodes the reproduced data segment to produce a rebuilt slice corresponding to the storage error, and stores the rebuilt slice in a memory device associated with the storage error.

Figure 43:
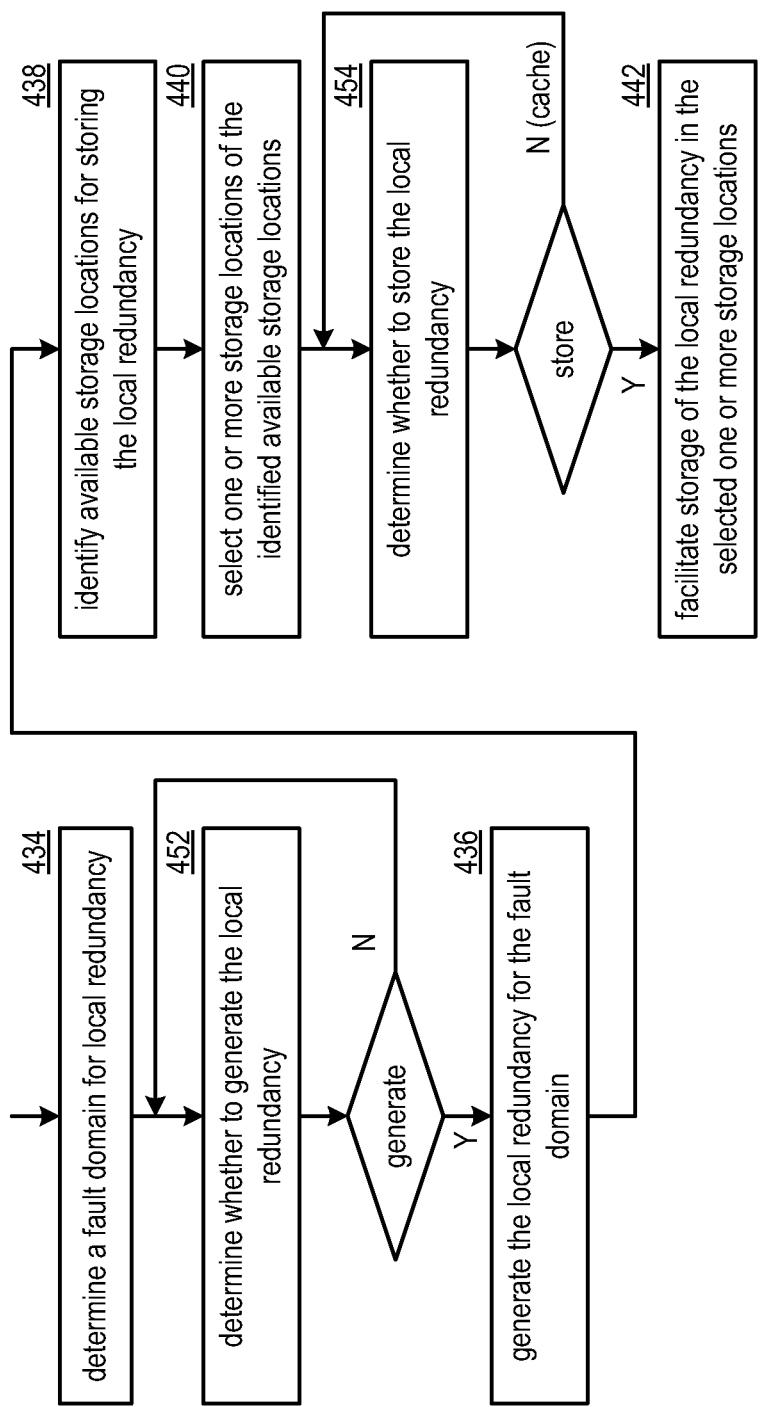
FIG. 43 is a flowchart illustrating another example of storing local redundancy in accordance with the present invention.

FIG. 43 is a flowchart illustrating another example of storing local redundancy, which includes similar steps to FIG. 42B. The method begins or continues with step 434 of FIG. 42B where a processing module (e.g., of a redundancy module) determines a fault domain for local redundancy. The method continues at step 450 to where the processing module determines whether to generate the local redundancy. The determining may be based on one or more of a network loading level, a storage unit loading level, a redundancy module loading level, a redundancy module memory availability level, initiating a query to a storage unit, and receiving a query response. The method loops at step 452 when determining not to generate the local redundancy. The method continues to step 436 of FIG. 42B when determining to generate the local redundancy.

When determining to generate the local redundancy, the method continues with the steps 436-440 of FIG. 42B where the processing module generates the local redundancy for the fault domain, identifies available storage locations for storing the local redundancy, and selects one or more storage locations of the identified available storage locations. The method continues at step 454 where the processing module determines whether to store the local redundancy. The determining may be based on one or more of a network loading level, a storage location loading level, a redundancy module loading level, a redundancy module memory availability level, initiating a query to the one or more selected storage locations, and receiving a query response. The method loops at step 454 when determining not to store the local redundancy (e.g., cache the local redundancy). The method continues to the step 442 of FIG. 42B when the processing module determines to store the local redundancy. When storing the local redundancy, the method continues with the step 442 of FIG. 42B where the processing module facilitate storage of the local redundancy and the selected one or more storage locations.

Figure 44A:
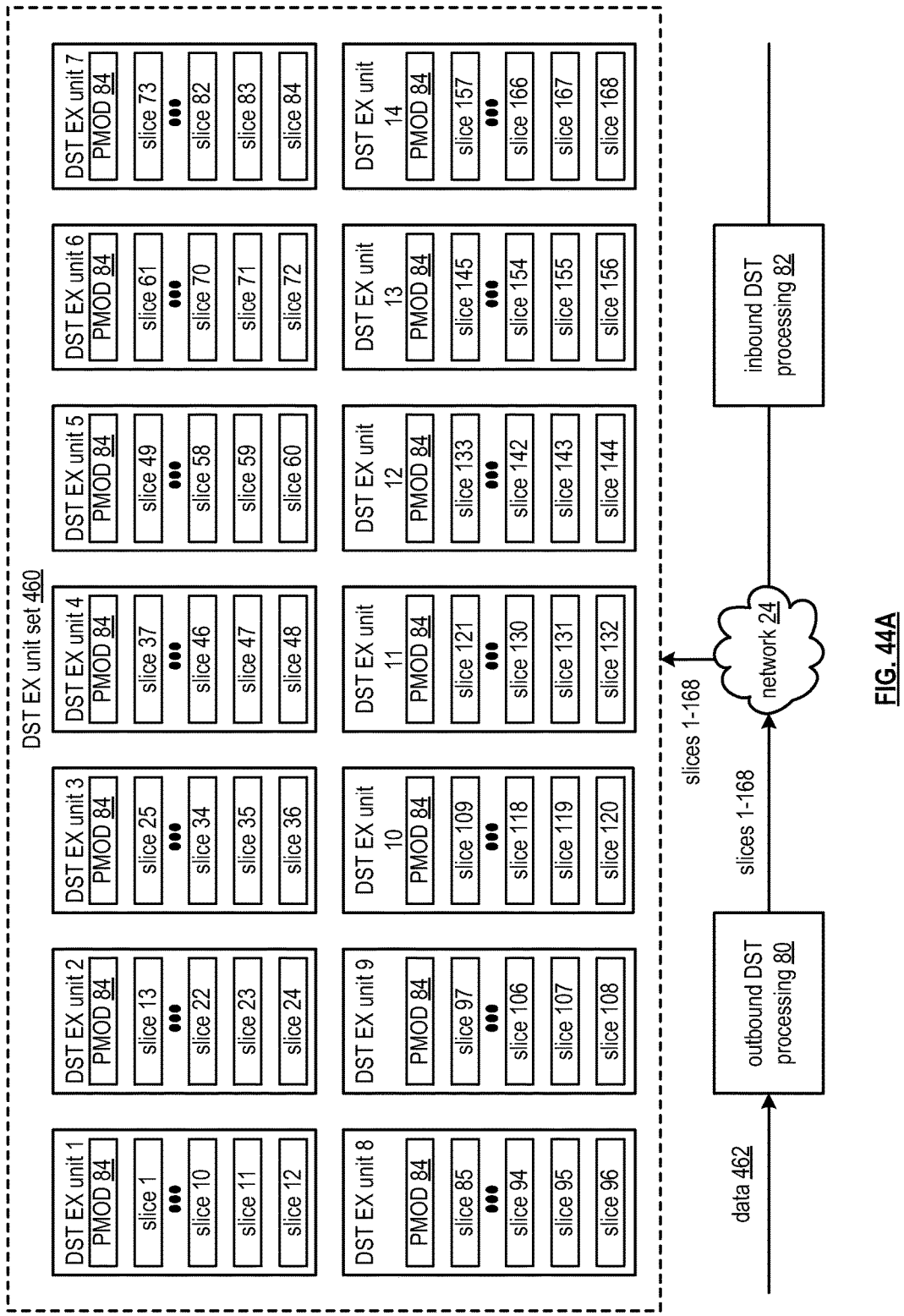
FIGS. 44A-44C are schematic block diagrams of another embodiment of a dispersed storage network (DSN) in accordance with the present invention.
Figure 44B:
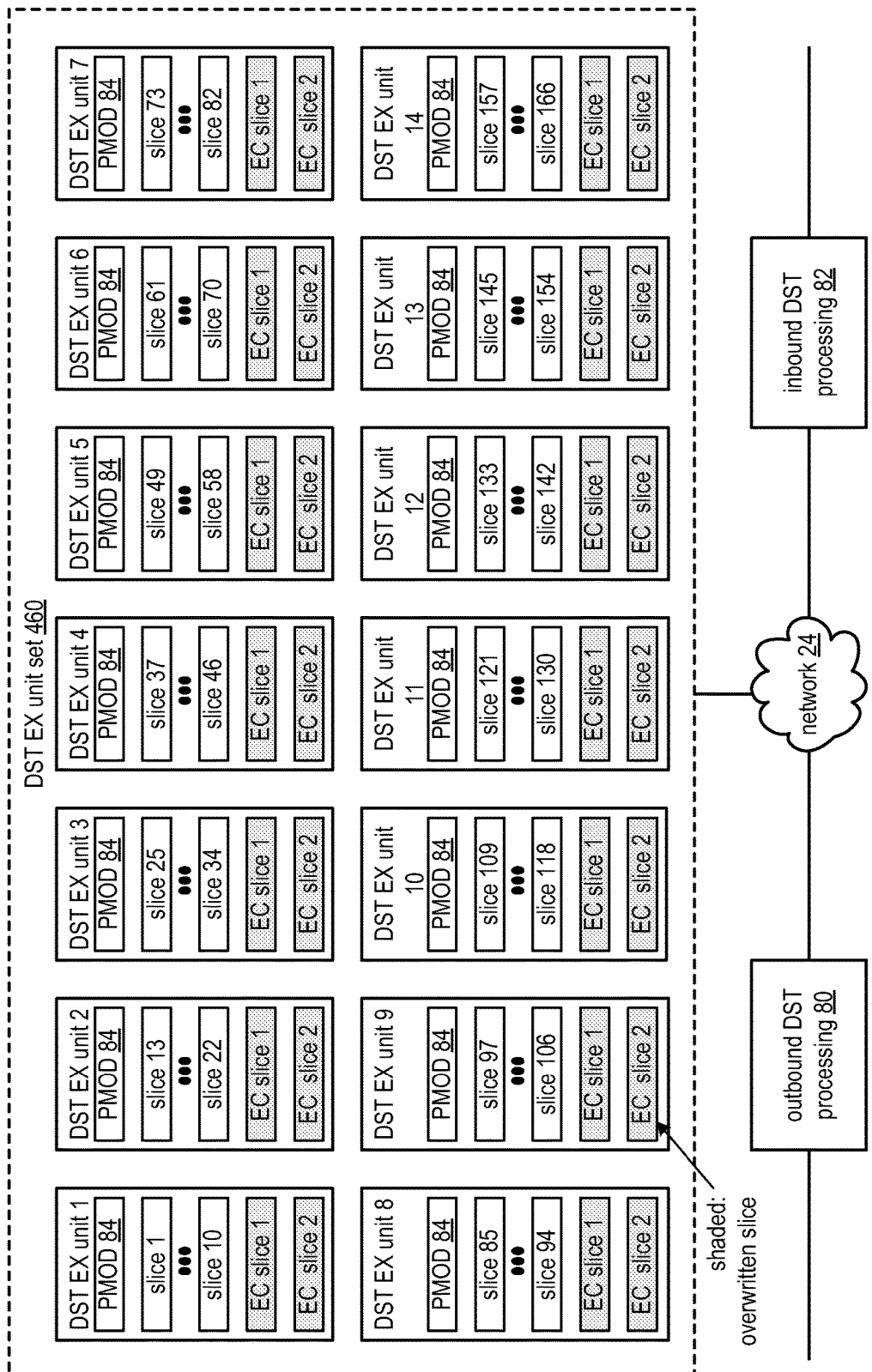
Figure 44C:
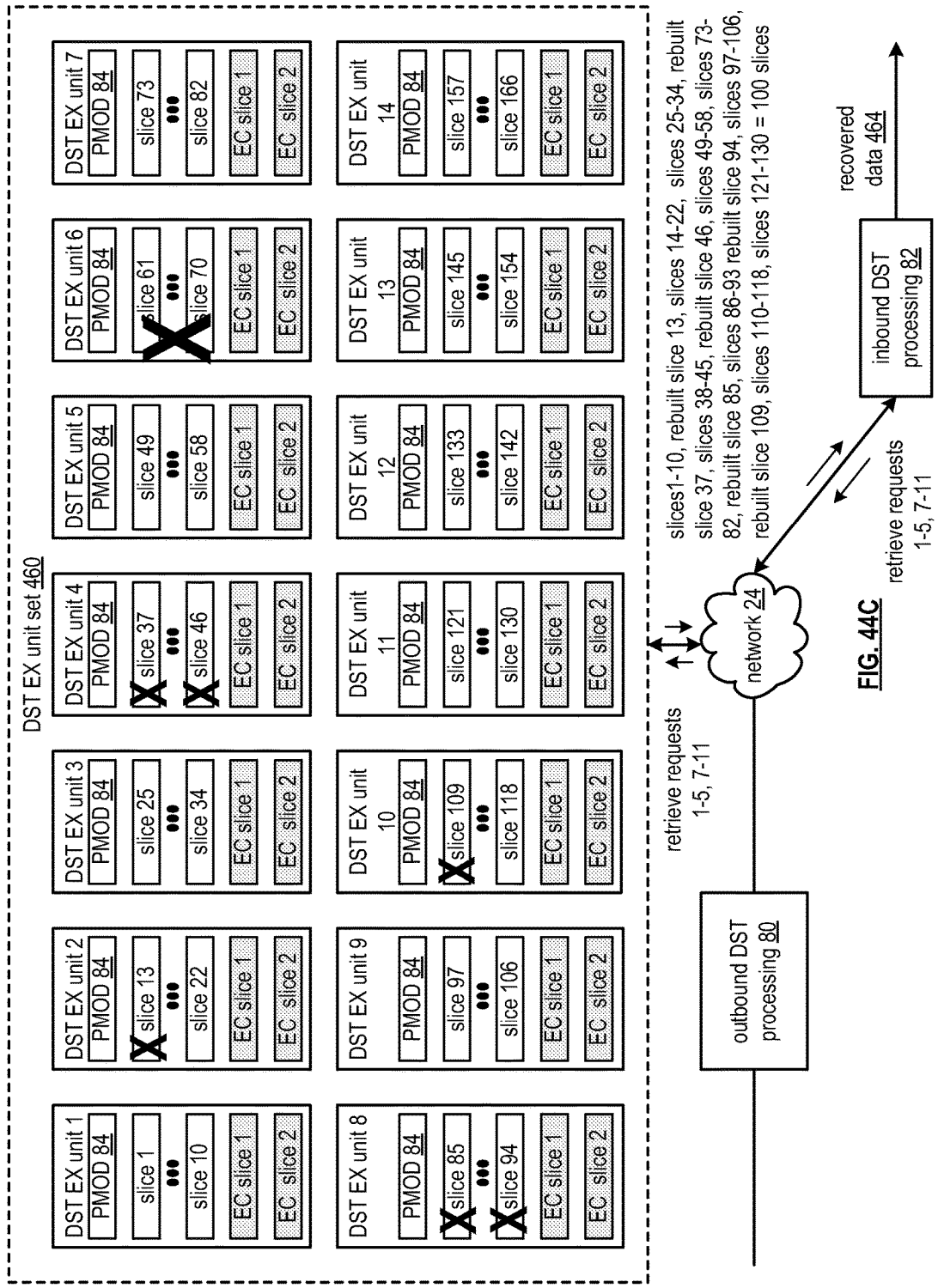

FIGS. 44A-44C are a schematic block diagram of another embodiment of a dispersed storage network (DSN) that includes a distributed storage and task (DST) execution (EX) unit set 460, the network 24 of FIG. 1, the outbound DST processing 80 of FIG. 3, and the inbound DST processing 82 of FIG. 3. The DST execution unit set 460 includes a set of DST execution units 1-14. Alternatively, the set of DST execution units may include any number of DST execution units. Each DST execution unit includes the processing module 84 of FIG. 3 and at least one memory device (e.g., memory 88 of FIG. 3) to facilitate storage of one or more encoded data slices. Each DST execution unit may be implemented utilizing the DST execution unit 36 of FIG. 1. Hereafter, the DST execution unit may be interchangeably referred to as a storage unit of a set of storage units. The DSN functions to provide access to data 462 stored in the DST execution unit set. The accessing includes storing the data 462 in the DST execution unit set and retrieving stored data from the DST execution unit set to produce recovered data 464.

FIG. 44A illustrates steps of an example of operation of the accessing of the data 462, where, in particular, the data 462 is stored in the DST execution unit set 460. The example begins or continues with the outbound DST processing 80 determining dispersal parameters for a dispersed storage error coding function, where the dispersal parameters are associated with a wide-class information dispersal algorithm (IDA) width. The dispersal parameters includes one or more of a recovery threshold number of storage units, a recovery threshold number of encoded data slices for storage unit, a decode threshold number, an IDA width, and an encoding matrix. The determining includes at least one of retrieving the dispersal parameters and generating the dispersal parameters. The generating includes producing the dispersal parameters such that recovering a recovery threshold number of encoded data slices per storage unit for a recovery threshold number of storage units enables data recovery. The generating may further include storing the determined dispersal parameters to enable subsequent recovery of the data. For example, the outbound DST processing 80 determines the dispersal parameters such that 10 of 12 encoded data slices stored at each of 10 of 14 storage units that are required for data recovery when the IDA width is 168 and the decode threshold is 100 (e.g., recovery threshold number of storage units is 10 and the recovery threshold number of encoded data slices per storage unit is 10).

Having determined the dispersal parameters, the outbound DST processing 80 dispersed storage error encodes the data 462 utilizing the dispersal parameters to produce a plurality of sets of encoded data slices (e.g., encoded data slices 1-168). In particular, a data segment of the data 462 is dispersed storage error encoded to produce a plurality of encoded data slices (e.g., one set of encoded data slices). For each set of encoded data slices, the outbound DST processing 80 determines a number of encoded data slices for storage in each DST execution unit such that each storage unit of the set of storage unit stores a unique sub-set of encoded data slices of the plurality of encoded data slices of the data segment. For example, the outbound DST processing 80 determines the number of encoded data slices for storage in each DST execution unit in accordance with a formula: number of slices per storage unit=IDA width/number of storage units (e.g., 168/14=12). Having determined the number of slices for storage in each storage unit, the outbound DST processing 80 facilitate storage of the plurality of sets of encoded data slices of the set of storage units using the number of encoded data slices for each storage unit such that the storage units of the DSN store the plurality of encoded data slices of the data segment. For example, the outbound DST processing 80 issues a set of write slice requests 1-14, via the network 24, to the set of DST execution units 1-14, where each write slice request includes, for each set of encoded data slices, 12 encoded data slices. For instance, the outbound DST processing 80 sends a unique sub-set of encoded data slices (e.g., encoded data slices 1-12) of the plurality of encoded data slices to DST execution unit 1 for storage, sends encoded data slices 13-24 to DST execution unit 2 for storage, etc.

FIG. 44B illustrates further steps of the example of operation of the accessing of the data 462 where the processing module 84 of each DST execution unit dispersed storage error encodes at least a recovery threshold number of encoded data slices of the unique sub-set of encoded data slices to produce a local set of encoded recovery data slices. The recovery threshold number of encoded data slices may be equal to a number of encoded data slices in the unique sub-set of encoded data slices. For the example, the DST execution unit dispersed storage error encodes 12 encoded data slices when the recovery threshold number of encoded data slices includes 12 encoded data slices and the number of encoded data slices of the unique sub-set of encoded data slices is 12. Alternatively, the recovery threshold number of encoded data slices is less than the number of encoded data slices in the unique sub-set of encoded data slices. For the example, the DST execution unit dispersed storage error encodes an encoded data slices when the recovery threshold number of encoded data slices is 10 and the number of encoded data slices in the unique sub-set of encoded data slices is 12.

Having produced the local set of encoded recovery data slices, the DST execution unit facilitates storage of the local set of encoded recovery data slices. For example, each DST execution unit stores all of the encoded data slices of the local set of encoded recovery data slices in a local memory of the DST execution unit. As another example, when the recovery threshold number of encoded data slices is less than the number of encoded data slices in the unique sub-set of encoded data slices, each DST execution unit may overwrite one or more encoded data slices of the unique sub-set of encoded data slices with the local set of encoded recovery data slices. For instance, DST execution unit 1 produces the local set of encoded recovery data slices to include encoded data slices 1-10 and error coded slices 1 and 2; and overwrites encoded data slices of 11-12 with error coded slices 1 and 2 when encoded data slices 1-10 of the local set of encoded recovery data slices are substantially the same as received encoded data slices 1-10 in accordance with the dispersed storage error encoding of the received recovery threshold number of encoded data slices (e.g., the encoding includes utilizing a unity matrix for a first decode threshold number of entries, where the decode threshold is 10). As such, the DST execution unit 1 may utilize error coded slices 1-2 in conjunction with the encoded data slices 1-10 of the local set of encoded recovery data slices to address a rebuilding issue where the DST execution unit 1 corrects up to at least two slice errors within the local set of encoded recovery data slices at a local storage unit level of rebuilding (e.g., the DST execution unit 1 performs rebuilding without accessing other storage units).

FIG. 44C illustrates further steps of the example of operation of the accessing of the data 462, where, in particular, the store data is to be retrieved. The steps begin or continue with the inbound DST processing 82 obtaining the dispersal parameters. The obtaining includes at least one of accessing a system registry, accessing a directory, and accessing a dispersed hierarchical index. Having obtained the dispersal parameters, the inbound DST processing 82 identifies the DST execution unit set 460 associated with storage of the data 462 for retrieval. For example, the inbound DST processing 82 accesses a directory using a name of the data to recover a DSN address and accesses a virtual DSN address to physical location table using the DSN address to identify the DST execution unit set 460.

Having identified the DST execution unit set 460, in response to a retrieval request for the data segment associated with the plurality of encoded data slices, the inbound DST processing 82 (e.g., a device of the DSN) identifies a desired sub-set of storage units of the set of storage units to produce an initial recovery number of storage units. The recovery threshold number of encoded data slices from the recovery number of storage units is approximately equal to the decode threshold number of the plurality of encoded data slices, where the decode threshold number corresponds to a minimum number of encoded data slices of the plurality of encoded data slices that is required to recover the data segment.

The identifying the desired sub-set of storage units includes one or more of identifying the desired sub-set of storage units based on reliability of the storage units in the desired sub-set of storage units, identifying the desired sub-set of storage units based on decoding efficiency of the unique sets of encoded data slices stored by the storage units in the desired sub-set of storage units, and identifying the desired sub-set of storage units based on availability of the storage units in the desired sub-set of storage units. For example, the inbound DST processing 82 identifies the desired sub-set of storage units to include DST execution units 1-10 based on the decoding efficiency of the unique sets of encoded data slices stored by the storage units in the desired sub-set of storage units (e.g., slices directly include the data when produced by an encoding matrix that includes the unity matrix).

Having identified the initial recovery number of storage units, the inbound DST processing 82 identifies a storage unit of the initial recovery number of storage units having a rebuilding issue. For example, the inbound DST processing 82 receives a slice availability information from the DST execution unit set 460 that indicates DST execution unit 2 has a one slice rebuilding issue, DST execution unit 4 as a two slice rebuilding issue, DST execution unit 6 has a greater than two slice rebuilding issue, DST execution unit 8 has a two slice rebuilding issue, and DST execution unit 10 has a one slice rebuilding issue. In particular, the inbound DST processing 82 identifies the DST execution unit 6 with the rebuilding issue (e.g., most severe).

Having identified the storage unit having the rebuilding issue, the inbound DST processing 82 determines whether the rebuilding issue is correctable at the local storage unit level or at a DSN level (e.g., requiring accessing multiple storage units to produce one or more rebuilt encoded data slices). As a specific example, the inbound DST processing 82 obtains DSN level rebuilding information (e.g., retrieves a list of encoded data slices to be rebuilt), interprets the DSN level rebuilding information to identify one or more encoded data slices of the plurality of encoded data slices requiring rebuilding (e.g., greater than two slices of the encoded data slices 61-70 associated with DST execution unit 6), identifies the storage unit having the rebuilding issue based on the identity of the one or more encoded data slices requiring rebuilding (e.g., performs a lookup to identify a DST execution unit 6 based on slice names associated with encoded data slices 61-70), and determines that the storage unit having the rebuilding issue is capable of locally rebuilding the one or more encoded data slices requiring rebuilding when the number of encoded recovery data slices in the local set of encoded recovery data slices is equal to or greater than the number of encoded data slices in the one or more encoded data slices requiring rebuilding (e.g., the number of error coded slices 1-2 is greater than the number of slice errors, i.e., locally rebuild up to two slices such as for DST execution units 2, 4, 8, and 10). As another specific example, the slice errors of DST execution unit 6 require correction at the DSN level since greater than two encoded data slices require rebuilding.

When the rebuilding issue is correctable at the DSN level (e.g., exclusively or non-exclusively), the inbound DST processing 82 selects another storage unit from remaining storage units of the set of storage units to replace the storage unit (e.g., DST execution unit 6) having the rebuilding issue that is correctable at the DSN level to produce a recovery number of storage units. The selecting the other storage unit includes determining that the other storage unit does not have the rebuilding issue or determining that the other storage unit has the rebuilding issues that is correctable at the local storage unit level. As a specific example, the inbound DST processing 82 selects DST execution unit 11 (e.g., no rebuilding issues) as the other storage unit when the DST execution unit 6 is only correctable of the DSN level. As another specific example, the DST processing 82 initially selects any or all of DST execution units 2, 4, 8, and 10 when the corresponding rebuilding issues are correctable at the local storage unit level.

Having produced the recovery number of storage units (e.g., DST execution units 1-5, 7-11), the inbound DST processing 82 sends, via the network 24, retrieve requests to the recovery number of storage units. For example, the inbound DST processing 82 generates a retrieve data segment request as retrieve requests 1-5, 7-11 that includes a data segment identifier associated with the data segment and sends, via the network 24, the retrieve requests 1-5, 7-11 to the DST execution units 1-5, 7-11. The inbound DST processing 82 receives encoded data slices from at least some of the DST execution units of the recovery number of storage units (e.g., slices 1-10, rebuilt slice 13, slices 14-22, slices 25-34, rebuilt slice 37, slices 38-45, rebuilt slice 46, slices 49-58, slices 73-82, rebuilt slice 85, slices 86-93 rebuilt slice 94, slices 97-106, rebuilt slice 109, slices 110-118, slices 121-130=100 slices) and dispersed storage error decodes the received encoded data slices to produce the recovered data 464 (e.g., a reproduced data segment).

When the rebuilding issue is correctable at the local level, the inbound DST processing 82 sends, via the network 24, the retrieve requests to the initial recovery number of storage units. In response to one of the retrieve requests, the storage unit having the rebuilding issue that is correctable at the local level rebuilds an encoded data slice of the recovery threshold number of encoded data slices based on the local set of encoded recovery data slices to produce a rebuilt encoded data slice. For example, DST execution unit 2 rebuilds encoded data slice 13 of the rebuilding issue of DST execution unit 2 to produce rebuilt encoded data slice 13. Having produced the rebuilt encoded data slice, the storage unit having the rebuilding issue that is correctable at the local level sends the rebuilt encoded data slice and remaining encoded data slices of the recovery threshold number of encoded data slices to the inbound DST processing 82 (e.g., the device). For example, DST execution unit 2 sends, via the network 24, rebuilt encoded data slice 13 and encoded data slices 14-22 to the inbound DST processing 82. Having received the encoded data slices (e.g., including rebuilt encoded data slices) from the initial recovery number of storage units, the inbound DST processing 82 dispersed storage error decodes the received encoded data slices to produce the recovered data 464.

Figure 44D:
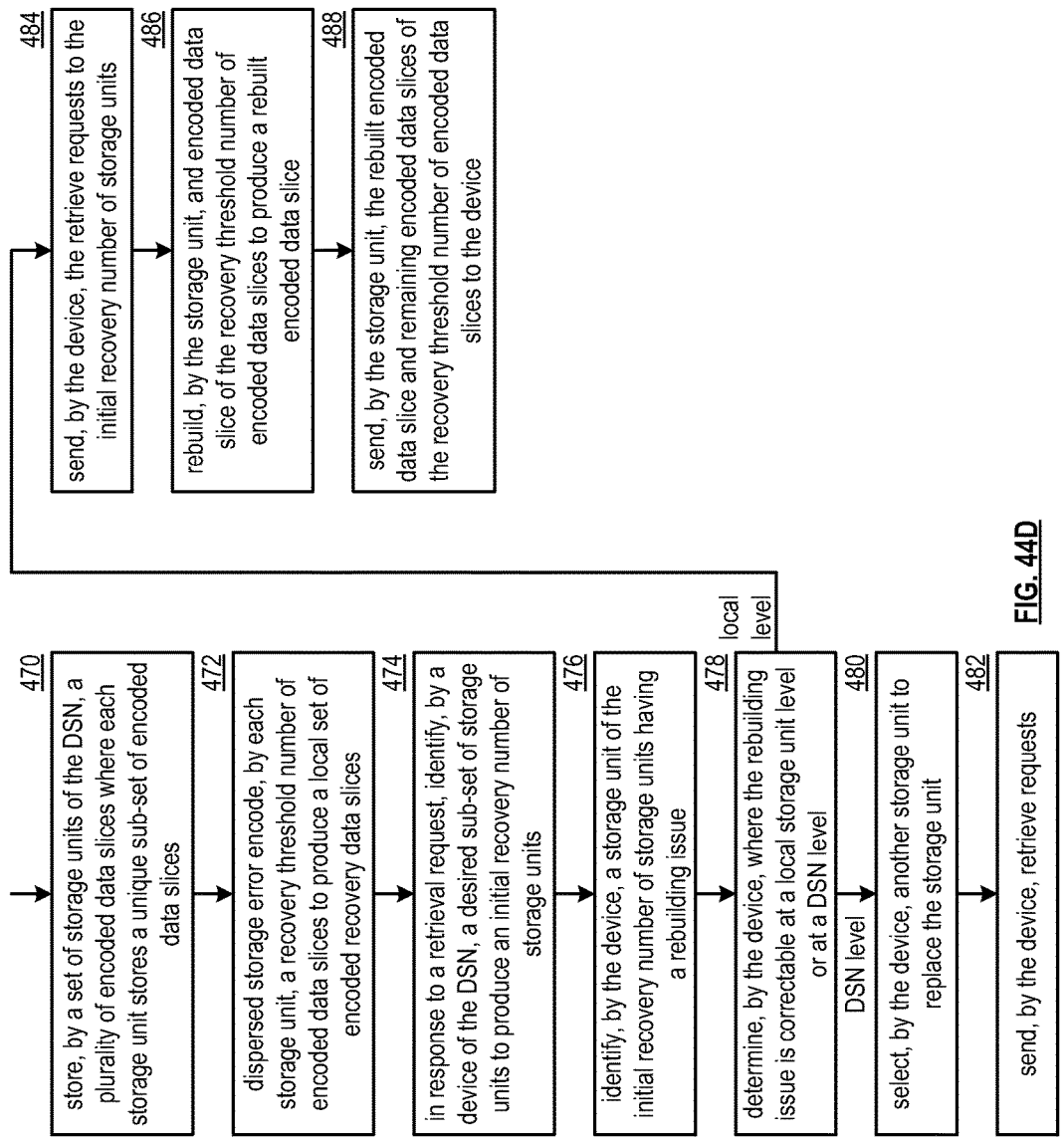
FIG. 44D is a flowchart illustrating another example of accessing data based on a dispersed storage network (DSN) rebuilding issue in accordance with the present invention.

FIG. 44D is a flowchart illustrating an example of accessing data based on a dispersed storage network (DSN) rebuilding issue. In particular, a method is presented for use in conjunction with one or more functions and features described in conjunction with FIGS. 1-39, 44A-C, and also FIG. 44D. The method begins at step 470 where one or more processing modules of a set of storage units of a dispersed storage network (DSN) stores a plurality of encoded data slices, where each storage unit of the set of storage units stores a unique sub-set of encoded data slices of the plurality of encoded data slices and where a data segment of data is dispersed storage error encoded to produce the plurality of encoded data slices. For example, each storage unit stores 12 encoded data slices when a number of storage units is 14 and an information dispersal algorithm width associated with the dispersed storage error encoding is 168.

The method continues at step 472 where each storage unit of the set of storage units dispersed storage error encodes at least a recovery threshold number of encoded data slices of the unique sub-set of encoded data slices to produce a local set of encoded recovery data slices. For example, the storage unit dispersed storage error encodes 12 encoded data slices when the recovery threshold number of encoded data slices is equal to the number of encoded data slices in the unique sub-set of encoded data slices. As another example, the storage unit dispersed storage error encodes 10 encoded data slices when the recovery threshold number of encoded data slices is less than the number of encoded data slices in the unique sub-set of encoded data slices. When the recovery threshold number of encoded data slices is less than the number of encoded data slices in the unique sub-set of encoded data slices, each storage unit may overwrite one or more encoded data slices of the unique sub-set of encoded data slices with the local set of encoded recovery data slices. For example, each storage unit overwrites two encoded data slices of the unique sub-set of encoded data slices when the recovery threshold number of encoded data slices is 10 and the local set of encoded recovery data slices is 12

In response to a retrieval request for the data segment, the method continues at step 474 where a device of the DSN (e.g., an inbound distributed storage and task module, a DST processing unit, a user device) identifies a desired sub-set of storage units of the set of storage units to produce an initial recovery number of storage units, where the recovery threshold number of encoded data slices from the recovery number of storage units is approximately equal to a decode threshold number of the plurality of encoded data slices, where the decode threshold number corresponds to a minimum number of encoded data slices of the plurality of encoded data slices that is required to recover the data segment.

The identifying the desired sub-set of storage units includes one or more of identifying the desired sub-set of storage units based on reliability of the storage units in the desired sub-set of storage units, identifying the desired sub-set of storage units based on decoding efficiency of the unique sets of encoded data slices stored by the storage units in the desired sub-set of storage units, and identifying the desired sub-set of storage units based on availability of the storage units in the desired sub-set of storage units. The method continues at step 476 where the device identifies a storage unit of the initial recovery number of storage units having a rebuilding issue.

The method continues at step 478 where the device determines whether the rebuilding issue is correctable at a local storage unit level or at a DSN level. For example, the device obtains DSN level rebuilding information, interprets the DSN level rebuilding information to identify one or more encoded data slices of the plurality of encoded data slices requiring rebuilding, identifies the storage unit having the rebuilding issue based on the identity of the one or more encoded data slices requiring rebuilding, and determines that the storage unit having the rebuilding issue is capable of locally rebuilding the one or more encoded data slices requiring rebuilding when the number of encoded recovery data slices in the local set of encoded recovery data slices is equal to or greater than the number of encoded data slices in the one or more encoded data slices requiring rebuilding. The method branches to step 484 when the rebuilding issue is correctable at the local storage unit level. The method continues to step 480 when the rebuilding issue is correctable at the DSN level.

When the rebuilding issue is correctable at the DSN level, the method continues at step 480 where the device selects another storage unit from remaining storage units of the set of storage units to replace the storage unit having the rebuilding issue that is correctable at the DSN level to produce a recovery number of storage units. The selecting includes determining that the other storage unit does not have the rebuilding issue or determining that the other storage unit has the rebuilding issues that is correctable at the local storage unit level. The method continues at step 482 where the device sends retrieve requests to the recovery number of storage units such that the device may decode received encoded data slices from at least some of the recovery number of storage units to reproduce the data.

When the rebuilding issue is correctable at the local level, the method continues at step 484 where the device sends the retrieve requests to the initial recovery number of storage units. In response to one of the retrieve requests, the method continues at step 486 where the storage unit having the rebuilding issue that is correctable at the local level rebuilds an encoded data slice of the recovery threshold number of encoded data slices based on the local set of encoded recovery data slices to produce a rebuilt encoded data slice. The method continues at step 488 where the storage unit having the rebuilding issue that is correctable at the local level sends the rebuilt encoded data slice and remaining encoded data slices of the recovery threshold number of encoded data slices to the device such that the device can dispersed storage error decode received encoded data slices to reproduce the data.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

Figure 45A:
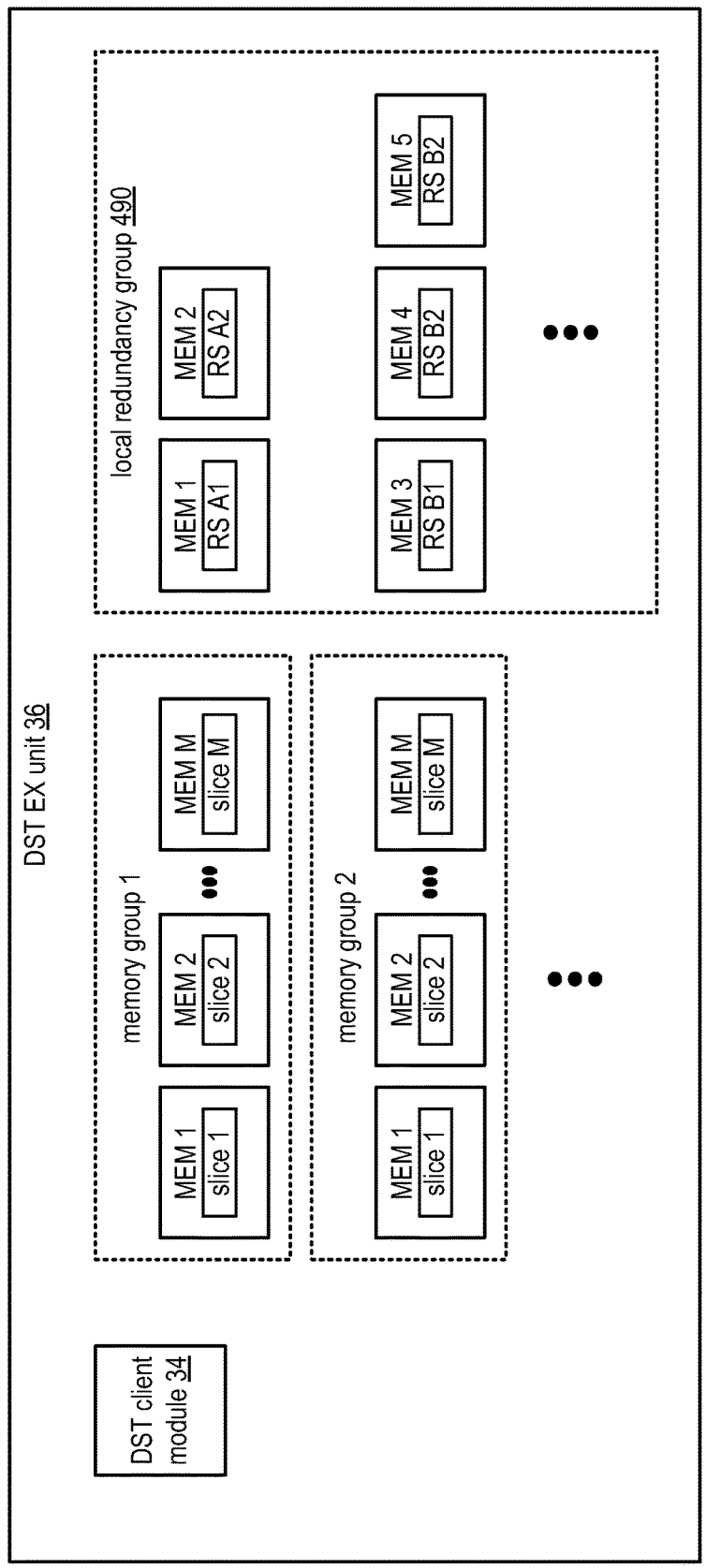
FIG. 45A is a schematic block diagram of another embodiment of a dispersed storage and task (DST) execution (EX) unit 36 in accordance with the present invention.

FIG. 45A is a schematic block diagram of another embodiment of a dispersed storage and task (DST) execution (EX) unit 36 that includes the DST client module 34 of FIG. 1, one or more memory groups 1-2, and a local redundancy group 490. The one or more memory groups 1-2 each includes a set of memories 1-M. The local redundancy group 490 includes a plurality of memories 1-5. Alternatively, each memory group in the local redundancy group may include any number of memories. The DST execution unit 36 functions to store encoded data slices with local redundancy protection.

In an example of operation of storing encoded data slices, the DST client module 34 identifies one or more groups of memory devices based on one or more common affiliations. The affiliations includes one or more of storage of a plurality of encoded data slices associated with a common data object, of a common manufacture, of a common model number, of a similar age, associated with a similar utilization level, associated with a similar historical performance level, associated with an estimated future performance level, and associated with a similar failure rate. For example, the DST client module 34 identifies the memory group 1 to include the memories 1-M where the memories 1-M of the memory group 1 store encoded data slices associated with a common data object. As another example, the DST client module 34 identifies the memory group 2 to include memories 1-M where the memories 1-M of the memory group 2 store encoded data slices associated with another common data object.

Having identified the one or more groups of memory devices, the DST client module 34, for each memory group, determines an estimated future performance level. The estimated future performance level includes one or more of mean time between failure, a failure rate, and a number of respected failures over a rebuilding time window. Having determined the estimated future performance level, the DST client module 34 determines a local redundancy approach based on the estimated future performance level and a number of memory devices of the memory group. The local redundancy approach includes dispersed storage error coding function parameters, where the premise includes an information dispersal algorithm width and a decode threshold number. For example, the processing module determines the local redundancy approach to include the decode threshold number as the number of memory devices of the memory group and a number of redundancy slices based on the number of potential failures during the rebuilding time window. For instance, the DST client module 34 utilizes M as the decode threshold number and indicates to generate two error coded slices for the first memory group and three error coded slices for the second memory group.

Having determined the local redundancy approach, the DST client module 34 selects one or more groupings of encoded data slices stored in the group of memory devices, where each grouping includes a decode threshold number of encoded data slices. For example, the processing module selects affiliated encoded data slices such as encoded data slices of a common data object. For each selected grouping of encoded data slices, the DST client module 34 dispersed storage error encodes the grouping of the encoded data slices in accordance with the local redundancy approach to produce one or more redundancy slices. For example, the DST client module 34 dispersed storage error encodes encoded data slices 1-M of the memory group 1 to produce redundancy slices A1 and A2. As another example, the DST client module 34 dispersed storage error encodes encoded data slices 1-M of the memory group 2 to produce redundancy slices B1, B2, and B3.

For each redundancy encoded data slice, the DST client module 34 stores the redundancy encoded data slice in a memory of a local redundancy group. The storing includes storing the redundancy encoded data slices in a common memory and storing the redundancy encoded data slices in different memories. For example, the DST client module 34 stores redundancy encoded data slice A1 in a first memory of the local redundancy group and stores redundancy encoded data slice A2 in a second memory of the local redundancy group when a highest level of retrieval reliability is desired. When detecting a storage error of an encoded data slice of the slice grouping, the DST client module 34 rebuilds the encoded data slice utilizing the other encoded data slices of the slice grouping and at least one of the one or more redundant encoded data slices. For example, when detecting a storage error associated with encoded data slice 2 of memory group 2, the DST client module 34 retrieves encoded data slices 1, 3-M from the memory group 2 and retrieves redundancy encoded data slice B1 from memory three of the local redundancy group, dispersed storage error decodes the retrieved encoded data slices to reproduce encoded data slice 2.

Figure 45B:
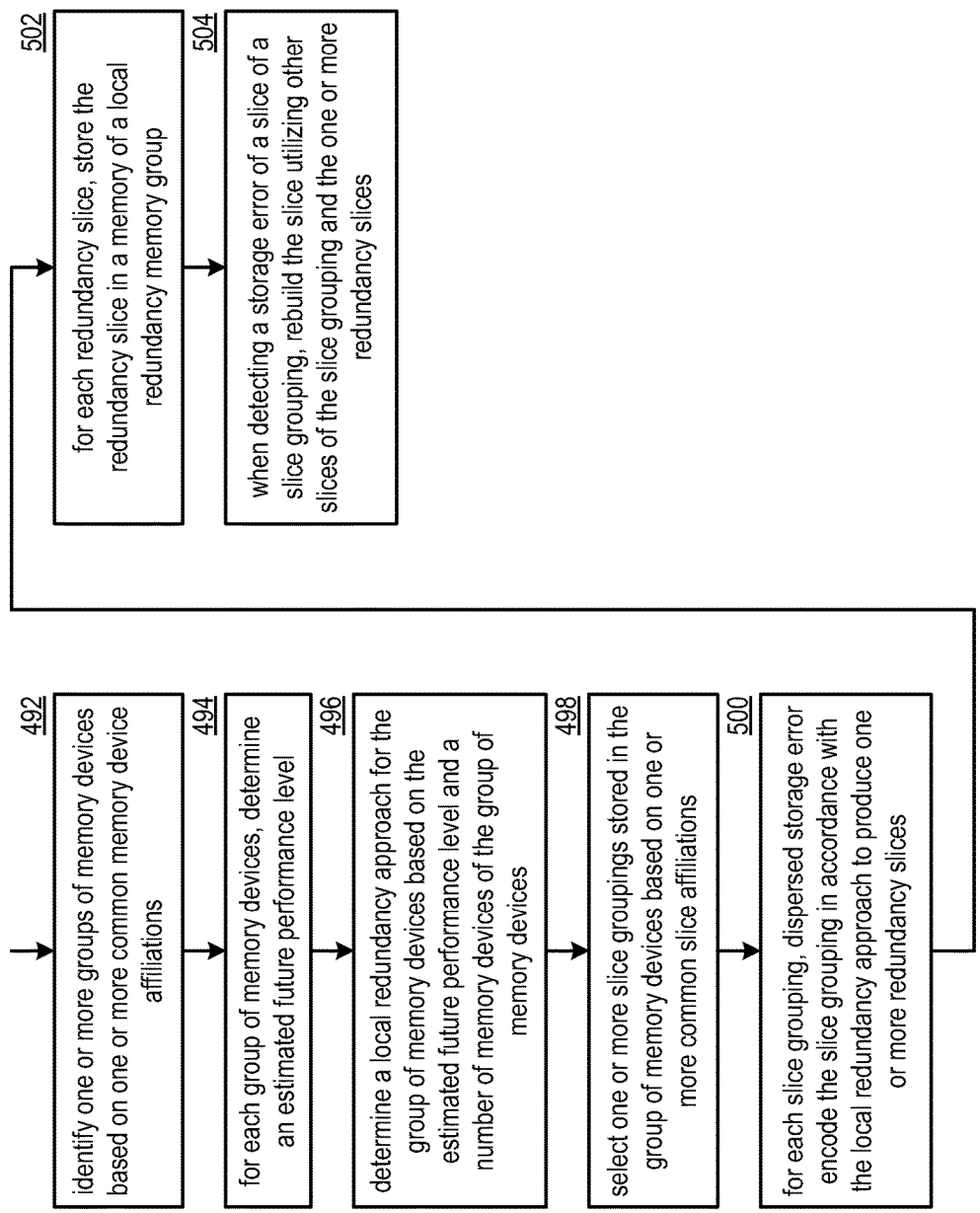
FIG. 45B is a flowchart illustrating an example of rebuilding an encoded data slice in accordance with the present invention.

FIG. 45B is a flowchart illustrating an example of rebuilding and encoded data slice. The method begins or continues at step 492 where a processing module (e.g., of a distributed storage and task (DST) client module) identifies one or more groups of memory devices based on one or more common memory device affiliations. The identifying may include one or more of interpreting a system registry entry, the shooting a query, and receiving a query response. For each group of memory devices, the method continues at step 494 where the processing module determines an estimated future performance level.

The method continues at step 496 where the processing module determines a local redundancy approach for the group of memory devices based on the estimated future performance level and a number of memory devices of the group of memory devices. For example, the processing module determines not to utilize redundancy when future performance compares favorably to a performance threshold level. As another example, the processing module determines to produce the redundancy slices when detecting a first error and further expecting a second error with a 50% probability level during a rebuilding time window.

Having determined the local redundancy approach, the method continues at step 498 where the processing module selects one or more slice groupings are stored in the group of memory devices based on one or more common slice affiliations. For example, the processing module selects slices of a common data object. As another example, the processing module selects slices of a common vault.

For each slice grouping, the method continues at step 500 where the processing module dispersed storage error encodes the slice grouping in accordance with the local redundancy approach to produce one or more redundancy slices. For example, the processing module matrix multiplies rows of an encoding matrix associated with redundancy slices by the slice groupings to produce the redundancy slices. For each redundancy slice, the method continues at step 502 where the processing module stores the redundancy slice in a memory of a local redundancy memory group. When detecting a storage error of a slice of a slice grouping, the method continues at step 504 where the processing module rebuilds the slice utilizing other slices of the slice grouping in the one or more redundant slices.

Figure 46A:
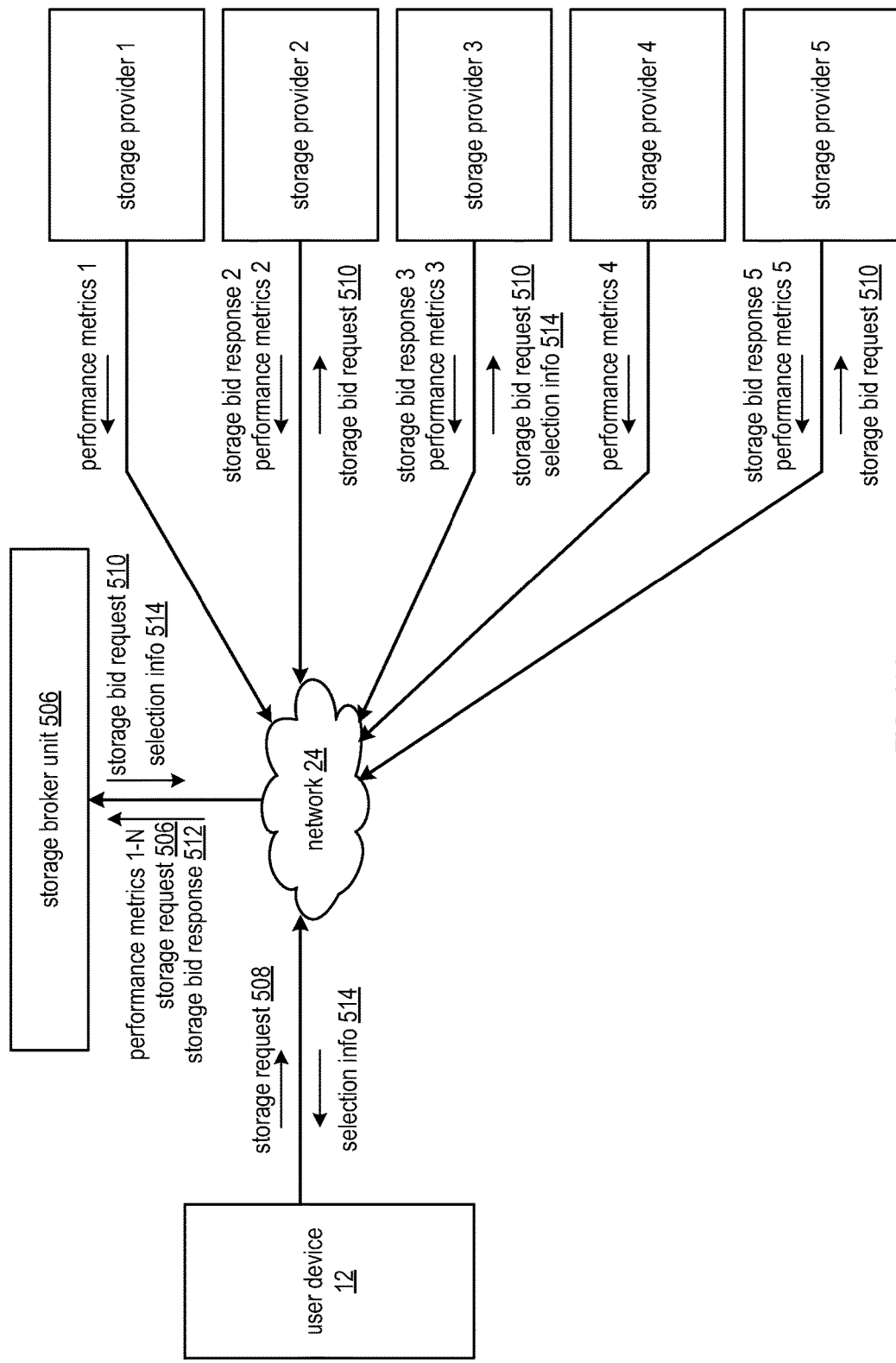
FIG. 46A is a schematic block diagram of another embodiment of a dispersed storage network (DSN) in accordance with the present invention.

FIG. 46A is a schematic block diagram of another embodiment of a dispersed storage network (DSN) that includes the user device 12 of FIG. 1, a storage broker unit 506, the network 24 of FIG. 1, and a plurality of storage providers 1-5. Alternatively, the DSN may include any number of storage providers. Each storage provider includes at least one of a sub-dispersed storage network, a commercial entity providing storage resources, a private entity providing storage resources, a memory system, and a memory device. The storage broker unit 506 may be implemented utilizing the distributed storage and task (DST) processing unit 16 of FIG. 1. The DSN functions to provide storage resources of one or more storage providers to the user device 12.

In an example of operation of providing the storage resources, the storage broker unit 506 obtains performance metrics 1-N for the plurality of storage providers. The storage metrics includes one or more of a storage availability level, a data retrieval reliability level, a data storage type, a data access latency performance level, and a data storage cost level. The obtaining includes at least one of receiving from the plurality of storage providers, receiving from the user device 12, interpreting a storage record, and interpreting an error message.

Having obtained the performance metrics, the storage broker unit 506 receives, via the network 24, a storage request 508 from the user device 12. The storage request 508 includes one or more of a data size indicator, an estimated data storage duration, a required storage availability level, a required storage retrieval reliability level, a desired cost level, a requesting entity identifier, a preferred storage provider identifier, and a preferred dispersed storage error coding function.

Having received the storage request 508, the storage broker unit 506 selects one or more candidate storage providers of the plurality of storage providers based on the performance metrics and the storage request. For example, the storage broker unit identifies one or more storage providers that meet minimum requirements of the storage request (e.g., storage providers 2, 3, and 5). Having selected one or more candidate storage providers, the storage broker unit 506 issues, via the network 24, a storage bid request 510 to the selected one or more candidate storage providers, where the storage bid request 510 includes a portion of the storage request. Having issued the storage bid request 510, the storage broker unit 506 receives one or more storage bid responses 512 from the selected one or more candidate storage providers.

Having received the storage bid responses 512, the storage broker unit 506 selects at least one storage provider of the candidate storage providers based on the storage bid responses and the storage request. For example, the storage broker unit 506 selects a storage provider associated with a lowest cost. As another example, the storage broker unit selects a storage provider associated with best performance. As yet another example, the storage over unit selects a storage provider associated with best fit for the requested dispersed storage error coding function.

Having selected the one or more storage providers (e.g., storage provider 3), the storage broker unit 506 issues, via the network 24, selection information 514 to the user device 12 and to the at least one storage provider (e.g., storage provider 3). The selection information 514 includes one or more of a selected dispersed storage error coding function identifier, pricing information, a data size indicator, a data storage duration indicator, the requesting entity identifier, and a selected storage provider identifier.

Figure 46B:
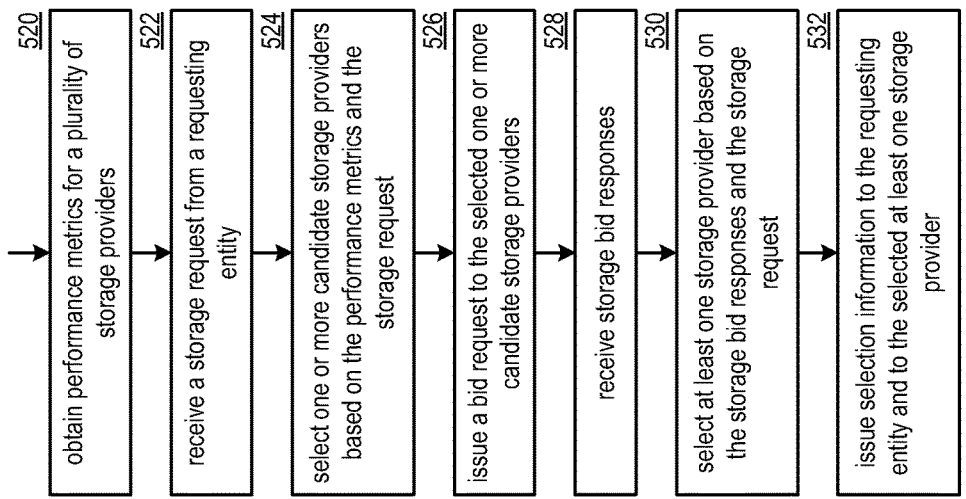
FIG. 46B is a flowchart illustrating an example of brokering selection of a dispersed storage network (DSN) in accordance with the present invention.

FIG. 46B is a flowchart illustrating an example of brokering selection of a dispersed storage network (DSN). The method begins or continues at step 520 where a processing module (e.g., of a storage broker unit) obtains performance metrics for a plurality of storage providers. The method continues at step 522 where the processing module receives a storage request from a requesting entity. The method continues at step 524 where the processing module selects one or more candidate storage providers based on the performance metrics and the storage request. The selecting includes comparing attributes of the storage request attributes of the performance metrics to identify one or more storage providers where the attributes of the performance metrics compares favorably to the attributes of the storage request.

The method continues at step 526 where the processing module issues a bid request to the selected one or more candidate storage providers. The method continues at step 528 where the processing module receives one or more storage bid responses. The method continues at step 530 where the processing module selects at least one storage provider based on the storage bid responses in the storage request. As a specific example, the processing module obtains selection criteria (e.g., received from the requesting entity, a predetermination determined based on the request of the responses), and identifies at least one storage bid response that includes attributes the compare favorably to the attributes of the storage request in accordance with the selection criteria.

The method continues at step 532 where the processing module issues selection information to the requesting entity and to the selected at least one storage provider. As a specific example, the processing module generates the selection information to include one or more of a dispersed storage error coding function identifier, pricing information, a data size indicator, a data storage duration, a requesting entity identifier, a storage provider identifier, a secondary storage provider identifier, and a binding timeframe for utilization of the selected storage provider.

Figure 47A:
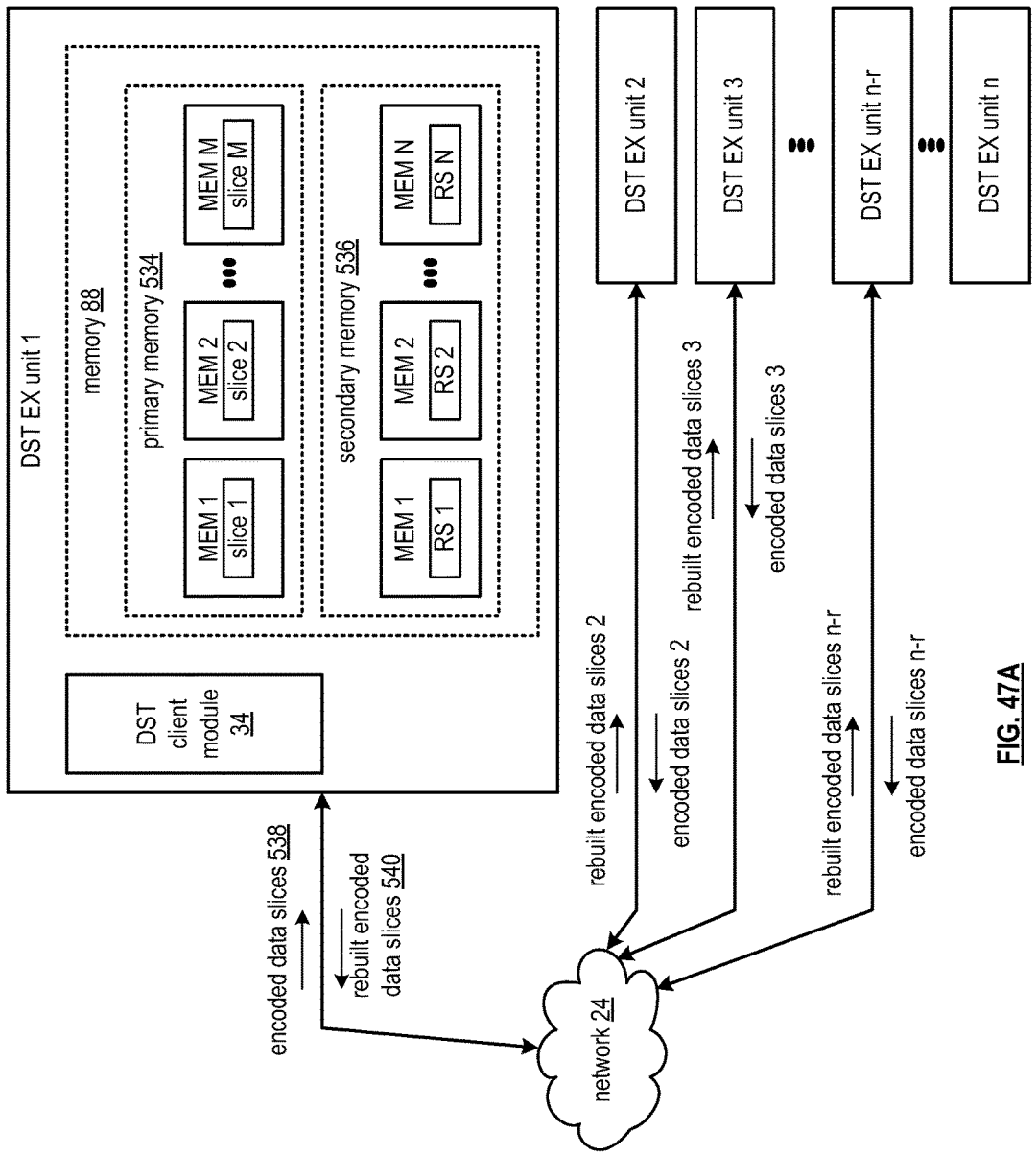
FIG. 47A is a schematic block diagram of another embodiment of a dispersed storage network (DSN) in accordance with the present invention.

FIG. 47A is a schematic block diagram of another embodiment of a dispersed storage network (DSN) that includes the network 24 of FIG. 1 and a set of distributed storage and task (DST) execution units 1-n. Each DST execution unit may be implemented utilizing the DST execution unit 36 of FIG. 1. Each DST execution unit includes the DST client module 34 of FIG. 1 and the memory 88 of FIG. 3. The memory 88 includes a primary memory 534 and a secondary memory 536. The primary memory 534 includes a plurality of memory devices 1-M and the secondary memory 536 includes another plurality of memory devices 1-N.

The DSN functions to rebuild an encoded data slice associated with a storage error, where one or more data segments are encoded to produce one or more sets of encoded data slices for storage in the set of DST execution units. Each DST execution unit stores a group of encoded data slices 530 in the primary memory, where the group of encoded data slices includes a corresponding at least one encoded data slice of each set of encoded data slices. For example, DST execution unit 1 stores encoded data slices 1-M in the memory devices 1-M, where encoded data slices 1-M are associated with each of M sets of encoded data slices associated with storage of a data object.

In an example of operation of the rebuilding of the encoded data slice, the DST client module 34 of the DST execution unit 1 selects the corresponding group of encoded data slices for additional error protection. The selecting may be based on one or more of a probability of a storage error, a predetermination, an error message, a request, and identifying a common affiliation of encoded data slices stored in the primary memory (e.g., associated with a common data object, associated with a portion of a common data object, associated with two or more common data objects of a common vault, associated with any data object of the common vault). For example, the DST client module 34 selects the encoded data slices associated with slice names, where the slice names are substantially the same, except for a segment number field (e.g., encoded data slices of the common data object).

Having selected the group of encoded data slices, the DST client module 34 obtains the selected group of encoded data slices. For example, the DST client module 34 retrieves the group of encoded data slices from the memory devices of the primary memory 534. As another example, the DST client module 34 issues, via the network 24, a read slice request to at least one other DST execution unit, and extracts the group of encoded data slices from received read slice responses when the DST client module 34 selects one or more encoded data slices of one or more other DST execution units. For instance, the DST client module 34 of DST execution unit 1 retrieves n-r encoded data slices of a set of encoded data slices when selecting a subset of a set of encoded data slices as the group of encoded data slices sharing a common affiliation including an association with a common set of encoded data slices.

Having obtained the selected group of encoded data slices, the DST client module 34 dispersed storage error encodes the selected group of encoded data slices to produce one or more local redundancy slices. For example, the DST client module 34 encodes encoded data slices 1-M from the primary memory of DST execution unit 1 to produce local redundancy slices 1 and 2. Having produced the one or more local redundancy slices, the DST client module 34 determines an expected access frequency of the one or more local redundancy slices (e.g., estimated frequency of reading, estimated frequency of updating). The determining may be based on one or more of a probability of a storage error, a historical error record, a data type indicator, a request, and an interpretation of a portion of a system registry. For example, the DST client module 34 determines the expected access frequency to be lower than average when the probability of the storage error is less than a low storage error threshold level.

Having determined the expected access frequency, the DST client module 34 selects a memory for storage of the one or more local redundancy slices based on one or more of the expected access frequency, cost requirements, and performance requirements. For example, the DST client module 34 selects the primary memory 534 when the expected access frequency is greater than a high access frequency threshold level and the primary memory includes memory devices associated with favorable expected performance to support a higher access frequency. As another example, the DST client module 34 selects the secondary memory 536 when the expected access frequency is less than a low access frequency threshold level and the secondary memory includes memory devices associated with favorable cost and long-term storage reliability levels to support a lower access frequency.

Having selected the memory for storage, the DST client module 34 facilitates storage of the one or more local redundancy slices in the selected memory. For example, the DST client module 34 stores the local redundancy slices 1 and 2 in memory devices 1 and 2 of the secondary memory when the selected memory includes the secondary memory. The DST client module 34 may facilitate activation and deactivation of the secondary memory in accordance with a cost-saving approach (e.g., less power and longer service life for the member devices of the secondary memory). For example, when storing the local redundancy slices 1 and 2 in the secondary memory, the DST client module 34 initiates the storing by activating power to the secondary memory. When verifying that the storing of the local redundancy slices has been completed, the DST client module 34 may deactivate the secondary memory.

When detecting a storage error associated with an encoded data slice of the group of encoded data slices, the DST client module 34 facilitates retrieval of a read threshold number of encoded data slices 538 of other encoded data slices of the group of encoded data slices and the one or more local redundancy slices to produce retrieved slices. For example, the DST client module 34 retrieves encoded data slices from the primary memory and local redundancy slices from the secondary memory 536 when the local redundancy slices are located in the secondary memory and are associated with the encoded data slices of the primary memory. As another example, the DST client module 34 issues read slice requests to other DST execution units to retrieve the other encoded data slices of the group of encoded data slices and retrieves local redundancy slices from the secondary memory 536 when the local redundancy slices are located in the secondary memory and are associated with the encoded data slices in the other DST execution units. For instance, the DST client module 34 receives encoded data slices 2, 3, through n-r from DST execution units 2, 3, through n-r and local redundancy slices 1 and 2 from the secondary memory.

Having retrieved the read threshold number of encoded data slices, the DST client module 34 decodes a decode threshold number of retrieved encoded data slices to produce a rebuilt encoded data slice 540 for the encoded data slice associated with the storage error. Having produced the rebuilt encoded data slice 540, the DST client module 34 facilitates storage of the rebuilt encoded data slice 540. For example, the DST client module 34 stores the rebuilt encoded data slice in the primary memory 534 when the encoded data slice associated with the storage error is associated with the primary memory. As another example, the DST client module 34 issues, via the network 24, a write slice request to another DST execution unit, where the write slice request includes the rebuilt encoded data slice 540, when the other DST execution unit is associated with storage of the encoded data slice associated with the storage error. For instance, the DST client module 34 sends, via the network 24, rebuilt encoded data slice 3 to DST execution unit 3 when an encoded data slice 3 of DST execution unit 3 is associated with the storage error.

Figure 47B:
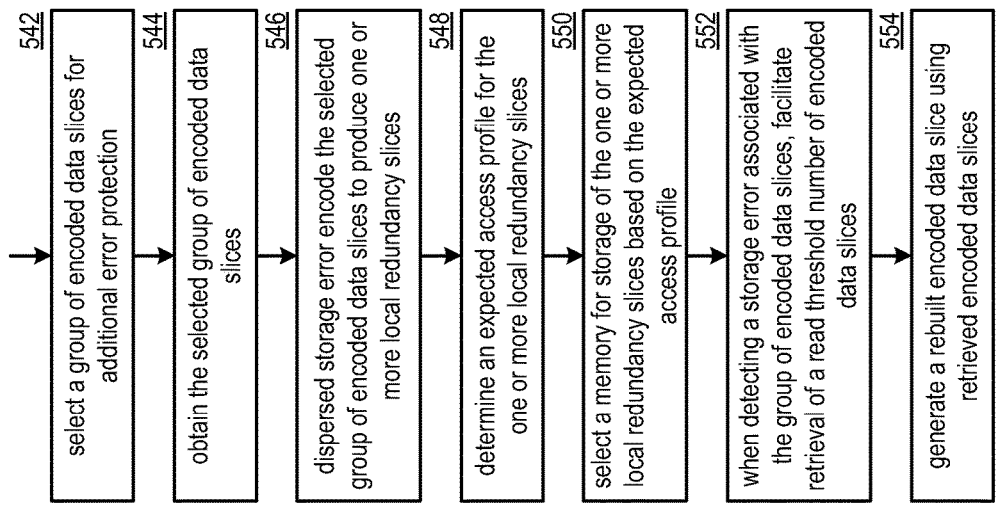
FIG. 47B is a flowchart illustrating an example of another rebuilding an encoded data slice in accordance with the present invention.

FIG. 47B is a flowchart illustrating an example of another rebuilding an encoded data slice. The method begins or continues at step 542 where a processing module (e.g., of a distributed storage and task (DST) client module) selects a group of encoded data slices for additional error protection. The method continues at step 544 where the processing module obtains the selected group of encoded data slices. The method continues at step 546 where the processing module dispersed storage error encodes the selected group of encoded data slices to produce one or more local redundancy slices.

The method continues at step 548 where the processing module determines an expected access profile for the one or more local redundancy slices. The access profile includes one or more of estimated frequency of reading and estimated frequency of updating. The determining may be based on one or more of a probability of a storage error, an error record, an error message, a data type indicator, an expected access profile based on a data type, and a request.

The method continues at step 550 where the processing module selects a memory for storage of the one or more local redundancy slices based on the expected access profile. For example, the processing module selects the memory based on one or more of characteristics of available memory devices, the expected access profile, and a performance goal.

When detecting a storage error associated with the group of encoded data slices, the method continues at step 552 where the processing module facilitates retrieval of a read threshold number of encoded data slices. The read threshold is greater than or equal to a decode threshold and less than or equal to an information dispersal algorithm width. Each set of encoded data slices includes the information dispersal algorithm width number of slices. A decode threshold number of encoded data slices of a set of encoded data slices is required for recovery when decoding recovered encoded data slices to reproduce a corresponding data.

The method continues at step 554 where the processing module generates a rebuilt encoded data slice using retrieved encoded data slices. For example, the processing module dispersed storage error decodes a decode threshold number of retrieved encoded data slices to reproduce a data segment, dispersed storage error encodes the data segment to produce a rebuilt set of encoded data slices that includes the rebuilt encoded data slice, and facilitates storage of the rebuilt encoded data slice in a memory associated with an encoded data slice of the storage error.

FIGS. 48A-48B are a schematic block diagram of another embodiment of a dispersed storage network (DSN) that includes the outbound distributed storage and task (DST) processing 80 of FIG. 3, the inbound DST processing 82 of FIG. 3, the network 24 of FIG. 1, and a set of DST execution (EX) units 1-n. Each DST execution unit includes the processing module 84 of FIG. 3 and at least one memory. For example, the at least one memory includes a first memory (e.g., memory 1) for storage of encoded data slices and a second memory (e.g., memory 2) for storage of encoded recovery data slices (ERS). Each DST execution unit may be implemented utilizing the DST execution unit 36 of FIG. 1. Each memory may be implemented utilizing the memory 88 of FIG. 3. Hereafter, each DST execution unit may be interchangeably referred to as a storage unit, the set of DST execution units may be interchangeably referred to as a set of storage units, and the inbound DST processing 82 may be interchangeably referred to as a requesting computing device (e.g., when in conjunction with the DST processing unit 16 of FIG. 1 or with in conjunction with the user device 14 of FIG. 1). The DSN functions to access data, where the accessing includes storing the data to produce stored data and retrieving the stored data to produce recovered data.

FIG. 48A illustrates steps of an example of operation of the storing of the data to produce stored data where the outbound DST processing 80 dispersed storage error encodes a plurality of data segments to produce a plurality of sets of encoded data slices, where the data object includes the plurality of data segments. For example, the outbound DST processing 80 divides data object A into Y data segments and dispersed storage error encodes each data segment to produce Y sets of encoded data slices 1-n. For instance, a first set of encoded data slices includes encoded data slices A-1-1 through A-n-1, a second set of encoded data slices includes encoded data slices A-1-2 through A-n-2, through a Yth set of encoded data slices includes encoded data slices A-1-Y through A-n-Y.

Having produced the plurality of sets of encoded data slices, the outbound DST processing 80 sends, via the network 24, the plurality of sets of encoded data slices to the set of DST execution units for storage, where each storage unit of the set of storage units stores a unique group of encoded data slices of the plurality of sets of encoded data slices in the first memory (e.g., one encoded data slice per set, multiple encoded data slices per set, slices associated with a common pillar number, any other combination). For example, the outbound DST processing 80 sends encoded data slices A-1-1, A-1-2, through A-1-Y to the DST execution unit 1 for storage in the first memory as the unique group of encoded data slices associated with the first storage unit when a first encoded data slice of each set of encoded data slices is to be included in the unique group of encoded data slices associated with the first storage unit.

Each storage unit receiving and storing a corresponding unique group of encoded data slices dispersed storage error encodes at least some of encoded data slices of the unique group of encoded data slices to produce a local set of encoded recovery data slices. For example, the processing module 84 of the DST execution unit 1 dispersed storage error encodes the unique group of encoded data slices that includes the encoded data slices A-1-1, A-1-2, through A-1-Y to produce the local set of encoded recovery data slices that includes encoded recovery data slice (ERS) A-1-a and A-1-b.

Having produced the local set of encoded recovery data slices, each storage unit stores the local set of encoded recovery slices in the second memory. As such, improved data retrieval reliability may be provided by storing the encoded data slices and the encoded recovery data slices in different memories. Alternatively, the encoded data slices and the encoded recovery data slices may be stored in a common memory. Having stored the encoded recovery slices, each storage unit may rebuild errant encoded data slices of the unique group of encoded data slices up to a number of encoded recovery data slices. For the example, the DST execution unit 1 may rebuild up to any two encoded data slices of the encoded data slices A-1-1, A-1-2, through A-1-Y utilizing a decode threshold number of available slices of remaining encoded data slices of the unique group of encoded data slices and the two encoded recovery data slices A-1-a and A-1-b.

FIG. 48B illustrates steps of an example of operation of the retrieving the stored data where the inbound DST processing 82 receives a retrieval request for data object A and issues retrieval requests (e.g., read slice requests) to at least a decode threshold number of storage units (e.g., storage units presumed to be storing a decode threshold number of encoded data slices for each set of encoded data slices to enable data recovery) of the set of storage units for the data object A. The issuing of the retrieval requests may include selecting the decode threshold number of storage units. When selecting the decode threshold number storage units, the inbound DST processing 82 selects the decode threshold number of storage units based on one or more of identifying the decode threshold number of storage units based on reliability of the storage units in the decode threshold number of storage units, identifying the decode threshold number of storage units based on decoding efficiency (e.g., how many errant encoded data slices, a number of available encoded data slices of the unique group of encoded data slices and the number of encoded recovery data slices, etc.) of the unique groups of encoded data slices stored by the storage units in the decode threshold number of storage units, and identifying the decode threshold number of storage units based on availability of the storage units in the decode threshold number of storage units.

With the retrieval requests issued, the set of storage units receives the retrieval request for the data object. Having received the retrieval request, each storage unit of the decode threshold number of storage units of the set of storage units sends, via the network 24, the unique group of encoded data slices to the inbound DST processing 82 (e.g., requesting computing device). For example, DST execution unit 2 sends, via the network 24, encoded data slices A-2-1 through A-2-Y to the inbound DST processing 82 as part of received slices 560.

Having sent the unique group of encoded data slices, one of the decode threshold number of storage unit sends, via the network 24, at least one encoded recovery data slice of the local set of encoded recovery data slices to the requesting computing device (e.g., inbound DST processing 82). For example, each storage unit of the decode threshold number of storage units determines whether the respective unique group of encoded data slices includes an encoded data slice requiring rebuilding and the one of the decode threshold number of storage units identifies the encoded data slice requiring rebuilding in the unique group of encoded data slices of the one of the decode threshold number of storage units. For instance, the DST execution unit 2 determines that encoded data slice A-2-3 requires rebuilding, identifies the encoded data slice A-2-3 as an errant encoded data slice, and sends, via the network 24, the encoded recovery data slice A-2-a to the inbound DST processing 82.

As another example of the sending the at least one encoded recovery data slice, the one of the decode threshold number of storage units identifies multiple encoded data slices in the unique group of encoded data slices of the one of the decode threshold number of storage units that require rebuilding and sends a unique encoded recovery data slice of the local set of encoded recovery data slices to the requesting computing device for each of the multiple encoded data slices that require rebuilding. For instance, the DST execution unit 1 identifies encoded data slices A-1-2 and A-1-3 as errant encoded data slices requiring rebuilding and sends, via the network 24, the encoded recovery data slices A-1-a and A-1-b to the inbound DST processing 82.

As yet another example of the sending the at least one encoded recovery data slice, each storage unit of the decode threshold number of storage units determines whether the respective unique group of encoded data slices includes an encoded data slice requiring rebuilding, a second one of the decode threshold number of storage units identifies the encoded data slice requiring rebuilding in the unique group of encoded data slices of the second one of the decode threshold number of storage units, and the second one of the decode threshold number of storage units sends at least one encoded recovery data slice of the local set of encoded recovery data slices of the second one of the decode threshold number of storage units to the requesting computing device. Alternatively, or in addition to, each storage unit of the decode threshold number of storage units sends at least one encoded recovery data slice of the respective local set of encoded recovery data slices to the requesting computing device. For example, when a number of encoded data slices of the unique group of encoded data slices compares favorably to the number of encoded data slices of the local set of encoded recovery data slices (e.g., greater than a threshold number), each storage unit sends each encoded recovery data slice to the inbound DST processing 82 as some of the received slices 560.

Having received the received slices 560, the inbound DST processing 82 identifies an errant encoded data slice of the unique group of encoded data slices from the one of the decode threshold number of storage units. The identifying the errant encoded data slice includes at least one of receiving an indication from the one of the decode threshold number of storage units (e.g., based on the identifying and indicating by the storage units), performing an integrity check on the errant encoded data slice (e.g., indicate errant when a stored integrity value does not substantially match a calculated integrity value), and identifying the errant encoded data slice from a rebuild list (e.g., identifying a slice name from the rebuild list that matches a slice name of an encoded data slice of the unique group of encoded data slices).

Having identified the errant encoded data slice, the inbound DST processing 82 corrects the errant encoded data slice based on remaining encoded data slices of the unique group of encoded data slices from the one of the decode threshold number of storage units and the local set of encoded recovery data slices (e.g., at least one) from the one of the decode threshold number of storage units to produce an updated unique group of encoded data slices. For example, the inbound DST processing 82 creates a rebuilt encoded data slice from the at least one encoded recovery data slice and remaining encoded data slices of the unique group of encoded data slices and replaces the errant encoded data slice with the rebuilt encoded data slice to produce the updated unique group of encoded data slices. For instance, the inbound DST processing 82 disperse storage error encodes encoded data slices A-1-1, A-1-4 through capital A-1 Y, and encoded recovery data slices A-1-a and A-1-b to produce rebuilt encoded data slices A-1-2 and A-1-3 to produce the updated unique group of encoded data slices corresponding to the DST execution unit 1.

Having produced the updated unique group of encoded data slices, the inbound DST processing 82 dispersed storage error decodes the updated unique group of encoded data slices and the unique groups of encoded data slices from remaining ones of the decode threshold number of storage units to recover the data object. For example, the inbound DST processing 82 disperse storage error decodes a decode threshold number of encoded data slices of the first set of encoded data slices to reproduce the first data segment, dispersed storage error decodes a decode threshold number of encoded data slices of the second set of encoded data slices (e.g., which may include a rebuilt encoded data slice A-1-2) to reproduce the second data segment, dispersed storage error decodes a decode threshold number of encoded data slices of the third set of encoded data slices (e.g., which includes rebuilt encoded data slices A-1-3, A-2-3, etc.) to reproduce the third data segment, etc.

Alternatively, or in addition to, the inbound DST processing 82 determines that a data segment of the plurality of data segments is unrecoverable due to a corresponding set of encoded data slices including less than a decode threshold number of uncorrupted encoded data slices (e.g., based on the received encoded data slices 560, based on interpreting a list slice responses). Having determined that the data segment is unrecoverable, the inbound DST processing 82 sends a request for the local set of encoded recovery data slices from each of the storage units of the decode threshold number of storage units and utilizes the local set of encoded recovery data slices from each of the storage units of the decode threshold number of storage units and the unique group of encoded data slices from the decode threshold number of storage units to recover the data segment. For example, the inbound DST processing 82 utilizes the local set of encoded recovery data slices from each of the storage units of the decode threshold number of storage units to recover the third data segment when a decode threshold number of encoded data slices of the third data segment are unrecoverable (e.g., missing, corrupted).

FIG. 48C is a flowchart illustrating an example of reliably recovering stored data. In particular, a method is presented for use in conjunction with one or more functions and features described in conjunction with FIGS. 1-39, 48A-B, and also FIG. 48C. The method begins at step 570 where one or more processing modules of a set of storage units of a dispersed storage network (DSN) receives a retrieval request for a data object, where the data object includes a plurality of data segments, and where the plurality of data segments is dispersed storage error encoded into a plurality of sets of encoded data slices. Each storage unit of the set of storage units stores a unique group of encoded data slices of the plurality of sets of encoded data slices and each storage unit dispersed storage error encodes at least some of encoded data slices of the unique group of encoded data slices to produce a local set of encoded recovery data slices.

The method continues at step 572 where each storage unit of a decode threshold number of storage units of the set of storage units sends the unique group of encoded data slices to a requesting computing device. For example, the requesting computing device selects the decode threshold number of storage units based on one or more of identifying the decode threshold number of storage units based on reliability of the storage units in the decode threshold number of storage units, identifying the decode threshold number of storage units based on decoding efficiency of the unique groups of encoded data slices stored by the storage units in the decode threshold number of storage units, and identifying the decode threshold number of storage units based on availability of the storage units in the decode threshold number of storage units.

The method continues at step 574 where one of the decode threshold number of storage units sends at least one encoded recovery data slice of the local set of encoded recovery data slices to the requesting computing device. For example, each storage unit of the decode threshold number of storage units determines whether the respective unique group of encoded data slices includes an encoded data slice requiring rebuilding and the one of the decode threshold number of storage units identifies the encoded data slice requiring rebuilding in the unique group of encoded data slices of the one of the decode threshold number of storage units. As another example, the one of the decode threshold number of storage units identifies multiple encoded data slices in the unique group of encoded data slices of the one of the decode threshold number of storage units that require rebuilding and sends a unique encoded recovery data slice of the local set of encoded recovery data slices to the requesting computing device for each of the multiple encoded data slices that require rebuilding.

As yet another example of the sending of the encoded recovery data slice, each storage unit of the decode threshold number of storage units determines whether the respective unique group of encoded data slices includes an encoded data slice requiring rebuilding, a second one of the decode threshold number of storage units identifies the encoded data slice requiring rebuilding in the unique group of encoded data slices of the second one of the decode threshold number of storage units, and the second one of the decode threshold number of storage units sends at least one encoded recovery data slice of the local set of encoded recovery data slices of the second one of the decode threshold number of storage units to the requesting computing device. Alternatively, or in addition to, each storage unit of the decode threshold number of storage units sends at least one encoded recovery data slice of the respective local set of encoded recovery data slices to the requesting computing device.

The method continues at step 576 where the requesting computing device identifies an errant encoded data slice of the unique group of encoded data slices from the one of the decode threshold number of storage units. The identifying the errant encoded data slice includes at least one of receiving an indication from the one of the decode threshold number of storage units, performing an integrity check on the errant encoded data slices, and identifying the errant encoded data slice from a rebuild list.

The method continues at step 578 where the requesting computing device corrects the errant encoded data slice based on remaining encoded data slices of the unique group of encoded data slices from the one of the decode threshold number of storage units and the local set of encoded recovery data slices (e.g., at least one) from the one of the decode threshold number of storage units to produce an updated unique group of encoded data slices. For example, the requesting computing device creates a rebuilt encoded data slice from the at least one encoded recovery data slice and remaining encoded data slices of the unique group of encoded data slices and replaces the errant encoded data slice with the rebuilt encoded data slice to produce the updated unique group of encoded data slices.

The method continues at step 580 where the requesting computing device dispersed storage error decodes the updated unique group of encoded data slices and the unique groups of encoded data slices from remaining ones of the decode threshold number of storage units to recover the data object. Alternatively, or in addition to, the requesting computing device determines that a data segment of the plurality of data segments is unrecoverable due to a corresponding set of encoded data slices including less than a decode threshold number of uncorrupted encoded data slices, sends a request for the local set of encoded recovery data slices from each of the storage units of the decode threshold number of storage units, and utilizes the local set of encoded recovery data slices from each of the storage units of the decode threshold number of storage units and the unique group of encoded data slices from the decode threshold number of storage units to recover the data segment.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributely located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method comprises:
storing, by a set of storage units of a dispersed storage network (DSN), a plurality of encoded data slices, wherein each storage unit of the set of storage units stores a unique sub-set of encoded data slices of the plurality of encoded data slices and wherein a data segment of data is dispersed storage error encoded to produce the plurality of encoded data slices;
dispersed storage error encoding, by each storage unit of the set of storage units, at least a recovery threshold number of encoded data slices of the unique sub-set of encoded data slices to produce a local set of encoded recovery data slices; and
in response to a retrieval request for the data segment:
identifying, by a device of the DSN, a desired sub-set of storage units of the set of storage units to produce an initial recovery number of storage units;
identifying, by the device, a storage unit of the initial recovery number of storage units having a rebuilding issue;
determining, by the device, whether the rebuilding issue is correctable at a local storage unit level or at a DSN level;
when the rebuilding issue is correctable at the DSN level, selecting, by the device, another storage unit from remaining storage units of the set of storage units to replace the storage unit having the rebuilding issue that is correctable at the DSN level to produce a recovery number of storage units; and
sending, by the device, retrieve requests to the recovery number of storage units.

2. The method of claim 1 further comprises:
when the rebuilding issue is correctable at the local level, sending, by the device, the retrieve requests to the initial recovery number of storage units;
in response to one of the retrieve requests, rebuilding, by the storage unit having the rebuilding issue that is correctable at the local level, an encoded data slice of the recovery threshold number of encoded data slices based on the local set of encoded recovery data slices to produce a rebuilt encoded data slice; and sending, by the storage unit having the rebuilding issue that is correctable at the local level, the rebuilt encoded data slice and remaining encoded data slices of the recovery threshold number of encoded data slices to the device.

3. The method of claim 1 further comprises:
the recovery threshold number of encoded data slices is equal to a number of encoded data slices in the unique sub-set of encoded data slices.

4. The method of claim 1 further comprises:
the recovery threshold number of encoded data slices is less than a number of encoded data slices in the unique sub-set of encoded data slices.

5. The method of claim 4 further comprises:
overwriting, by each of the storage units, one or more encoded data slices of the unique sub-set of encoded data slices with the local set of encoded recovery data.

6. The method of claim 1, wherein the identifying the desired sub-set of storage units comprises one or more of:
identifying the desired sub-set of storage units based on reliability of the storage units in the desired sub-set of storage units;
identifying the desired sub-set of storage units based on decoding efficiency of the unique sets of encoded data slices stored by the storage units in the desired sub-set of storage units; and
identifying the desired sub-set of storage units based on availability of the storage units in the desired sub-set of storage units.

7. The method of claim 1, wherein the determining whether the rebuilding issue is correctable at the local storage unit level or at the DSN level comprises:
obtaining DSN level rebuilding information;
interpreting the DSN level rebuilding information to identify one or more encoded data slices of the plurality of encoded data slices requiring rebuilding;
identifying the storage unit having the rebuilding issue based on the identity of the one or more encoded data slices requiring rebuilding; and
determining that the storage unit having the rebuilding issue is capable of locally rebuilding the one or more encoded data slices requiring rebuilding when the number of encoded recovery data slices in the local set of encoded recovery data slices is equal to or greater than the number of encoded data slices in the one or more encoded data slices requiring rebuilding.

8. The method of claim 1, wherein the selecting the other storage unit comprises:
determining that the other storage unit does not have the rebuilding issue; or
determining that the other storage unit has the rebuilding issue that is correctable at the local storage unit level.

9. The method of claim 1 further comprises:
the recovery threshold number of encoded data slices from the recovery number of storage units is approximately equal to a decode threshold number of the plurality of encoded data slices, wherein the decode threshold number corresponds to a minimum number of encoded data slices of the plurality of encoded data slices that is required to recover the data segment.

10. A non-transitory computer readable storage medium comprises:
at least one memory section that stores operational instructions that, when executed by one or more processing modules of one or more computing devices of a dispersed storage network (DSN), causes the one or more computing devices to:
store, by a set of storage units of the DSN, a plurality of encoded data slices, wherein each storage unit of the set of storage units stores a unique sub-set of encoded data slices of the plurality of encoded data slices and wherein a data segment of data is dispersed storage error encoded to produce the plurality of encoded data slices;
dispersed storage error encode, by each storage unit of the set of storage units, at least a recovery threshold number of encoded data slices of the unique sub-set of encoded data slices to produce a local set of encoded recovery data slices; and
in response to a retrieval request for the data segment:
identify, by a device of the DSN, a desired sub-set of storage units of the set of storage units to produce an initial recovery number of storage units;
identify, by the device, a storage unit of the initial recovery number of storage units having a rebuilding issue;
determine, by the device, whether the rebuilding issue is correctable at a local storage unit level or at a DSN level;
when the rebuilding issue is correctable at the DSN level, select, by the device, another storage unit from remaining storage units of the set of storage units to replace the storage unit having the rebuilding issue that is correctable at the DSN level to produce a recovery number of storage units; and
send, by the device, retrieve requests to the recovery number of storage units.

11. The non-transitory computer readable storage medium of claim 10 further comprises:
the at least one memory section stores further operational instructions that, when executed by the one or more processing modules, causes the one or more computing devices of the DSN to:
when the rebuilding issue is correctable at the local level, send, by the device, the retrieve requests to the initial recovery number of storage units;
in response to one of the retrieve requests, rebuilding, by the storage unit having the rebuilding issue that is correctable at the local level, an encoded data slice of the recovery threshold number of encoded data slices based on the local set of encoded recovery data slices to produce a rebuilt encoded data slice; and
sending, by the storage unit having the rebuilding issue that is correctable at the local level, the rebuilt encoded data slice and remaining encoded data slices of the recovery threshold number of encoded data slices to the device.

12. The non-transitory computer readable storage medium of claim 10 further comprises:
the recovery threshold number of encoded data slices is equal to a number of encoded data slices in the unique sub-set of encoded data slices.

13. The non-transitory computer readable storage medium of claim 10 further comprises:
the recovery threshold number of encoded data slices is less than a number of encoded data slices in the unique sub-set of encoded data slices.

14. The non-transitory computer readable storage medium of claim 13 further comprises:

the at least one memory section stores further operational instructions that, when executed by the one or more processing modules, causes the one or more computing devices of the DSN to:

overwrite, by each of the storage units, one or more encoded data slices of the unique sub-set of encoded data slices with the local set of encoded recovery data.

15. The non-transitory computer readable storage medium of claim 10, wherein the one or more processing modules functions to execute the operational instructions stored by the at least one memory section to cause the one or more computing devices of the DSN to identify the desired sub-set of storage units by one or more of:

identifying the desired sub-set of storage units based on reliability of the storage units in the desired sub-set of storage units;

identifying the desired sub-set of storage units based on decoding efficiency of the unique sets of encoded data slices stored by the storage units in the desired sub-set of storage units; and identifying the desired sub-set of storage units based on availability of the storage units in the desired sub-set of storage units.

16. The non-transitory computer readable storage medium of claim 10, wherein the one or more processing modules functions to execute the operational instructions stored by the at least one memory section to cause the one or more computing devices of the DSN to determine whether the rebuilding issue is correctable at the local storage unit level or at the DSN level by:

obtaining DSN level rebuilding information;

interpreting the DSN level rebuilding information to identify one or more encoded data slices of the plurality of encoded data slices requiring rebuilding;

identifying the storage unit having the rebuilding issue based on the identity of the one or more encoded data slices requiring rebuilding; and determining that the storage unit having the rebuilding issue is capable of locally rebuilding the one or more encoded data slices requiring rebuilding when the number of encoded recovery data slices in the local set of encoded recovery data slices is equal to or greater than the number of encoded data slices in the one or more encoded data slices requiring rebuilding.

17. The non-transitory computer readable storage medium of claim 10, wherein the one or more processing modules functions to execute the operational instructions stored by the at least one memory section to cause the one or more computing devices of the DSN to select the other storage unit by:

determining that the other storage unit does not have the rebuilding issue; or determining that the other storage unit has the rebuilding issue that is correctable at the local storage unit level.

18. The non-transitory computer readable storage medium of claim 10 further comprises:

the recovery threshold number of encoded data slices from the recovery number of storage units is approximately equal to a decode threshold number of the plurality of encoded data slices, wherein the decode threshold number corresponds to a minimum number of encoded data slices of the plurality of encoded data slices that is required to recover the data segment.

\* \* \* \* \*